(12) United States Patent
Vieira et al.

(10) Patent No.: US 10,209,519 B2
(45) Date of Patent: Feb. 19, 2019

(54) DISPLAY DEVICE WITH A COLLIMATED LIGHT BEAM

(71) Applicant: Lusospace, Projectos Engenharia LDA, Lisbon (PT)

(72) Inventors: Ivo Vieira, Lisbon (PT); Luis Filipe Caleira Dos Santos Cardoso, Palmela (PT); Géraud Louis Dominique Moulas, Lisbon (PT); Manuel João Fernandes Vaz Martins, Lisbon (PT)

(73) Assignee: Lusospace, Projectos Engenharia LDA, Lisbon (PT)

( * ) Notice: Subject to any disclaimer, the term of this patent is extended or adjusted under 35 U.S.C. 154(b) by 0 days.

(21) Appl. No.: 15/324,165

(22) PCT Filed: Jul. 10, 2014

(86) PCT No.: PCT/EP2014/064816
§ 371 (c)(1),
(2) Date: Jan. 5, 2017

(87) PCT Pub. No.: WO2016/004998
PCT Pub. Date: Jan. 14, 2016

(65) Prior Publication Data
US 2017/0176752 A1 Jun. 22, 2017

(51) Int. Cl.
*G02B 27/01* (2006.01)
*G02B 27/00* (2006.01)
*G02B 26/08* (2006.01)

(52) U.S. Cl.
CPC ......... *G02B 27/0172* (2013.01); *G02B 26/08* (2013.01); *G02B 26/0808* (2013.01); *G02B 26/0816* (2013.01); *G02B 27/0075* (2013.01); *G02B 27/01* (2013.01); *G02B 27/017* (2013.01); *G02B 2027/0174* (2013.01); *G02B 2027/0185* (2013.01)

(58) Field of Classification Search
None
See application file for complete search history.

(56) References Cited

U.S. PATENT DOCUMENTS

| 5,589,956 A | 12/1996 | Morishima et al. |
| 7,430,349 B2 | 9/2008 | Jones |

(Continued)

FOREIGN PATENT DOCUMENTS

| EP | 1 564 578 A1 | 8/2005 |
| JP | 10-319342 A | 12/1998 |

(Continued)

OTHER PUBLICATIONS

Chinese office action translation in CN 201380075059.0 of related U.S. Appl. No. 14/779,768, dated Mar. 31, 2017.

(Continued)

*Primary Examiner* — Jennifer D. Carruth
(74) *Attorney, Agent, or Firm* — Robert R. Deleault, Esq.; Mesmer & Deleault, PLLC

(57) ABSTRACT

A display device (10) is provided. The display device comprises an array of light emitting elements (16). The display device further comprises a plurality of optical elements (18) for receiving light from the array of light emitting elements. Each optical element is configured to provide a collimated light beam (20).

7 Claims, 28 Drawing Sheets

(56) References Cited

U.S. PATENT DOCUMENTS

Figure 2A:
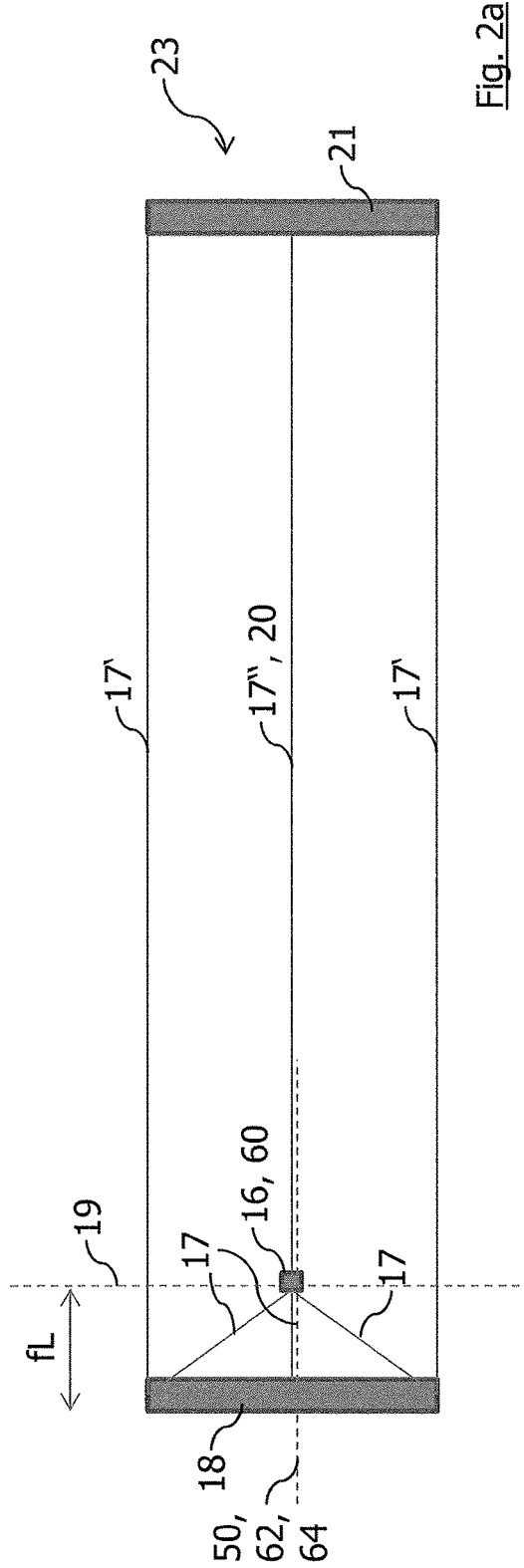

| | | | |
|---|---|---|---|
| 2004/0108971 A1* | 6/2004 | Waldern | G02B 27/0093 345/8 |
| 2005/0231599 A1 | 10/2005 | Yamasaki | |
| 2006/0061846 A1 | 3/2006 | Sprague et al. | |
| 2006/0227067 A1 | 10/2006 | Iwasaki | |
| 2008/0198471 A1 | 8/2008 | Amitai | |
| 2012/0113092 A1 | 5/2012 | Bar-Zeev et al. | |
| 2013/0286053 A1 | 10/2013 | Fleck et al. | |

FOREIGN PATENT DOCUMENTS

| | | |
|---|---|---|
| JP | 2005-030843 A | 10/2005 |
| JP | 2011-075956 A | 4/2011 |
| WO | 89/03059 A2 | 4/1989 |
| WO | 97/35223 | 9/1997 |
| WO | 2006/013565 A1 | 2/2006 |

OTHER PUBLICATIONS

Japanese office action translation in related application JP 2016-504494, dated Jul. 4, 2017.

PCT International Search Report and Written Opinion for PCT/EP2014/064816, dated Feb. 23, 2015.

Kim, Jihwan et al., "Wide-angle, nonmechanical beam steering using thin liquid crystal polarization gratings," Proceedings of SPIE, vol. 7093. Aug. 28, 2008, pp. 709302-1 to 709302-12.

Office Action from Australian Intellectual Property Office, dated Jun. 24, 2018.

Office action in counterpart Japanese application, dated Mar. 6, 2018.

* cited by examiner

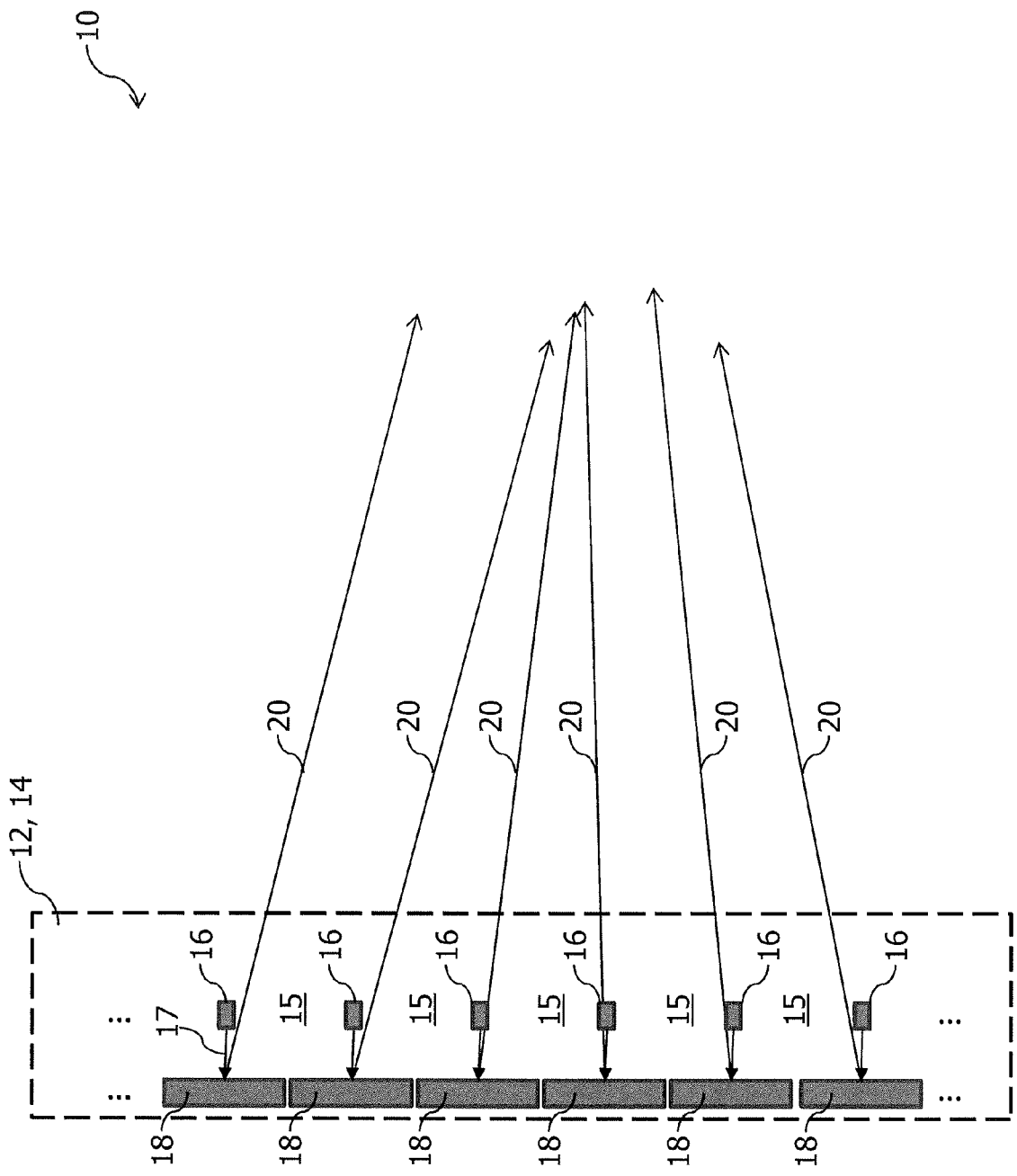

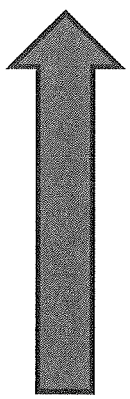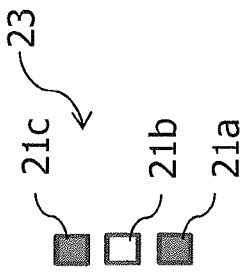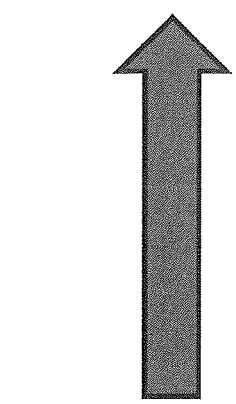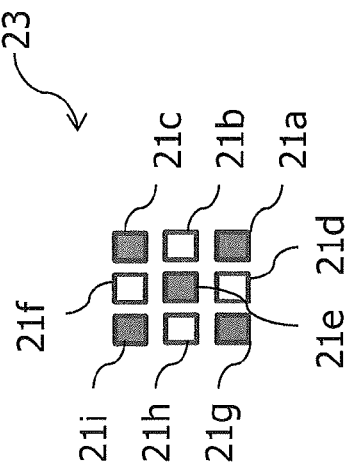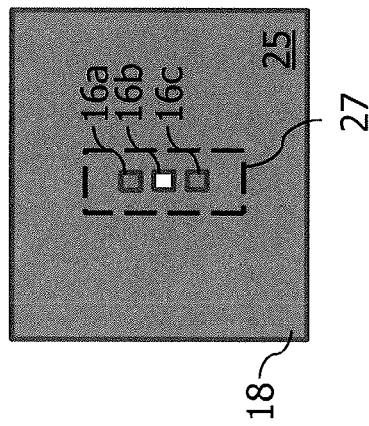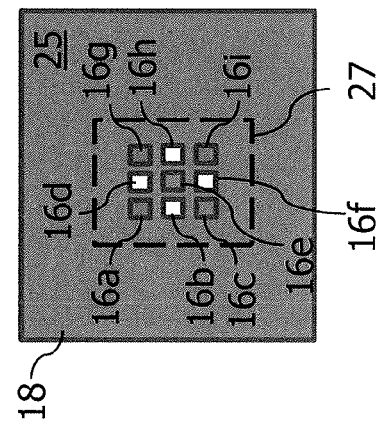

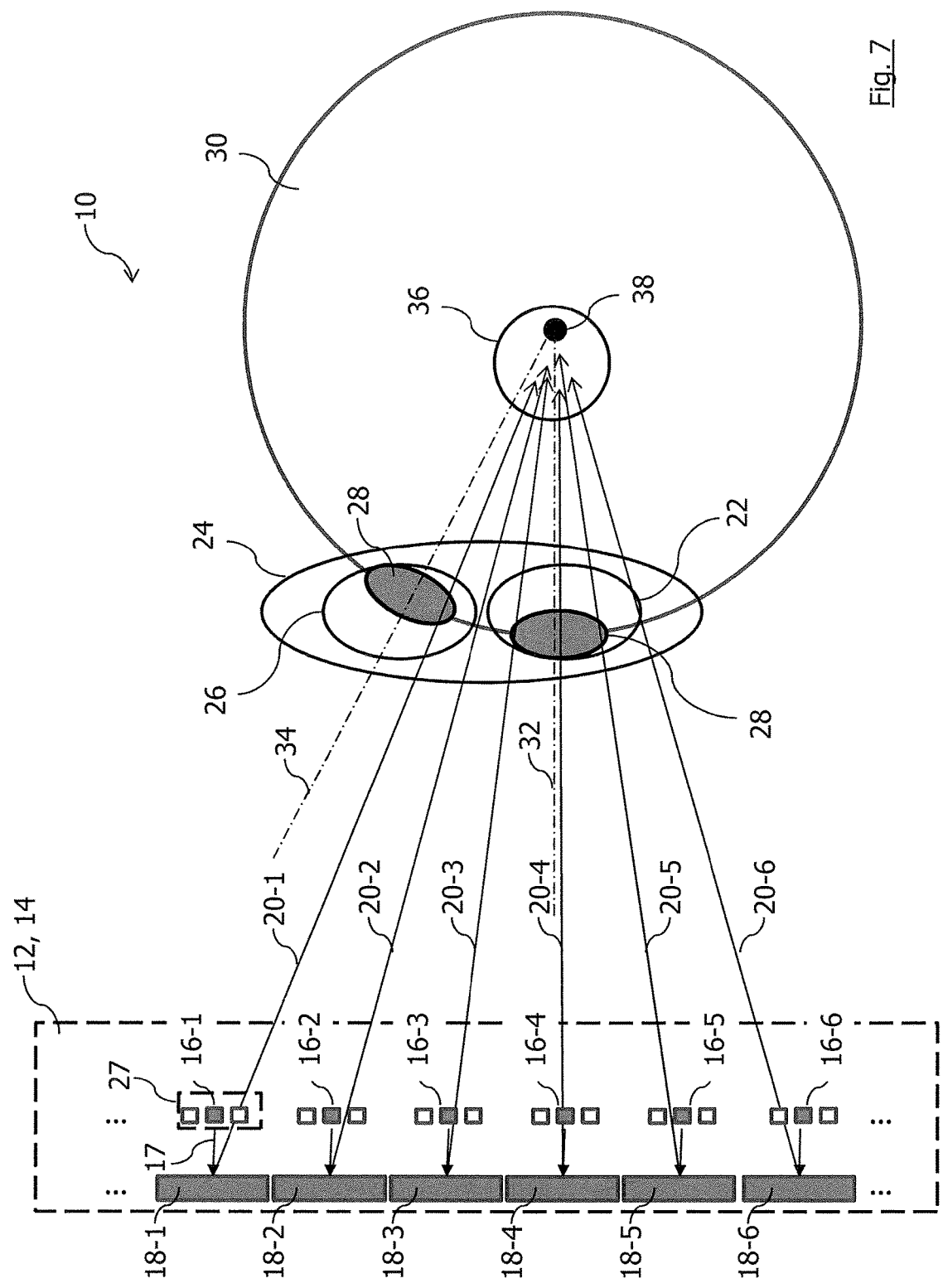

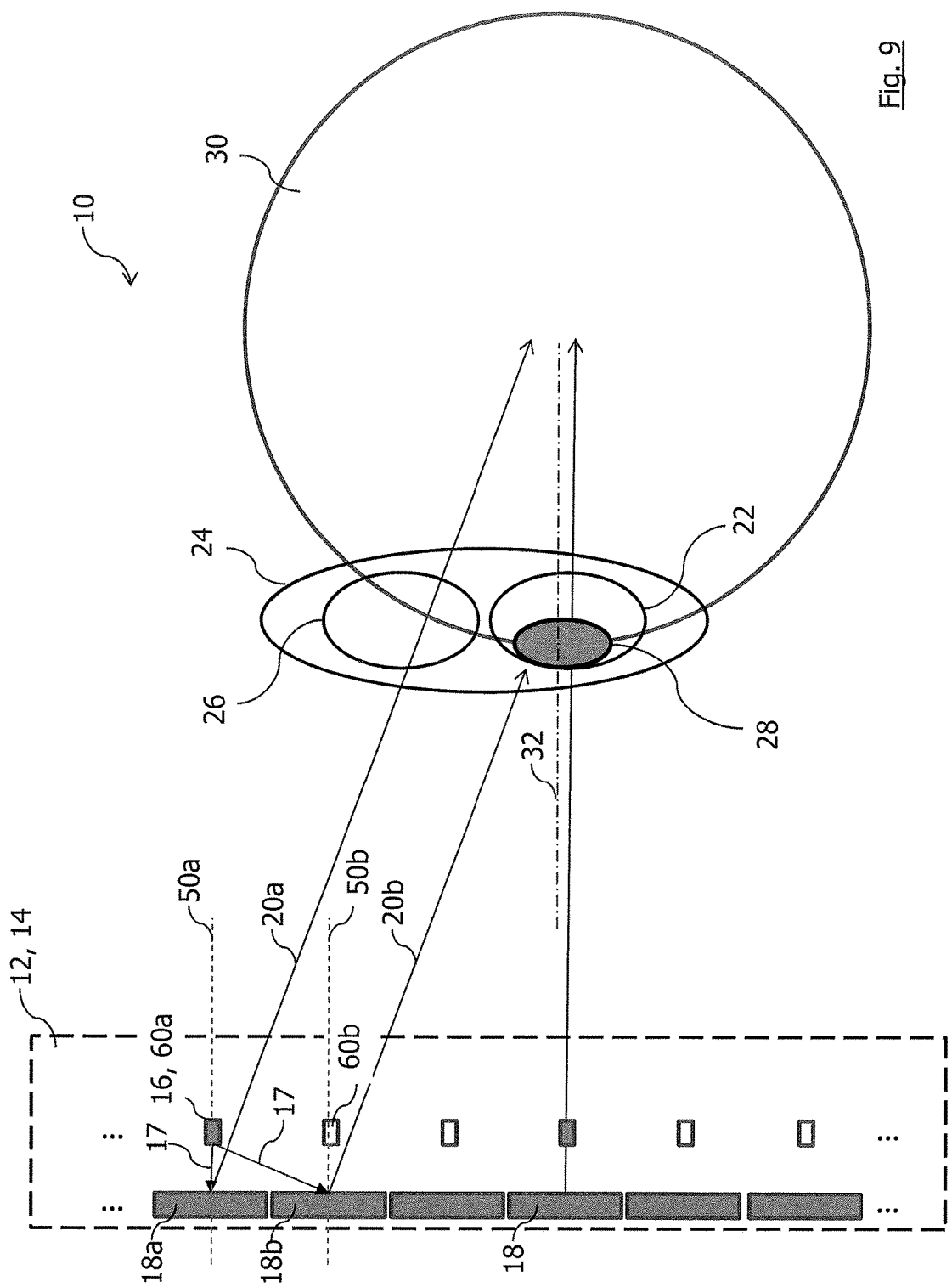

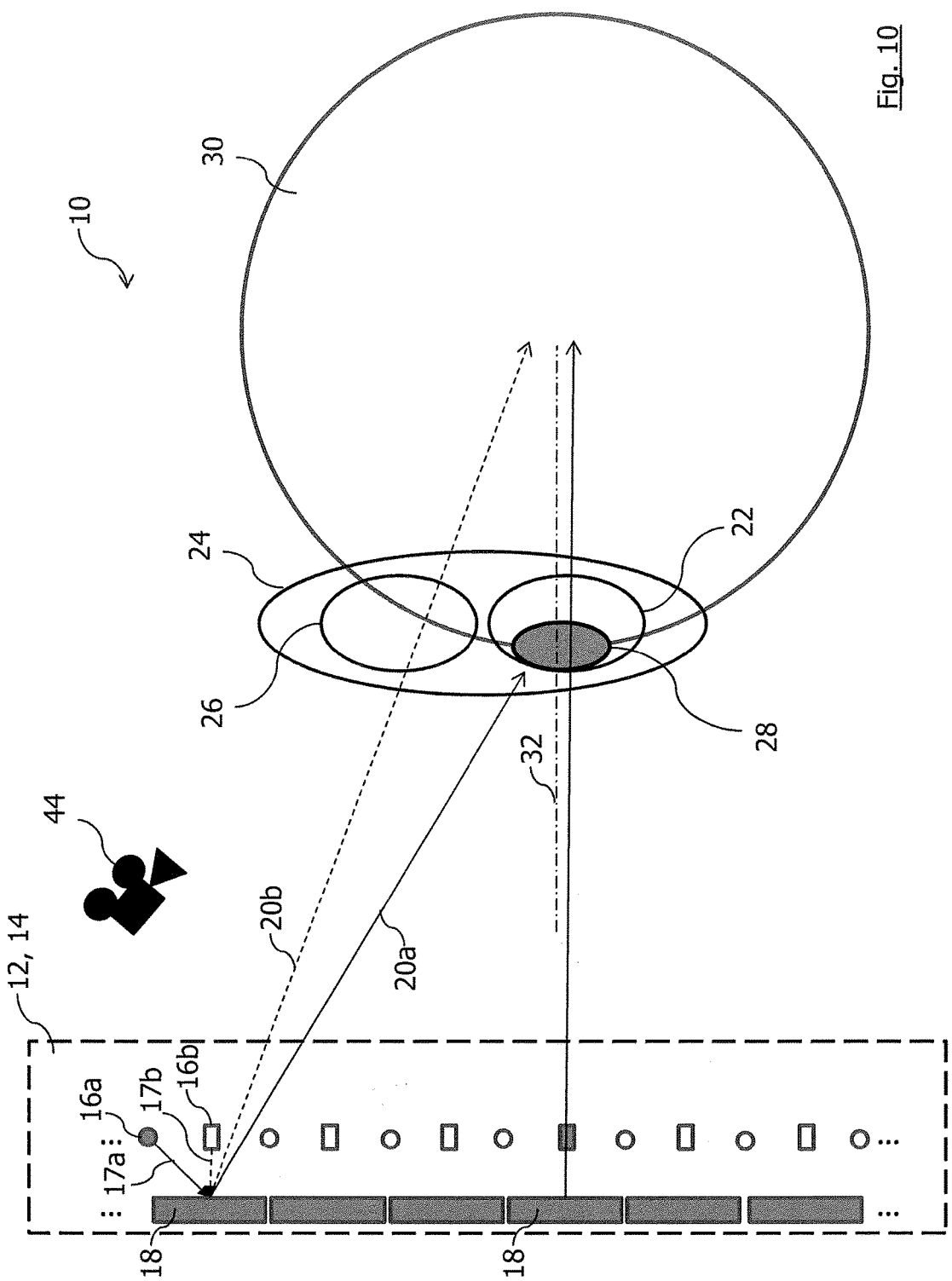

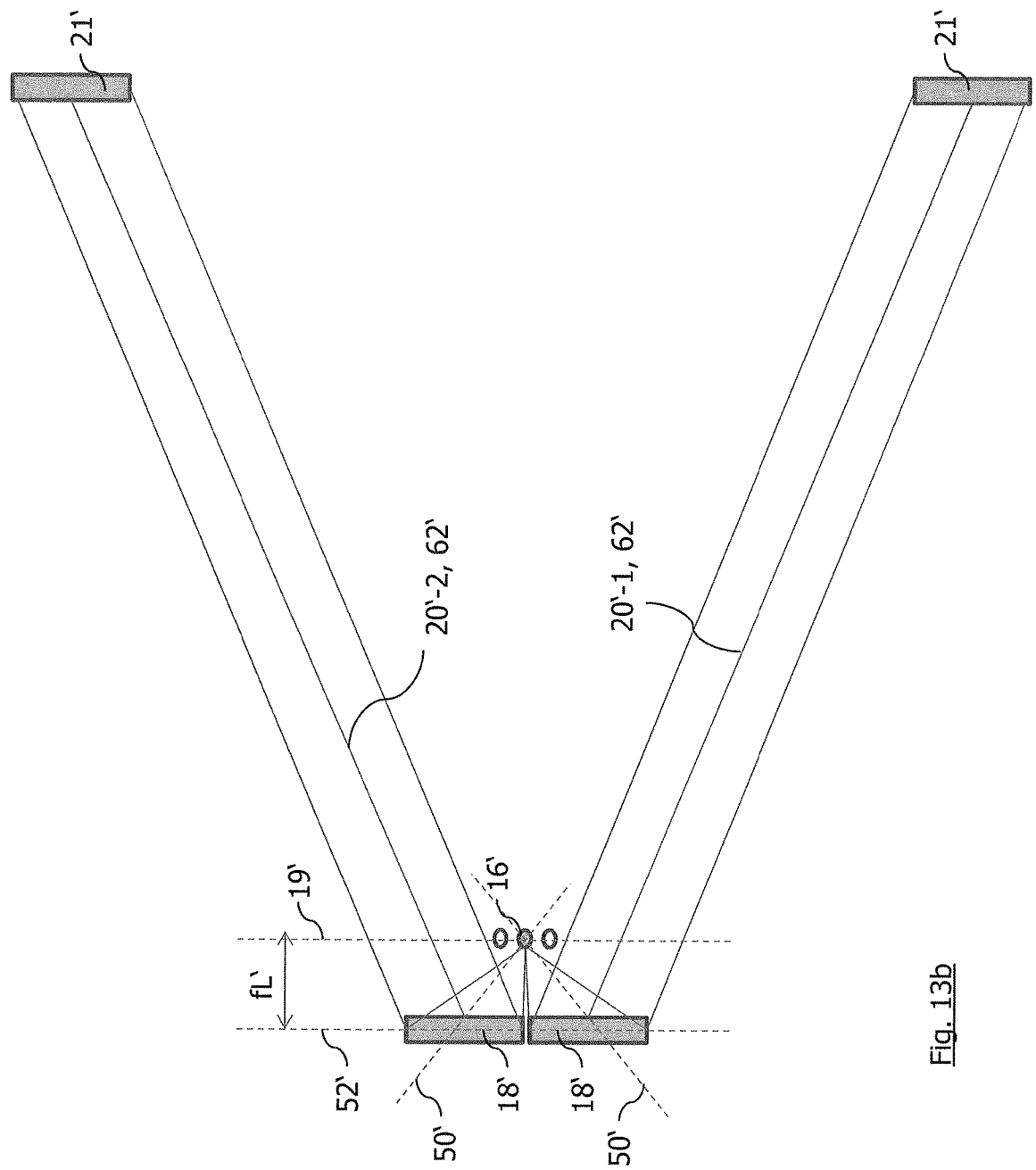

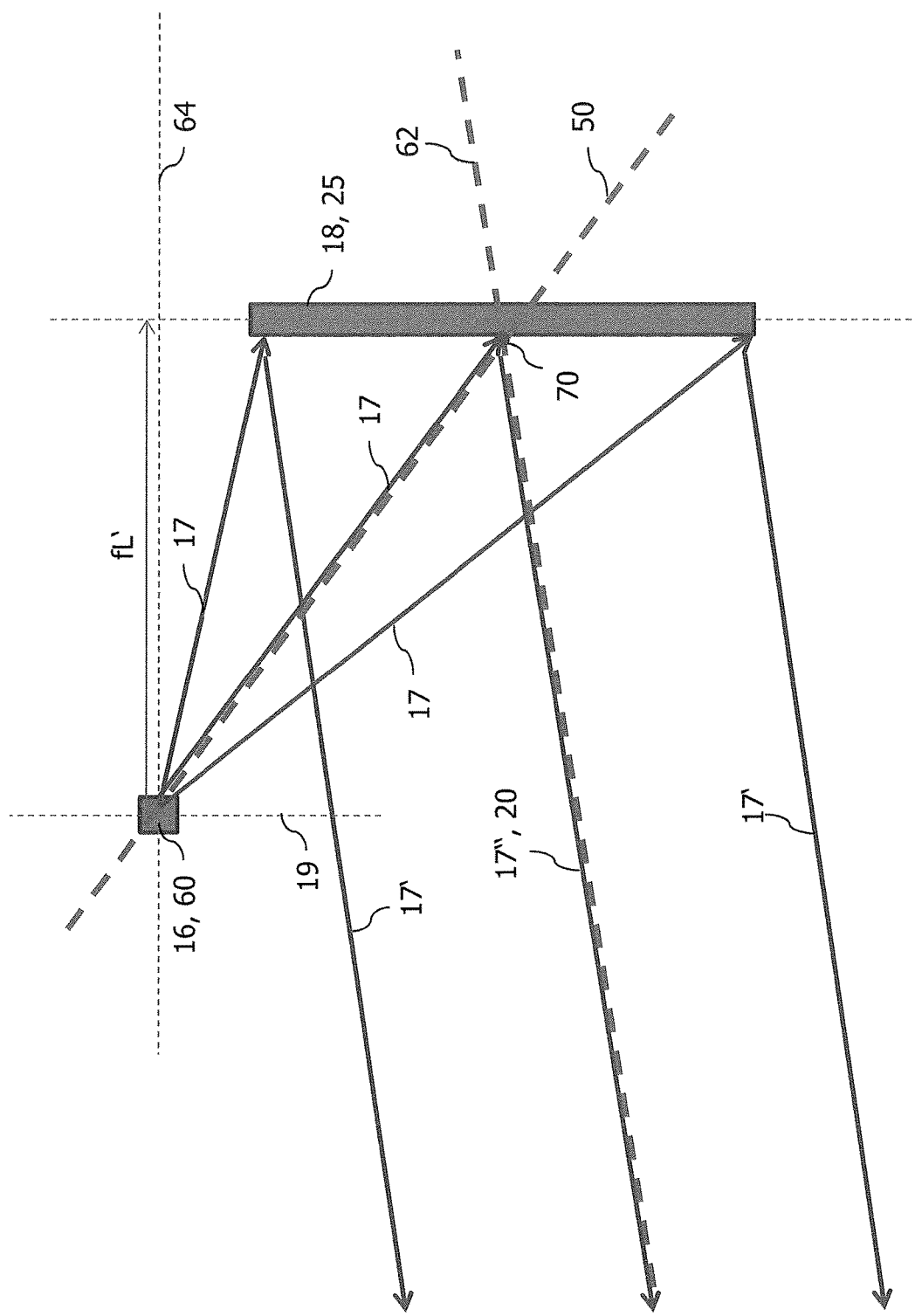

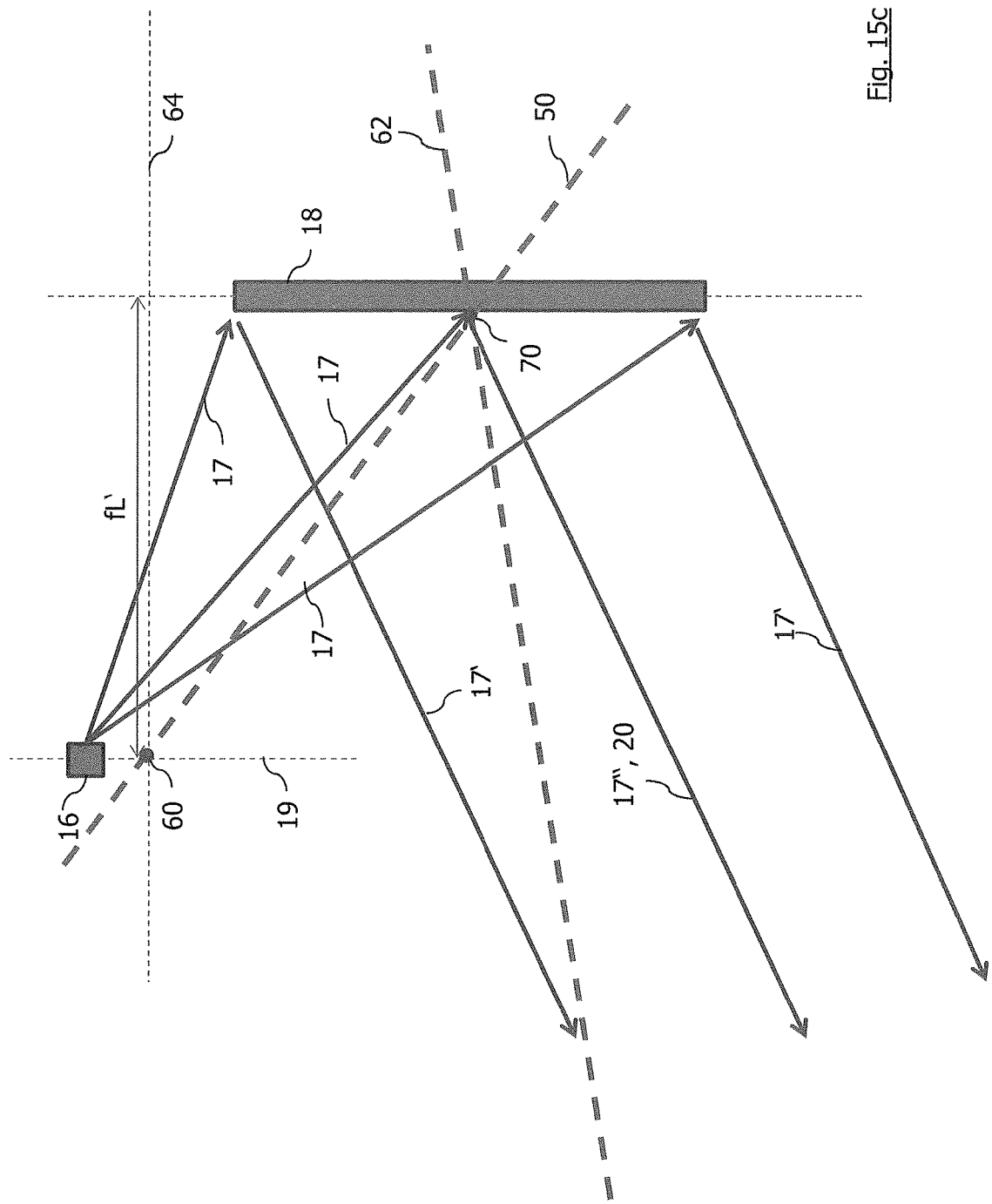

DISPLAY DEVICE WITH A COLLIMATED LIGHT BEAM

The present invention relates to a display device.

A display device can be a see-through display device, a head mounted display device, a see-through head mounted display device, a helmet mounted display device, a see-through helmet mounted display device, a head-up display device and/or a see-through head-up display device. The display device, in particular, a head-up display device can be implemented in the windshield of a vehicle, such as a car or an aircraft.

Such a display device can be used for creating an augmented reality vision, i.e. for superimposing images of both a physical world and of a display in a user's view. During the proper use of a display device, it is thus possible that, beside an image of the physical world passing through the display device, an additional superimposed image of the display representing overlay information reaches the user's eye(s).

Alternatively, such a display device can also be used for creating virtual (or artificial) reality vision, i.e. for (in particular, completely) simulating an environment that can simulate a physical world. During the proper use of such a display device, it is thus possible that an image of the physical world is simulated by the display device, wherein beside the simulated physical world also additional overlay information can be generated by the display device and reaches the user's eye(s).

It is one object of at least one embodiment of the present invention to provide a display device (in particular, for creating an augmented or virtual reality vision), which is of improved design.

This object is solved by a display device according to claim 1.

A display device comprises an array of light emitting elements and a plurality of optical elements for receiving light from the array of light emitting elements. Each light emitting element is configured to emit (in particular, visible) light. Each optical element is associated with at least one light emitting element and configured to form from the received light at least one collimated light beam.

In other words: The display device may comprise a plurality of light emitting elements and the array of light emitting elements may form a display of the display device. In particular, each light emitting element may form a single pixel (i.e. a smallest addressable element) of the display of the display device. The light emitting elements may be arranged spatially separated with respect to each other and/or in a non-overlapping manner.

As a technical effect and advantage, due to the collimated light beams leaving the display device, the display device allows that a user can accommodate his/her vision to (almost) infinity. In particular, the optical elements may be regarded to represent an optical system of the display device and may be configured to magnify the image of the display and/or to (virtually) project it to infinity. For example: The image of the display device can be represented by the collimated light beams leaving the display device in the direction of the user's eye(s), where it is focused by the human lens, which is accommodated to infinity, on the retina. In this sense, the collimated light beams emitted by the display device can create an image at (or, at least, almost at) infinite distance. Alternatively, the optical elements of the display device may be configured to (virtually) image the image of the display device on a certain plane for creating a virtual image. This is useful when the human eye is not focused to infinity but, for example, to an object in the real world situated in a plane corresponding to the plane of the virtual image. As a result, the display device is of improved design.

For clarity and conciseness, the term "associated" is employed. Being "associated" may be understood or may be defined such that an optical element only reflects, deflects and/or refracts the light emitted by an associated light emitting element, but, in particular, is substantially transparent for the light emitted by a non-associated light emitting element. More specifically, an optical element may reflect, deflect and/or refract light only within a deflection spectrum, wherein the deflection spectrum of the optical element may completely or partially cover an emission spectrum of the associated light emitting element, whereas, in particular, the deflection spectrum of the optical element does not cover an emission spectrum of a light emitting element, which is not associated with the optical element. In the latter case, the optical element may be transparent for the light emitted by the non-associated light emitting element or by the physical world.

There are various options for realizing an optical element: For example, an optical element may be or may comprise a holographic optical element. The holographic optical element may be a transmission holographic optical element or a reflection holographic optical element. In particular, an optical element may be or may comprise a holographic converging lens (e.g. a transmission hologram of a converging lens) having optical properties representing a converging lens or a holographic concave mirror (e.g. a reflection hologram of a concave mirror) having optical properties representing a concave mirror. A holographic optical element may be recorded in an (in particular, emergent holographic) emulsion zone of the display device. Additionally or alternatively, an optical element may be or may comprise a diffracting grating, in particular, a transmission amplitude grating, a transmission phase grating, a reflection phase grating and/or a reflection amplitude grating. Additionally or alternatively, an optical element may be or may comprise a deflection coating, a diffraction coating and/or a reflection coating. Within this disclosure, deflection, diffraction, refraction and/or reflection may be called only "reflection" for clarity and conciseness. The reflection coating may have a reflection area, which is, in particular, dichroic (or dichromatic). Dichroic may be understood or may be defined such that an optical element reflects, deflects, diffracts and/or refracts light only within a deflection spectrum, wherein the deflection spectrum of the optical element completely or partially covers an emission spectrum of the associated light emitting element, whereas the deflection spectrum of the optical element does not cover an emission spectrum of a light emitting element, which is not associated with the optical element, namely by being transparent for the light emitted by the non-associated light emitting element or by the physical world. The reflection area may be spherical-shaped or parabolic shaped. Additionally or alternatively, an optical element may be or may comprise a liquid crystal polarization grating and/or a liquid lens.

The above options for realizing an optical element allow also realizing an optical element having a focal plane, a focal length and/or an optical axis.

Moreover, an optical element may have magnifying optical properties such that a (virtual) image of the at least one associated light emitting element is provided in infinity (i.e. at infinite distance). For collimating the light received from the associated light emitting element, an optical element may have a focal plane and a focal length, wherein the associated light emitting element may be arranged within the focal plane of the associated optical element. An optical element may have a geometrical area and/or a deflecting, reflecting and/or refracting area. Again, within this disclosure, deflecting, diffracting, refracting and/or reflecting may be called only "reflecting" for clarity and conciseness. The geometrical area and/or the reflecting area may be of circular, rectangular or square shape.

More specifically, an optical element may be characterized by a "minimal aberration position". The minimal aberration position is the position, for which the optical aberrations are minimized, when a point-like light emitting element is located at this minimal aberration position and the optical element receives light from this point-like light emitting element and forms from the received light the collimated light beam. For example, the minimal aberration position of the optical element may be the position of (optionally, the center of) the object, at which the recorded object is located during the recording of the optical element as a holographic optical element relative to the position and/or the orientation of the intended optical element (more specifically, relative to the position and/or the orientation of the emulsion zone, in and by which the optical element is formed). In this regard, the minimal aberration position may be defined or understood as the center of the focal plane of the optical element.

A focal length of the optical element may be defined or understood as the shortest distance between the minimal aberration position of the optical element and the plane, in which the geometrical area and/or the reflecting area of the optical element is arranged.

A reference axis of the optical element may be defined or understood as a straight line passing through the center of (for example, the geometrical area of and/or the reflecting area of) the optical element and as being parallel to the collimated light beam, which is formed by the optical element from the light received from a point-like light emitting element that is located at the minimal aberration position of the optical element. The orientation of the reference axis can be adjusted and fixed, for example, during the recording of the optical element as a holographic optical element, by arranging and/or tilting the reference beam relative to the emulsion zone, in which the holographic optical element is recorded, or, as another example, during the coating process for generating a reflection coating, by arranging and/or tilting the reflection area of the reflection coating relative to an (optionally, transparent) substrate, on which the reflection area is coated. The reference beam may be represented by the central light ray of the bundle of light rays in the light reference wave, which together with the wave scattered from the recorded object form the hologram interference pattern in the emulsion zone during the hologram recording process.

An object axis of the optical element may be defined or understood as a straight line passing through the minimal aberration position and being perpendicular to the plane, in which (for example, the geometrical area and/or the reflecting area of) the optical element is arranged.

An optical axis of the optical element may be defined or understood as a straight line passing through the center of (for example, the geometrical area of and/or the reflecting area of) the optical element and passing through the minimal aberration position of the optical element. In this regard, the optical axis of the optical element can be adjusted and fixed by positioning said center and by positioning said minimal aberration position. The orientation of the optical axis can be adjusted and fixed, for example, during the recording of the optical element as a holographic optical element, by arranging the object (i.e. the lens or the mirror or the like) being imaged as hologram relative to the emulsion zone, in which the holographic optical element is recorded, or, as another example, during the coating process for generating a reflection coating, by arranging and/or tilting the reflection area of the reflection coating relative to a (optionally, transparent) substrate, on which the reflection area is coated. In particular, the optical axis may be parallel to or may even coincide with the object axis. In general, however, the optical axis not necessarily has to coincide and/or not necessarily has to be parallel to the object axis, but can be tilted with respect to the object axis. The same applies to the reference axis: The optical axis may be parallel to or even coincide with the reference axis. In general, however, the optical axis not necessarily has to coincide and/or not necessarily has to be parallel to the reference axis, but can be tilted with respect to the reference axis. If a light emitting element is located in the focal plane and on the optical axis of the associated optical element, then the optical element forms from the light emitted by the associated light emitting element a collimated light beam and this collimated light beam leaves the optical element parallel to and along the reference axis. However, if the light emitting element is located in the focal plane, but offside the optical axis of the associated optical element, then the optical element still forms from the light emitted by the associated light emitting element a collimated light beam, but this collimated light beam leaves the optical element in a deflected (i.e. tilted, angled) manner with respect to the reference axis.

In light of the above, it is also possible to realize an optical element having a reference axis, an object axis and/or an optical axis, each of which having a desired orientation. It is also possible to realize that an optical element and the associated light emitting element are configured and arranged (with respect to each other) such that the collimated light beam formed by the optical element from the light received from the associated light emitting element passes through a desired portion of an exit pupil of the display device.

An exit pupil of the display device may be defined or understood as a cross-section of the bundle (in particular, the cone) of (in particular, all the) collimated light beams or, more generally (in particular, all the) light rays leaving the display device at a position of (in particular, the cornea of) the user's eye during the proper use of the display device, when all the light emitting elements of the display device emit light. In particular, inside the exit pupil of the display device, each collimated light beam generated by an optical element of the display device may be considered as being projected to a light spot, wherein a plurality of collimated light may thus form a light spot pattern inside the exit pupil of the display device.

A first portion of the exit pupil of the display device may represent a first spatial area, in which, for example, a pupil of a user's eye is positioned during a proper use of the display device, when the eye is looking along at least one first observation direction. A second portion of the exit pupil of the display device may represent a second spatial area, which is different from the first spatial area and in which, for example, the pupil of the user's eye is positioned during the proper use of the display device, when the eye is looking along at least one second observation direction, which is different from the first observation direction(s).

A light emitting element may be switchable between an on-state, in which the light emitting element emits (in particular, visible) light, and an off-state, in which the light emitting element emits no (in particular, visible) light. For example, an optical element may be associated with at least one first light emitting element and at least one second light emitting element, wherein each of the first and the second light emitting elements may be switchable between an off-state, in which the light emitting element emits light, and an off-state, in which the light emitting element emits no light, and wherein the optical element may be configured to form from the light emitted by the at least one first light emitting element at least one first collimated light beam and to form from the light emitted by the at least one second light emitting element at least one second collimated light beam, wherein the optical element as well as the first and the second light emitting elements may be configured and arranged such that the first collimated light beam passes through at least one first portion of an exit pupil of the display device and the second collimated light beam passes through at least one second portion of the exit pupil of the display device, which is different from the first portion and, in particular, spatially disjoint with the first portion. The first light emitting element may be arranged on the optical axis of the optical element, whereas the second light emitting element may be arranged offside the optical axis of the optical element.

As a technical effect and advantage, when the user's eye is looking along a first observation direction, in which the pupil of the user's eye is positioned in (a first spatial area representing) the first portion of the exit pupil of the display device, only the first light emitting element may be set in its on-state and the second light emitting element may be set in its off-state, whereas, when the user's eye is looking along a second observation direction, in which the pupil of the user's eye is positioned in (a second spatial area representing) the second portion of the exit pupil of the display device, only the second light emitting element may be set in its on-state and the first light emitting element may be set in its off-state. In other words: When the light emitted from a specific light emitting element is not needed, because, for example, this light cannot reach the pupil of a user's eye in a present observation direction of the user's eye, the light emitting element can be set in its off-state. In this regard, the first and the second light emitting elements may be understood as multiple channels allowing a redirection of the collimated light beams by turning on or off the respective light emitting elements. That is, light emitted by the light emitting elements associated with the optical element can reach the user's eye at different observation directions of the user's eye. Hence, the light emitted by these light emitting elements can be used more effectively. This allows realizing an energy efficient display device with low power requirements. As a result, the display device is of improved design. Further, since the redirection scheme of the collimated light beams leaving the display device can be realized even by a small number (e.g. two or three) of the light emitting elements associated with one respective optical element, the redirection scheme is function-able, but still of simple design. For example, if an additional mask is provided for each light emitting element for blocking light emitted from the light emitting element to prevent this light from directly entering the user's eye, the number of these masks and/or the size of these masks may also be kept small, thus further simplifying the design of the display device.

The display device may comprise an image capturing device for capturing an image of the pupil of the user's eye. The image capturing device may be configured to generate a position signal representing a position of the pupil of the user's eye, in particular, relative to a position of an exit pupil of the display device. Therefore, the image capturing device allows tracking the position of the pupil of the user's eye. In this sense, the image capturing device can be regarded as an eye tracker. The image capturing device may be a stand-alone (e.g. micro) camera, for example, located on the side of the display device, or may be embedded in the display device itself. The display device may comprise a control unit. The control unit may be configured to switch the light emitting element based on the position signal generated by the image capturing device. For example, the control unit may be configured to set the first light emitting element in its on-state and/or to set the second light emitting element in its off-state, when the pupil of the user's eye is positioned in (a first spatial area representing) the first portion of the exit pupil of the display device, and/or to set the first light emitting element in its off-state and/or to set the second light emitting element in its on-state, when the pupil of the user's eye is positioned in (a second spatial area representing) the second portion of the exit pupil of the display device.

As a technical effect and advantage, only this light emitting element of the first and the second light emitting elements is set in its on-state, for which the associated optical element actually can direct the emitted light into the pupil of the user's eye in the present observation direction, whereas that light emitting element of the first and the second light emitting elements is set in its off-state, for which the associated optical element cannot direct the emitted light into the pupil of the user's eye in the present observation direction. In other words: When the light emitted from a specific light emitting element is not needed, because, for example, this light cannot reach the pupil of a user's eye in a present observation direction of the user's eye, the light emitting element is set in its off-state. Thus, light, which cannot reach the user's eye, is not generated at all. Hence, the light emitted by this light emitting element is used more effectively. This allows realizing an energy efficient display device with low power requirements. As a result, the display device is of improved design.

The display device may comprise a positioning device, such as a glasses frame or spectacle frame or the like, which is configured to arrange the display device relative the user's eye such that the user's eye is positioned for a proper use of the display device. More specifically, by use of the positioning device the position and the orientation of a user's face or head can be positioned relative to the position and the orientation of the display device. The positioning device may be configured to arranged the pupil of the user's eye within (a spatial area representing) the exit pupil of the display device.

The plurality of optical elements and the array of light emitting elements may be configured and arranged such that at least one first partial number of the collimated light beams passes through at least one first portion of an exit pupil of the display device, and at least one second partial number of the collimated light beams, which is different from the first partial number of the collimated light beams, passes through at least one second portion of the exit pupil of the display device, which is different from the first portion of the exit pupil of the display device. In general, the plurality of optical elements may comprise at least one first optical element and at least one second optical element. The first and the second optical element may be associated with at least one light emitting element, wherein the first optical element may be configured to receive light from the associated light emitting element and to form from the received light at least one first collimated light beam and the second optical elements may be configured to receive light from the associated light emitting element and to form from the received light at least one second collimated light beam. The first and the second optical elements as well as the associated light emitting element may be configured and arranged such that the first collimated light beam passes through a first portion of an exit pupil of the display device and the second collimated light beam passes through a second portion of the exit pupil of the display device, which is different from the first portion and, in particular, spatially disjoint with the first portion.

As a technical effect and advantage, the light emitted by the light emitting element(s) associated with the first and the second optical elements not only is directed into the pupil of the user's eye, when positioned in (a first spatial area representing) the first portion of the exit pupil of the display device, but is also directed into the pupil of the user's eye, when the eye positioned in (a second spatial area representing) the second portion of the exit pupil of the display device. Thus, the light emitted by the light emitting element(s) associated with the first and the second optical elements can reach the user's eye at different observation directions of the user's eye. In other words: Always a part of the total number of collimated light beams leaving the display device can pass through the pupil of the users' eye. Furthermore, inside the exit pupil of the display device, the at least one first collimated light beam may be considered as being projected to at least one first light spot (in particular, on an eye surface, such as the cornea of the eye) and the at least one second collimated light beam may be considered as being projected to at least one second light spot (in particular, on the same eye surface, such as, again, the cornea of the eye), wherein the first and the second light spots, inside the exit pupil of the display device, are spatially separated with respect to each other, in particular, in an overlapping or non-overlapping manner, thereby forming a light spot pattern. Therefore, inside the exit pupil of the display device, the at least two light spots can cover at least two different positions of the pupil of a user's eye corresponding to at least two different observation directions of the user's eye. Hence, for different observation directions of the users' eye, the user is able to see the image created by the display device. This allows realizing a display device having a large field of view. As a result, the display device is of improved design.

Alternatively or additionally, the first and the second optical elements and the at least one associated light emitting element may be configured and arranged such that, during the proper use of the display device, the first collimated light beam is imaged onto a "central" part of the eye's retina including the fovea and the second collimated light beam is imaged onto a "peripheral" part of the retina offside the fovea. In this regard, the at least one first optical element may be called "central" optical element, the at least one second optical element may be called "peripheral" optical element, the at least one first collimated light beam may be called "central" collimated light beam and/or the at least one second collimated light beam may be called "peripheral" collimated light beam.

As a technical effect and advantage, the first (central) collimated light beam may be considered as being projected to at least one (central) light spot (in particular, on an eye surface, such as the cornea of the eye), which, inside the exit pupil of the display device, can be viewed by the central part of the retina including the fovea, which part has a relatively high resolution capacity, whereas the second (peripheral) collimated light beam may be considered as being projected to at least one (peripheral) light spot, which, inside the exit pupil of the display device, can be viewed by the peripheral part of the retina offside the fovea, which part has a relatively low resolution capacity. This allows realizing a display device generating a light spot pattern, which is adapted to the resolution capacity of the fovea. As a result, the display device is of improved design.

Alternatively or additionally, the plurality of optical elements may comprise at least one first optical element and at least one second optical element, which may be associated with at least one light emitting element, wherein the first and the second optical elements may be configured to receive light from the at least one associated light emitting element and to form from the received light at least one first collimated light beam and at least one second collimated light beam, and wherein the first and the second optical elements and the at least one associated light emitting element may be configured and arranged such that the first and the second collimated light beams leave the display device substantially parallel with respect to each other, in particular, in such a manner that the first and the second collimated light beams at least partially overlap with respect to each other.

As a technical effect and advantage, both the first and the second collimated light beams may be considered as being projected to at least one common light spot (in particular, on an eye surface, such as the cornea of the eye), which, inside the exit pupil of the display device, can be viewed by the user's eye. As a consequence, the common light spot (i.e. one and the same spatial area) may contain two or more different colors. This is, for example, the case, when the array of light emitting elements includes at least one first light emitting element for emitting light of at least one first color and at least one second light emitting element for emitting light of at least one second color, which is/are different from the at least one first color, when the first optical element is associated only with the at least one first light emitting element and the second optical element is associated only with the at least one second light emitting element, and when the first optical element is configured to receive light from the first light emitting element and to form from the received light the first collimated light beam and the second optical element is configured to receive light from the second light emitting element and to form from the received light the second collimated light beam. Hence, the user can perceive a color image generated by the display device, wherein the color image has a high resolution, because all the at least two different colors emitted by the first and the second light emitting elements are present in one and the same common light spot simultaneously. Therefore, the display device allows providing an image of high quality. As a result, the display device is of improved design.

A focal length of the first optical element may be larger than a focal length of the second optical element.

As a technical effect and advantage, a three layer configuration can be realized, in which the first optical element is arranged in a first layer of the display device, the second optical element is arranged in a second layer of the display device and the at least one associated light emitting element is arranged in a third layer of the display device, wherein the third layer may coincide with the focal planes of the first and the second optical elements and wherein the second layer may be arranged between the first layer and the third layer, because, even though the first optical element is farther displaced from the light emitting element than the second optical element, the first optical element can still collimate the light from the light emitting element due to its longer focal length. Further, in such a three layer configuration, the shorter focal length of the second optical element allows, on the one hand, a larger (in particular, transversal) image magnification of the light emitting element in the user's eye, and, on the other hand, a larger collecting angle (numerical aperture) for receiving the light from the light emitting element, which results also in larger deflection angles and, thus, in a larger exit pupil and/or field of view. This allows realizing a display device having a large field of view. Moreover, if the first optical element is a central optical element and the second optical element is a peripheral optical element, then, although the larger magnification of the second optical element may lead to a lower resolution of a light spot pattern on an eye surface, such as the cornea of the eye, this lower resolution is not a problem but justifiable, because the second light spot is viewed by the peripheral part of the retina offside the fovea, which part has a low resolution capacity anyways. This allows realizing a display device generating a light spot pattern, which is adapted to the resolution capacity of the fovea. As a result, the display device is of improved design.

The first optical element may be arranged in a first layer, the second optical element may be arranged in a second layer and the at least one associated light emitting element may be arranged in a third layer, wherein the second layer may be arranged between the first layer and the third layer. In this regard, the at least one first optical element may be called "first layer" optical element and the at least one second optical element may be called "second layer" optical element.

As a technical effect and advantage, beside the advantages and effects already described above, the first and the second (layer) optical elements must not be arranged in one and the same layer of the display device. This allows reducing the density of the optical elements in each layer and a high dense arrangement of the optical elements can be avoided. Moreover, this allows arranging the optical elements in a separated manner, wherefore the freedom of arranging the optical elements is increased. Hence, a simpler arrangement of the optical elements and, thus, an easier manufacturing of the display device are possible. As a result, the display device is of improved design.

A focal plane of the first optical element and a focal plane of the second optical element may be arranged in a common focal plane, wherein the at least one associated light emitting element may be arranged in the common focal plane.

As a further technical effect and advantage, beside the advantages and effects already described above, even if the first optical element is farther displaced from the light emitting element than the second optical element, both the first and the second optical elements can still collimate the light from the at least one light emitting element.

The display device may comprise a filter for blocking light emitted by a light emitting element, which is associated both with the first and the second optical elements, wherein the filter may be arranged between the first and the second optical element. More specifically, the filter may be arranged in a layer, which is arranged between the first layer, in which the first optical element is arranged, and the second layer, in which the second optical element is arranged. In particular, the first and/or the second optical element may be provided with such a filter.

As a technical effect and advantage, a light ray or a collimated light beam, which has already been formed, for example, by the first optical element and which propagates towards the second optical element, is blocked by the filter arranged between the first and the second optical element such that this light ray or collimated light beam is prevented from reaching the second optical element and, thus, from being perturbed (e.g. spread up or re-directed) by the second optical element. Therefore, the blocked light is not scattered in an un-controlled way and/or in an un-desired direction. Hence, a well-defined light emission of the display device is possible without any undesired stray light generated by perturbed collimated light beams. As a result, the display device is of improved design.

There are two possible alternative to realize that the first and the second optical elements are associated with at least one light emitting element, wherein the first optical element is configured to receive light from the at least one associated light emitting element and to form from the received light at least one first collimated light beam and the second optical element is configured to receive light from the at least one associated light emitting element and to form from the received light at least one second collimated light beam:

The array of light emitting elements may include at least one first light emitting element for emitting light of at least one first color and at least one second light emitting element for emitting light of at least one second color, which is/are different from the at least one first color, wherein the first optical element may be associated only with the at least one first light emitting element and the second optical element may be associated only with the at least one second light emitting element, and wherein the first optical element may be configured to receive light from the first light emitting element and to form from the received light the first collimated light beam and the second optical element may be configured to receive light from the second light emitting element and to form from the received light the second collimated light beam.

As a technical effect and advantage, the first optical element is not associated with the at least one second light emitting element at all, but is, for example, transparent for the light emitted by the second light emitting element, and, vice versa, the second optical element is not associated with the at least one first light emitting element at all, but is, for example, transparent for the light emitted by the first light emitting element. In this case, the first optical element cannot perturb the second collimated light beam formed by the second optical element and, vice versa, the second optical element cannot perturb the first collimated light beam formed by the first optical element anyways. Therefore, a filter, as described above, is dispensable or not needed. This allows realizing a light-weight and compact design of the display device. Moreover, even when the optical axis of the first optical element and the optical axis of the second optical element are tilted with respect to each other and/or the reference axis of the first optical element and the reference axis of the second optical element are parallel with respect to each other, which increases the freedom of constructing the display device (as further described below), it still can be achieved that the first and the second collimated light beams pass through different first and second portions of the exit pupil. As a result, the display device is of improved design.

Alternatively, the first and the second optical elements may be associated with at least one common light emitting element, wherein the first optical element may be configured to receive light from the common light emitting element and to form from the received light the first collimated light beam and the second optical element may be configured to receive light from the common light emitting element and to form from the received light the second collimated light beam.

As a technical effect and advantage, both the first and the second optical elements can be form a respective collimated light beam from one and the same common light emitting element. Thus, the first and the second optical elements share one and the same common light emitting element. This allows reducing the number of light emitting elements. Hence, a light-weight, compact and energy-efficient design of the display device is possible. As a result, the display device is of improved design.

At least one of the first and the second optical elements may be configured such that the optical axis of the optical element and the reference axis of the optical element are tilted with respect to each other.

As a technical effect and advantage, if the associated light emitting element is arranged on the optical axis, the optical element can be configured such that the optical axis is tilted with respect to the reference axis in such a manner that the collimated light beam leaves the optical element along the reference axis without passing the associated light emitting element. Thus, the collimated light beam can leave the display device without being at least partially re-absorbed and/or without being scattered in an un-controlled way and/or in an un-desired direction by the light emitting element. Hence, an energy-efficient and a well-defined light emission characteristics of the display device are possible without any undesired stray light generated by perturbing collimated light beams. As a result, the display device is of improved design.

The first and the second optical elements may be configured such that the reference axis of the first optical element and the reference axis of the second optical element are tilted with respect to each other.

As a technical effect and advantage, it can be achieved easily that the first collimated light beam passes through a first portion of the exit pupil of the display device and the second collimated light beam passes through a second portion of the exit pupil of the display device, which is different from the first portion and, in particular, spatially disjoint with the first portion, and/or that the first collimated light beam is imaged onto a central part of the eye's retina including the fovea and the second collimated light beam is imaged onto a peripheral part of the retina offside the fovea. More general, by setting the angle between the reference axis of the first optical element and the reference axis of the second optical element, the first and the second optical elements can be configured such that the first and the second collimated light beams diverge with respect to each other, in particular, even without any intersection of the collimated light beams (i.e. the collimated light beams start diverging directly after leaving the first and the second optical elements, which is different from first converging, then intersecting and finally diverging). This allows realizing a display device having a large field of view. Moreover, even when the first optical element is a first holographic optical element being recorded in a first emulsion zone of the display device and the second optical element is a second holographic optical element being recorded also in the first emulsion zone, which is weight- and space-saving, by tilting the reference axes with respect to each other it still can be achieved that the first and the second collimated light beams pass through different first and second portions of the exit pupil. This allows realizing a light-weight and compact design of the display device having a large field of view. As a result, the display device is of improved design.

Alternatively, the first and the second optical elements may be configured such that the reference axis of the first optical element and the reference axis of the second optical element are parallel or even coincident with respect to each other.

As a technical effect and advantage, it can be achieved easily that the first and the second collimated light beams leave the display device substantially parallel with respect to each other. Moreover, this is even possible, when at least one of the first and the second optical elements is also configured such that the optical axis and the reference axis are tilted with respect to each other and when the first and the second optical elements receive light from two different and spatially separated (and thus low densely arranged) light emitting elements, namely by arranging one of these two light emitting elements on the optical axis of the first optical element and arranging the other of these two light emitting elements on the optical axis of the second optical element. In other words: When the optical axes of the first and the second optical elements are tilted with respect to each other, while the reference axes of the first and second optical elements are parallel or coincident, the first and the second associated light emitting elements can be easily arranged in a spatially separated manner, for example, in a direction perpendicular to the reference axes, wherein the two-color light emitted by the first and the second light emitting element can still reach one and the same common light spot simultaneously, because of the parallel/coincident reference axes. Hence, the light emitting elements do not have to be stacked, for example, in a direction along the reference axes. This allows a simple arrangement of the light emitting elements and more freedom in constructing the display device. As a result, the display device is of improved design.

The first optical element may be a first holographic optical element being recorded in a first emulsion zone of the display device and the second optical element may be a second holographic optical element being recorded also in the first emulsion zone.

As a technical effect and advantage, one and the same emulsion zone can be employed to represent two optical elements. This allows a compact and space-saving construction of the display device. As a result, the display device is of improved design.

Alternatively, the first optical element may be a first holographic optical element being recorded in a first emulsion zone of the display device and the second optical element may be a second holographic optical element being recorded in a second emulsion zone of the display device, which is different from the first emulsion zone. The first and the second emulsion zones may be arranged such that the first and the second emulsion zones are spatially separated from each other and/or are arranged in an overlapping or non-overlapping manner. For example, the first and the second emulsion zones may be arranged such that the first and the second emulsion zones are shifted or displaced with respect to each other along a direction parallel and/or perpendicular to the optical axes and/or the reference axes of the first and/or the second optical element.

As a technical effect and advantage, two different emulsion zones can be employed to represent two optical elements. In particular, the first and second emulsion zones can be arranged independently from each other and, in particular, also with respect to their corresponding light emitting element(s). Therefore, the first and second emulsion zones do not necessarily have to share the same space. As the two emulsion zones are independent from each other, the freedom of arranging the two emulsion zones and, thus, of the two optical elements is increased. For example, the two optical elements can be spatially separated from each other. Moreover, since the first optical element is only associated to the first light emitting element, which emits the first color, but is not associated with the second light emitting element, which emits the second color, the properties of the first emulsion zone (such as material, thickness, wavelength related optical properties or the like) can be adapted to the optical specifications of the first optical element alone, but must not satisfy also the optical specifications of the second optical element. Vice versa, since the second optical element is only associated to the second light emitting element, which emits the second color, but is not associated with the first light emitting element, which emits the first color, the properties of the second emulsion zone (such as material, thickness, wavelength related optical properties or the like) can be adapted to the optical specifications of the second optical element alone, but must not satisfy also the optical specifications of the first optical element. This allows improving the optical specifications of the first and the second optical elements. As a result, the display device is of improved design.

The at least one second optical element may comprise at least two second optical elements. The second optical elements may be arranged offside the optical axis of the first optical element, in particular, with equal distances between the optical axis of the first optical element and the optical axis of each of the second optical elements or with equal distances between the center (in particular, of the geometrical area and/or the reflection area) of the first optical element and the center (in particular, of the geometrical area and/or the reflection area) of each of the second optical elements. The (in particular, geometrical area of and/or the reflection area of) the second optical elements may be arranged within one and the same plane, wherein the centers (in particular, of the geometrical area and/or the reflection area) of the second optical elements may thereby form, for example, an equilateral triangle or a square or the like.

As a technical effect and advantage, the second optical elements can be arranged around (in particular, even rotationally symmetrically with respect to) the first optical element. Thus, inside the exit pupil of the display device, the at least two second light spots representing the at least two second collimated light beams formed by the at least two second optical elements form a light spot pattern, which is arranged around the light spot pattern formed by the first light spot representing the first collimated light beam formed by the first optical element. In particular, the second light spots may be arranged around the centered first light spot such that the second light spots thereby form, for example, an equilateral triangle or a square or the like. Therefore, inside the exit pupil of the display device, the at least two second light spots can cover at least two different positions of the pupil of a user's eye, which are arranged around a center position, at which the first light spot is arranged, wherein the at least two different positions correspond to at least two different observation directions of the user's eye. This allows the realization of a plurality of similar sections of the light spot pattern for a number of different observation directions of the user's eye, which number corresponds to the number of second optical elements. Hence, for different observation directions of the users' eye, the user is able to see the image created by the display device. This allows realizing a display device having a large field of view. As a result, the display device is of improved design.

The first and the second optical element may be associated with a common (i.e. one and the same) light emitting element. The first optical element may be configured and arranged with respect to the common associated light emitting element to form, by first order deflection, diffraction and/or reflection, from the light emitted by the common associated light emitting element the first collimated light beam. The second optical element, which may be arranged neighboring to the first optical element, may be configured and arranged with respect to the common associated light emitting element to form, by second order deflection, diffraction and/or reflection, from the light emitted by the common associated light emitting element the second collimated light beam. In other words: The first optical element may be configured to create from the light emitted by the common associated light emitting element an image in the user's eye, when the eye is looking along a first observation direction, at which the pupil of the user's eye is positioned, during a proper use of the display device, in (a first spatial area representing) the first portion of the exit pupil, whereas the second optical element may be configured to ("purposely") create from the light emitted by the common associated light emitting element a (so-called "ghost") image is in the user's eye, when the eye is looking along a second observation direction, at which the pupil of the user's eye is positioned, during the proper use of the display device, in (a second spatial area representing) the second portion of the exit pupil. In particular, the first optical element may be arranged closer to the common associated light emitting element, whereas the second optical element may be arranged farther from the common associated light emitting element.

As a technical effect and advantage, for example, if the first and the second optical elements as well as a common light emitting element are configured and arranged such that the first collimated light beam passes through a first portion of an exit pupil of the display device and the second collimated light beam passes through a second portion of the exit pupil of the display device, then the light emitted by the common light emitting element not only is directed into the pupil of the user's eye, when positioned in (a first spatial area representing) the first portion of the exit pupil of the display device, but is also directed into the pupil of the user's eye, when the eye positioned in (a second spatial area representing) the second portion of the exit pupil of the display device. Thus, the light emitted by the light emitting element associated with the first optical element can reach the user's eye at different observation directions of the user's eye. Hence, the light emitted by this light emitting element can be used more effectively. This allows realizing a bright display device for displaying bright images. As a result, the display device is of improved design.

At least a part of the plurality of optical elements (in particular, the first and/or the "central" optical elements) as well as (at least a part of or all of) the associated light emitting elements may be configured and arranged such that, at least in one operating state of the display device, collimated light beams converge with respect to each other in such a manner that the collimated light beams are directed to an intersection point or intersection region, the intersection point or intersection region being located at or in the vicinity of a rotation point, about which a user's eye rotates when changing from a first observation direction to a second observation direction.

As a technical effect and advantage, always a part of the total number of collimated light beams, which leave the display device, can pass through the pupil of the users' eye. Therefore, for different observation directions of the users' eye, the user is able to see the image created by the display device. This allows realizing a display device having a large field of view. As a result, the display device is of improved design.

The display device may comprise a switchable deflecting device. The deflecting device may be configured to change (in particular, based on a switching of the deflecting device) a propagation direction of each collimated light beam between at least one first direction and at least one second direction. In particular, the deflecting device may be configured to change (or reflect or deflect or diffract) the propagation direction independently (i.e. individually) for each of a plurality of distinct groups of collimated light beams. A group of collimated light beams may comprise only one collimated light beam or two or more collimated light beams.

As a technical effect and advantage, the propagation direction of an arbitrary collimated light beam leaving the display device can be deflected and/or reflected in a desired propagation direction. For example, the deflecting device may be configured such that any collimated light beam leaving the display device enters the pupil of the user's eye. Hence, all or most of the light power of the display device can be collimated into the user's eye. Therefore, the light emitted by the light emitting element can be used more effectively. Thus, a gain in usable light quantity is obtained. This allows realizing a bright and energy efficient display device for displaying bright images and with low power requirements. Moreover, the deflection device can be used to recalibrate the above mentioned intersection point or intersection region. As a result, the display device is of improved design.

The display device, in particular, the deflecting device of the display device may comprise a plurality of switchable deflecting elements. Each deflecting element may be associated with at least one collimated light beam or with one of a plurality of distinct groups of collimated light beams. In particular, each deflecting element may be associated with one respective optical element and/or one respective light emitting element. A deflecting element may be switchable between an on-state, in which the deflecting element leaves a propagation direction of the collimated light beam unchanged such that this collimated light beam, after having passed the deflecting element, passes through a first portion of an exit pupil of the display device, and an off-state, in which the deflecting element changes (and/or diffracts and/or deflects and/or reflects) the propagation direction of the collimated light beam such that this collimated light beam, after having passed the deflecting element, passes through a second portion of the exit pupil of the display device, which is different from the first portion of the exit pupil of the display device. Alternatively, a deflecting element may be switchable between an off-state, in which the deflecting element leaves a propagation direction of the collimated light beam unchanged such that this collimated light beam, after having passed the deflecting element, passes through a first portion of an exit pupil of the display device, and an on-state, in which the deflecting element changes (and/or diffracts and/or deflects and/or reflects) the propagation direction of the collimated light beam such that this collimated light beam, after having passed the deflecting element, passes through a second portion of the exit pupil of the display device, which is different from the first portion of the exit pupil of the display device.

As a technical effect and advantage, when the user's eye changes from a first observation direction, in which the pupil of the user's eye is positioned in (a first spatial area representing) the first portion of the exit pupil of the display device, to a second observation direction, in which the pupil of the user's eye is positioned in (a second spatial area representing) the second portion of the exit pupil of the display device, the collimated light beam can pass, due to a corresponding switching of the deflecting device, through the pupil of the user's eye at different observation directions of the user's eye. Hence, all or most of the light power of the display device can be collimated into the user's eye. Thus, the light emitted by the light emitting elements can be used more effectively. This allows realizing a bright and energy efficient display device for displaying bright images and with low power requirements. As a result, the display device is of improved design.

The deflecting device, a deflecting element and/or (some of or all) the deflecting elements may be or may comprise a liquid crystal display, a liquid lens or the like. In particular, the deflecting device, a deflecting element and/or (some of or all) the deflecting elements may be configured to change a propagation direction of each collimated light beam between at least one first direction and at least one second direction based on, in particular, a polarization (or a polarization state) of the light of the collimated light beam.

For example, the deflecting device, a deflecting element and/or (some of or all) the deflecting elements may be or may comprise a liquid crystal polarization grating (short: LCPG). Such an LCPG is, for example, described in section 2.2 "Liquid Crystal Polarization Grating Basics" and FIG. 2 of:

Jihwan Kim, Chulwoo Oh, Michael J. Escuti, Lance Hosting and Steve Serati, "Wide-angle, nonmechanical beam steering using thin liquid crystal polarization gratings", Advanced Wavefront Control: Methods, Devices, and Applications VI, edited by John D. Gonglewski, Richard A. Carreras, Troy A. Rhoadarmer, Proc. of SPIE Vol. 7093, 709302, (2008), doi:10.1117/12.795752 (in the following abbreviated as Kim et al.).

The disclosure of Kim et al. is incorporated by reference herein. For any feature disclosed in Kim et al., to which it is referred by the present application, it may be sought protection. Any feature disclosed in Kim et al., to which it is referred by the present application, may help to achieve the invention's technical aim and thus may form part of the solution to one or all the technical problems underlying the invention claimed. Further, any feature disclosed in Kim et al., to which it is referred by the present application, belongs to the description of the present invention contained in the present application and thus to the content of the application as filed. Also, any feature disclosed in Kim et al., to which it is referred by the present application, is precisely defined by employing the language of Kim et al. and identified within the total technical information contained in the reference document Kim et al. by reference to a specific section of Kim et al.

The deflecting device, a deflecting element and/or (some of or all) the deflecting elements may comprise an active (switchable) polarization grating (short: APG) and/or a liquid crystal (LC) half-waveplate as defined in Kim et al. in section "3. SINGLE LCPG STEERING STAGE" and, in particular, in FIG. 5(a) of Kim et al.

Such an APG, or more general, such an LCPG comprising such an APG may be configured to function as a fine angle steering module as defined in Kim et al. in section "2.3 Fine Angle Steering Module" and/or as a beam steering element (i.e. deflecting element) as defined in Kim et al. in section "3. SINGLE LCPG STEERING STAGE". In other words: The APG may be configured, in the off-state of the APG (corresponding to the off- or on-state of the deflecting element), to deflect or diffract the light (i.e. to change (or deflect or reflect) the propagation direction of the collimated light beam entering the APG, see FIGS. 2(d) and 2(e) of Kim et al.), and, in the on-state of the APG (corresponding to the on- or off-state of the deflecting element, respectively), not to deflect or diffract the light (i.e. to leave the propagation direction of the collimated light beam entering the APG unchanged, see FIG. 2(f) of Kim et al.). Moreover, the APG may be configured, in the off-state of the APG, to deflect or diffract light of the collimated light beam having a first circular polarization in a first direction and/or to deflect or diffract light of the collimated light beam having a second circular polarization in a second direction (see FIGS. 2(d), 2(e) and 5(a) of Kim et al.). The first and the second direction may be different. If the light of the collimated light beam entering the APG is not (yet) polarized, the APG may be configured, in the-off state, to deflect or diffract both the light of the collimated light beam having the first circular polarization and the light of the collimated light beam having the second circular polarization (see FIG. 5(a) of Kim et al.). The first polarization may be right handed circular polarization as defined in Kim et al. in FIG. 5, and the second polarization may be left handed circular polarization as defined in Kim et al. in FIG. 5, or vice versa.

In particular, the APG may be configured to deflect the light of the collimated light beam entering the APG by a discrete angle of deflection, which may be, for example, ±0°, ±5°, ±10° or ±11° or the like (see Table 3 of Kim et al.; "±" refers to the first and the second circular polarization, respectively). The discrete angle of deflection may be arbitrarily set as defined in Kim et al. in section "2.2 Liquid Crystal Polarization Grating Basics" and equation (3) of Kim et al.

For example, the deflecting device may comprise a plurality of APGs. Each of these APGs may be arranged as a layer or as a "stage" as defined in Kim et al. in section "4.1 Simple Coarse Steerer Design", FIG. 6, section "4.2 Improved Coarse Steerer Design" and FIG. 7. In particular, the deflecting device may be an arrangement of a set of APG layers or stages being stacked or cascaded to implement a coarse, wide-angle beam steering system with an increased operation range as defined in Kim et al. in section "4. COARSE STEERER DESIGN OPTIONS" and FIGS. 6 and 7. The plurality of APGs may differ from each other by their specific angle of deflection. Moreover, the plurality of APGs may be arranged such that the total deflection angle of the deflecting device is switchable between different discrete total deflection angles as defined in Kim et al. in section "4.1 Simple Coarse Steerer Design" and section "4.2 Improved Coarse Steerer Design".

As a technical effect and advantage, an arbitrary direction of the collimated light beam leaving the deflection device can be set. This allows the realization of a range of selectable deflection angles. As a result, the display device is of improved design. Also, for realizing the deflection function of the deflecting device and/or of the deflecting elements, it must not be used a hologram and/or holographic optical element. In this regard, the deflection device of the present disclosure may represent an alternative to deflecting devices, which (in particular, only) rely on holograms and/or holographic optical element.

For example, the deflection device may comprise, arranged along the propagation direction of the collimated light beam in the following order, a first APG layer 1 having a deflection angle of, for example, 1°, a second APG layer 2 having a deflection angle of, for example, 5° and a third APG layer 3 having a deflection angle of, for example, 11°. Depending on the on/off-state of the single APG layers 1, 2 and 3, the following total deflection angles may be realized for a single circular polarization (Table 1):

| N | Deflection angle by APG layer 1 | Deflection angle by APG layer 2 | Deflection angle by APG layer 3 | Total angle of deflection |
|---|---|---|---|---|
| 1 | 0° (state: on) | 0° (state: on) | 0° (state: on) | 0° |
| 2 | 1° (state: off) | 0° (state: on) | 0° (state: on) | 1° |
| 3 | 0° (state: on) | 5° (state: off) | 0° (state: on) | 5° |
| 4 | 1° (state: off) | 5° (state: off) | 0° (state: on) | 6° |
| 5 | 0° (state: on) | 0° (state: on) | 11° (state: off) | 11° |
| 6 | 1° (state: off) | 0° (state: on) | 11° (state: off) | 12° |
| 7 | 0° (state: on) | 5° (state: off) | 11° (state: off) | 16° |
| 8 | 1° (state: off) | 5° (state: off) | 11° (state: off) | 17° |

The deflecting device may comprise a polarization setting device for setting the polarization of the light of the collimated light beam, for example, to (in particular, purely) left handed circular polarization or (in particular, purely) right handed circular polarization. To this end, the polarization setting device may comprise a half-waveplate and/or a quarter-waveplate. The polarization setting device may be switchable for switching the polarization of the light of the collimated light beam passing through the polarization setting device between (in particular, purely) left handed circular polarization and (in particular, purely) right handed circular polarization. To this end, the polarization setting device may comprise one or more Pockels cells. The control unit may be configured to switch the polarization setting device. The deflecting device may comprise a plurality of polarization setting devices. A polarization setting device may be associated with one respective optical element and/or one respective deflecting element. In particular, a polarization setting device may be arranged, along the propagation direction of the collimated light beam, (for example, directly) downstream of an optical element and/or between the associated optical element and the associated deflecting element.

As a technical effect and advantage, depending on the circular polarization of the light of the collimated light beam, the deflection direction, i.e. the sign (either "+" or "−") of the deflection angle, of the collimated light beam leaving the deflection device can be set. This allows an enlargement of the range of selectable deflection angles. Additionally, no light power/intensity is wasted by deflection into a direction, along which the light would not enter the pupil of the user's eye. As a result, the display device is of improved design.

For example, the deflection device may comprise, arranged along the propagation direction of the collimated light beam in the following order, a polarization setting device, a first APG layer 1 having a deflection angle of, for example, 1°, a second APG layer 2 having a deflection angle of, for example, 5° and a third APG layer 3 having a deflection angle of, for example, 11°. Depending on the polarization of the light of the collimated light beam set by the polarization setting device and depending on the on/off-state of the single APG layers 1, 2 and 3, the following total deflection angles may be realized (Table 2):

| N | Deflection angle by APG layer 1 | Deflection angle by APG layer 2 | Deflection angle by APG layer 3 | Total angle of deflection |
|---|---|---|---|---|
| 1 | 0° (state: on) | 0° (state: on) | 0° (state: on) | 0° |
| 2 | 1° (state: off) | 0° (state: on) | 0° (state: on) | 1° and/or −1° |
| 3 | 0° (state: on) | 5° (state: off) | 0° (state: on) | 5° and/or −5° |
| 4 | 1° (state: off) | 5° (state: off) | 0° (state: on) | (1° + 5°) = 6° and/or (−1° − 5°) = −6° |
| 5 | 0° (state: on) | 0° (state: on) | 11° (state: off) | 11° and/or −11° |
| 6 | 1° (state: off) | 0° (state: on) | 11° (state: off) | (1° + 11°) = 12° and/or (−1° − 11°) = −12° |
| 7 | 0° (state: on) | 5° (state: off) | 11° (state: off) | (5° + 11°) = 16° and/or (−5° − 11°) = −16° |
| 8 | 1° (state: off) | 5° (state: off) | 11° (state: off) | (1° + 5° + 11°) = 17° and/or (−1° − 5° − 11°) = −17° |

In other words: It can be used the light emitted by the light emitting element as it is (i.e. not purely polarized so far) and, in this case, two directions of deflection after passing the first off-state APG layer 1 emerge. Then, after passing the first off-state APG layer 1, the light beam can be split up in a purely left handed circular polarized part and a purely right handed circular polarized part and thus no additional splitting of the beams occur, when passing through the second and/or third APG layer 2, 3.

In turn, the light emitted by the light emitting element can be polarized to be purely (left or right handed) circular polarized by the polarization setting device before entering the deflecting elements and, in that case, only one direction of deflection emerges (as presented in Table 1), but the light beam is not split up when passing the first, second and/or third APG layer 1, 2, 3.

Further, the display device may comprise a control unit for switching the deflecting device and/or the deflecting elements based on the position signal generated by the (above described) image capturing device of the display device. In particular, the control unit may be configured to switch the deflecting device based on the position signal generated by the image capturing device such that the propagation directions of the collimated light beams are changed by the deflecting device in such a manner that (in particular, all) the collimated light beams, which leave the display device, pass through a portion of the exit pupil of the display device, in which portion of the exit pupil of the display device the pupil of the user's eye is presently positioned. More specifically, the control unit may be configured to set, when the pupil of the user's eye is positioned in (a first spatial area representing) the first portion of the exit pupil of the display device, only these deflecting elements, by which in their on-state or their off-state the collimated light beams (would) pass through the second portion of the exit pupil of the display device, in the off-state and the on-state, respectively, such that the collimated light beams, which leave these deflecting elements, pass through the first portion of the exit pupil of the display device. Similarly, the control unit may be configured to set, when the pupil of the user's eye is positioned in (a second spatial area representing) the second portion of the exit pupil of the display device, only those deflecting elements, by which in their on-state or off-state the collimated light beams (would) pass through the first portion of the exit pupil of the display device, in the off-state and on-state, respectively, such that the collimated light beams, which leave those deflecting elements, pass through the second portion of the exit pupil of the display device.

As a technical effect and advantage, due to a corresponding switching of the deflecting elements, all or at least most of the collimated light beams, which leave the display device, pass through the pupil of the user's eye, even when the eye is moving, for example, by changing from a first to a second observation direction. Hence, the light emitted by the light emitting elements can be used more effectively. This allows realizing a bright and energy efficient display device for displaying bright images and with low power requirements. As a result, the display device is of improved design.

The display device may comprise a see-through member having a see-through area. The see-through member may include the array of light emitting elements. The light emitting elements may be provided within the see-through area in a mutually spaced manner such that the see-through area includes a light (in particular, visible light) transparent see-through zone between each pair of adjacent light emitting elements. The light emitting elements may be transparent or substantially transparent for light, for example, by forming the light emitting elements by use of transparent organic light emitting diodes (OLEDs) and/or transparent transistors. The see-through member may further include the plurality of optical elements provided within the see-through area. Each light emitting element may be located in a focal plane of the associated optical element. The plurality of optical elements may represent the collimating optical system of the display device. A light emitting element may be configured to emit light of (in particular, purely) left handed circular polarization, (in particular, purely) right handed circular polarization and/or (arbitrary oriented) linear polarization. For example, the light emitting elements may be realized as or may comprise a laser device. In this case, the light emitted from the light emitting elements is already polarized.

As a technical effect and advantage, the see-through zone between each pair of adjacent light emitting elements allows light to pass through the see-through member and/or the (substantially) transparent light emitting elements. Thus, light can pass between each pair of adjacent light emitting elements via the see-through zone and/or the light emitting elements themselves. Since the plurality of the light emitting elements forms the display of the display device, both light emitted by the display itself and light from the physical world can pass through the display device. Hence, the display or, more generally, the display device is transparent or at least semi-transparent. Therefore, it is possible to provide the display device directly in the line of sight or in the field of view of the user, who uses the display device, for augmented reality vision. As a result, the display device is of improved design.

Throughout this description, when referring to a feature characterizing an element of a plurality of elements (such as, for example, an optical element and/or a light emitting element), one, at least one or each of the plurality of elements may be characterized by the corresponding feature.

Figure 2B:
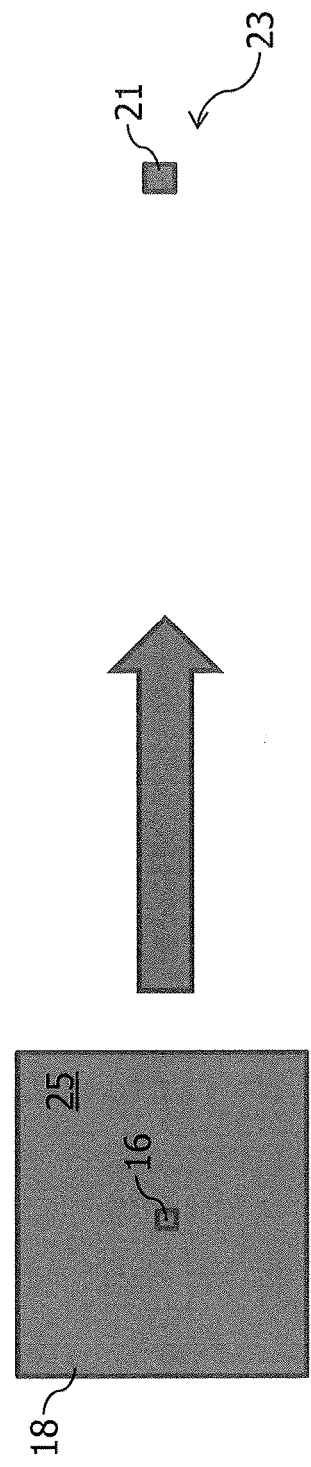
Figure 3A:
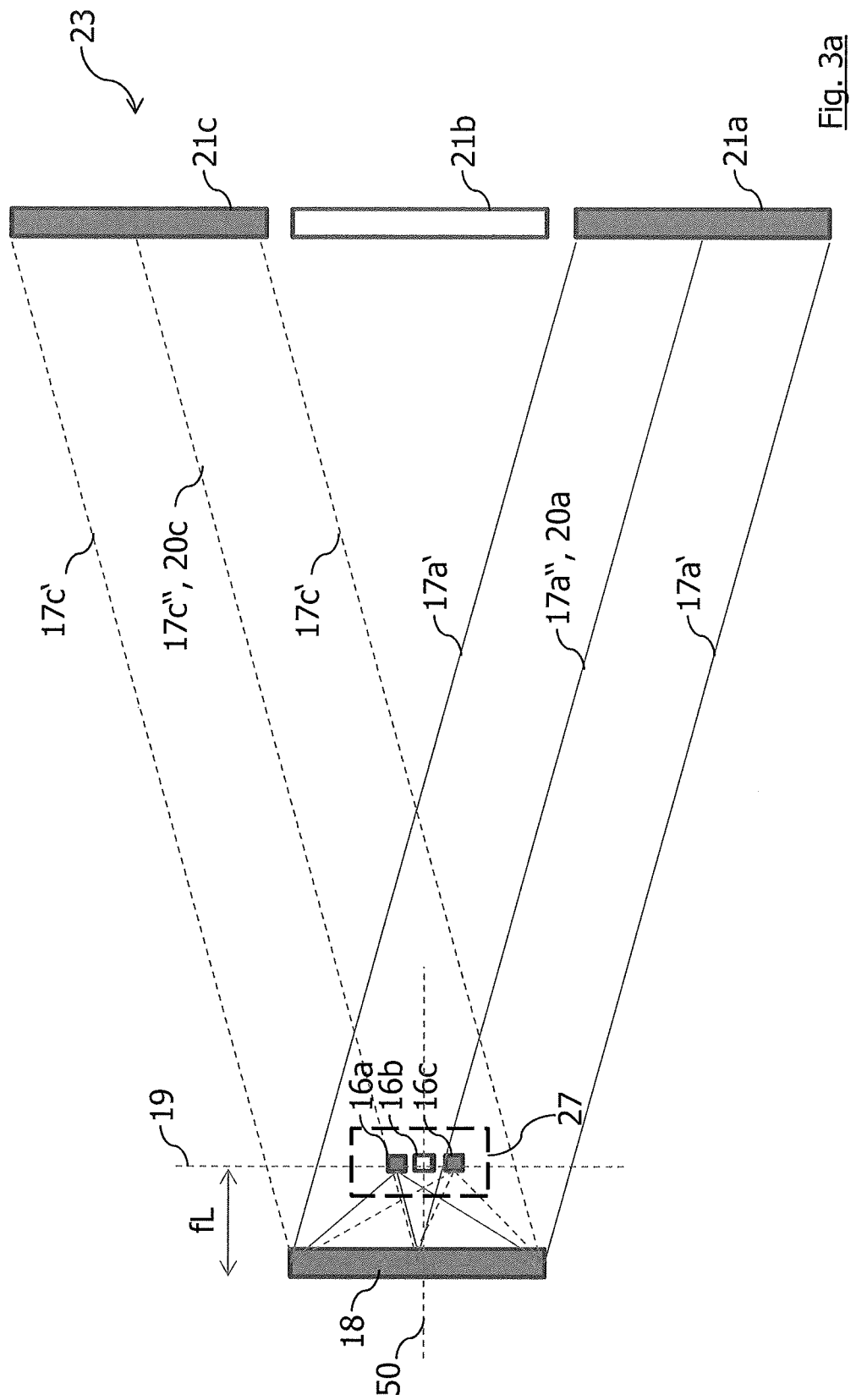
Figure 5:
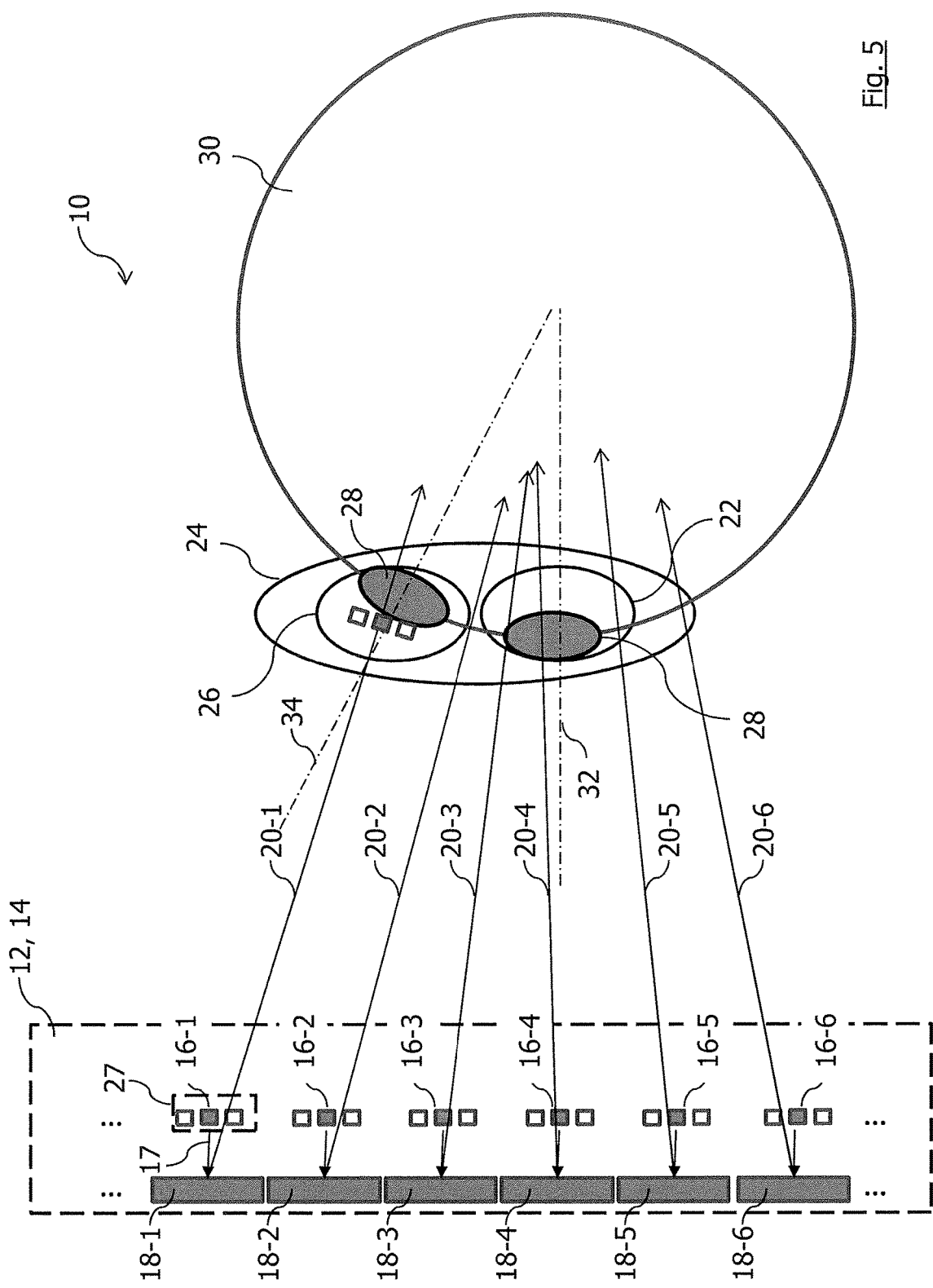
Figure 6:
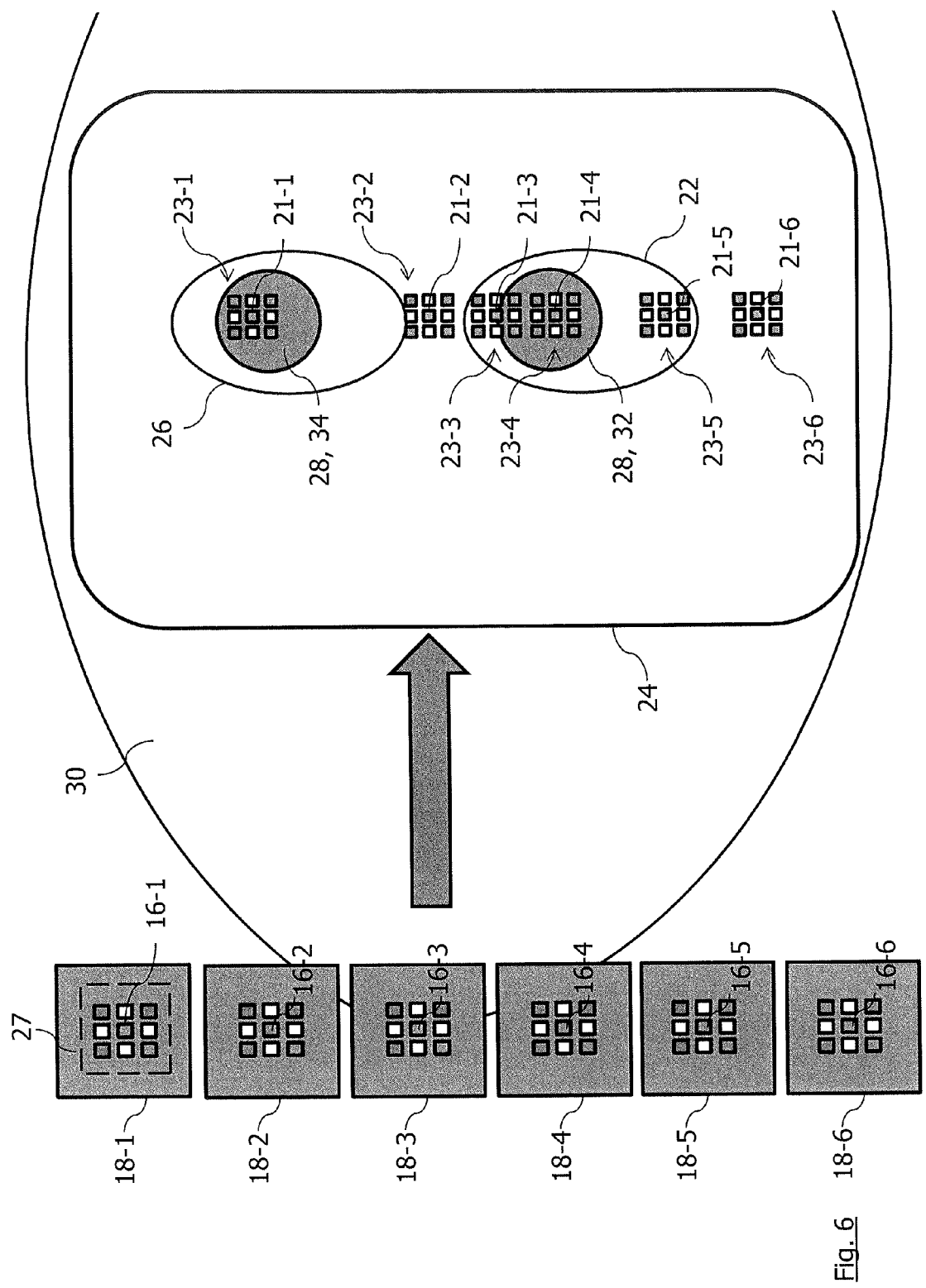
Figure 11:
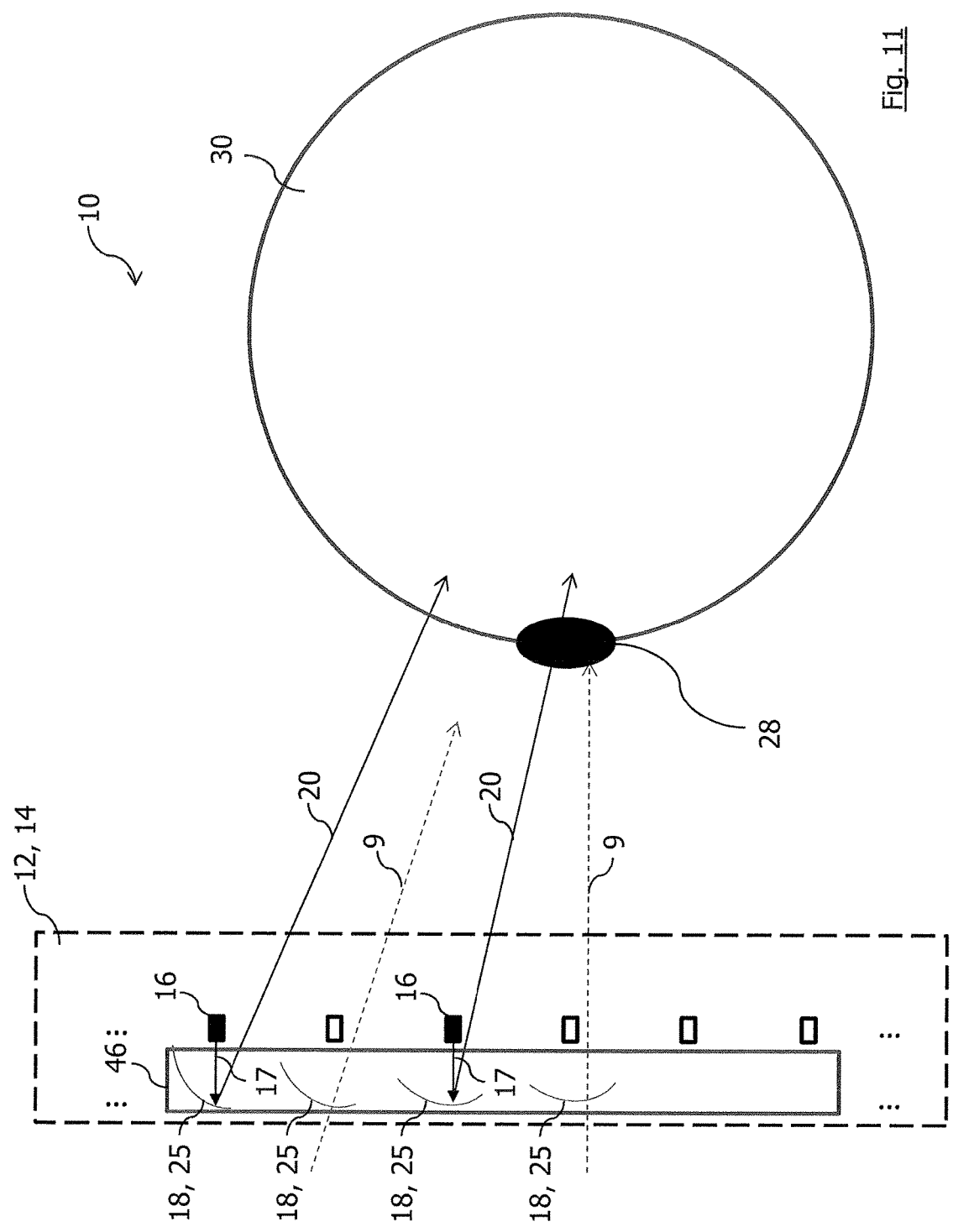
Figure 12:
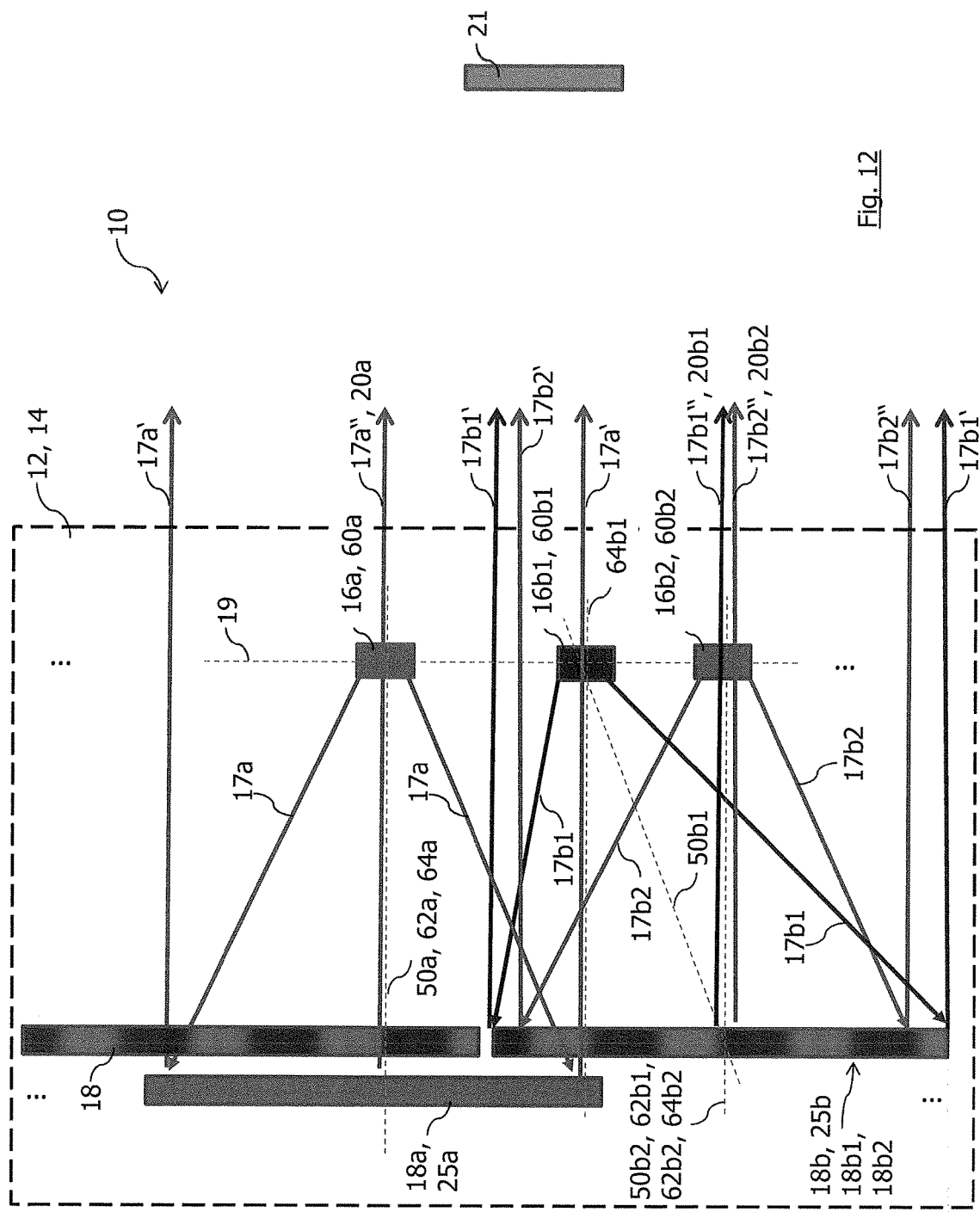
Figure 13A:
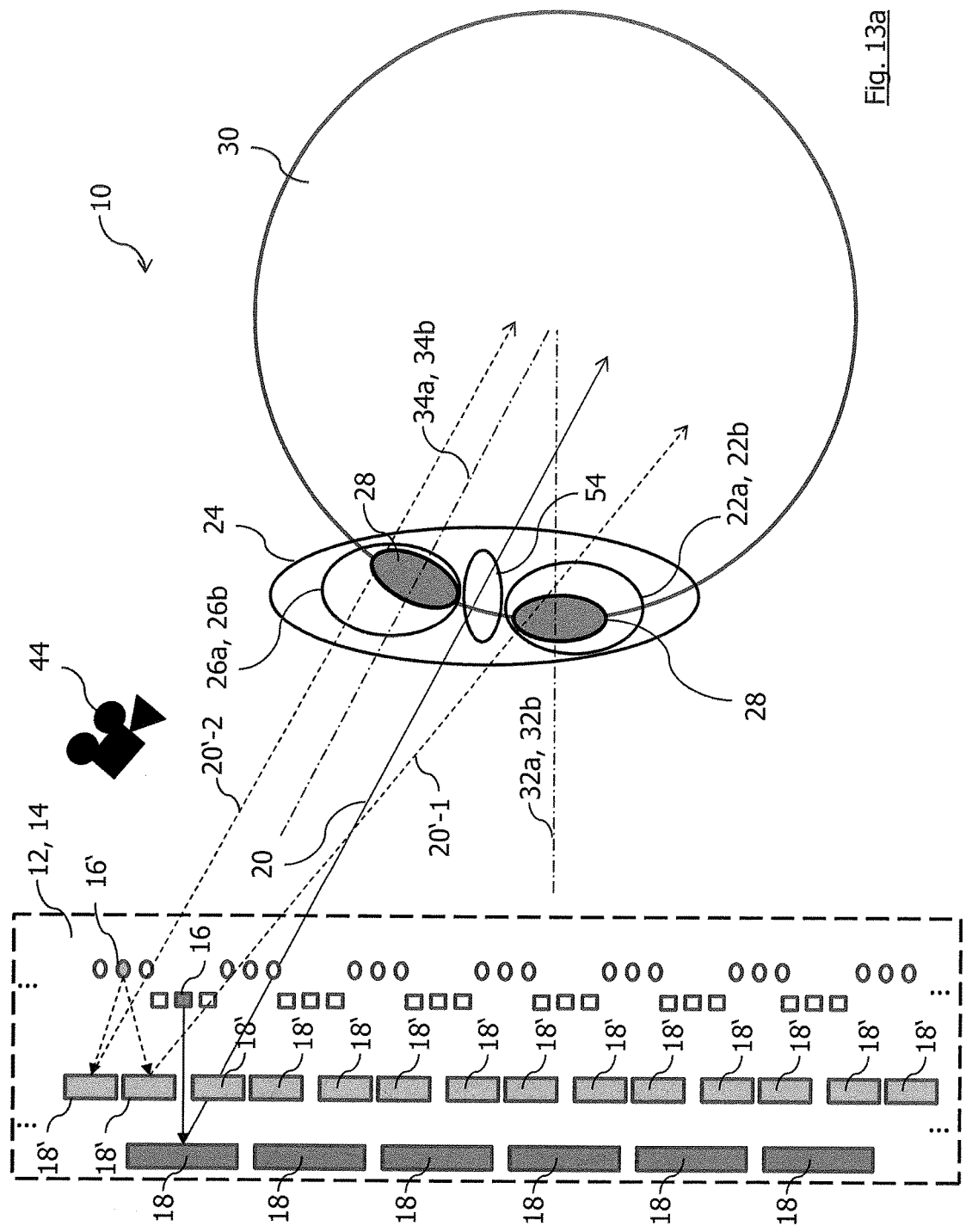
Figure 13C:
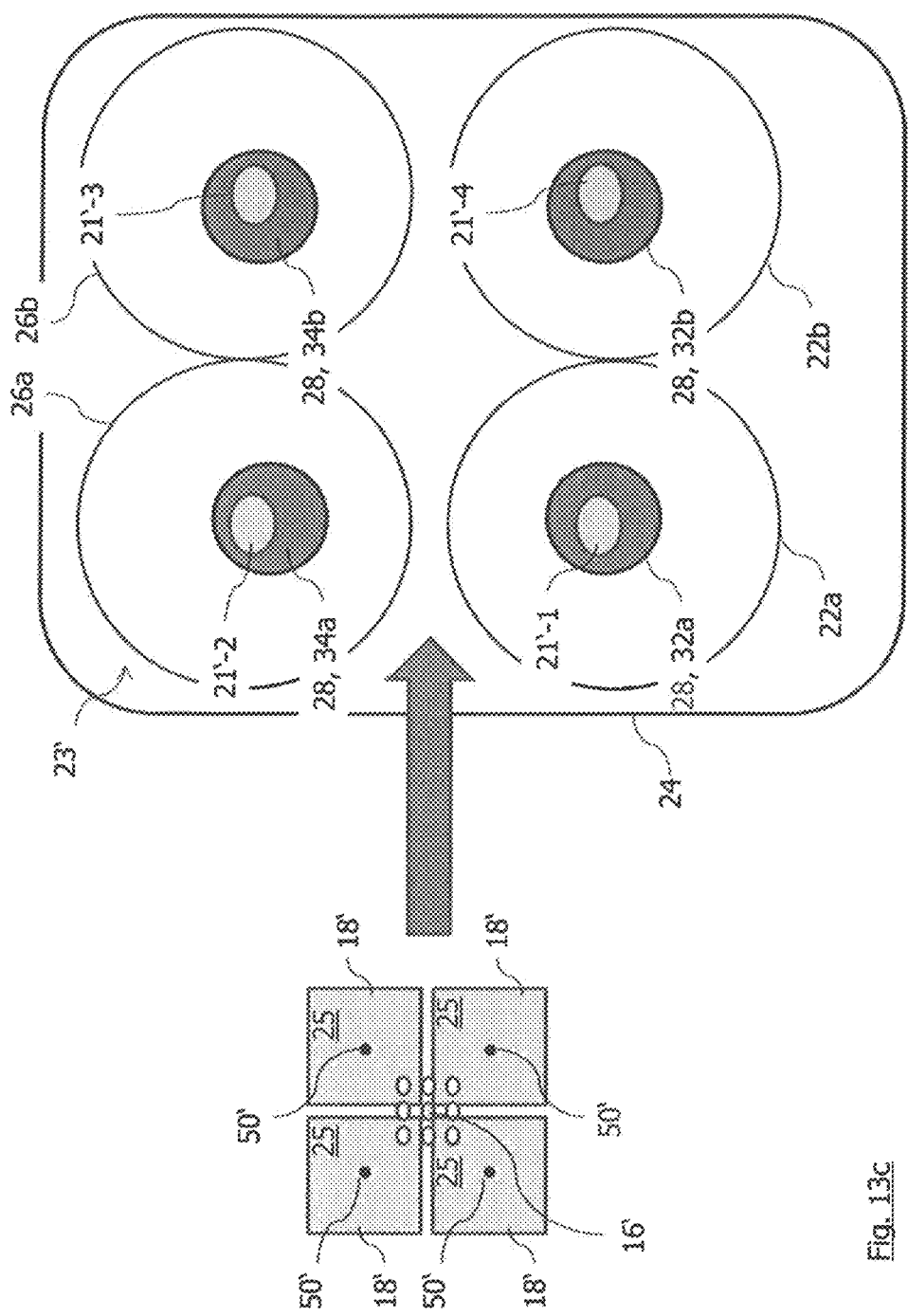
Figure 13D:
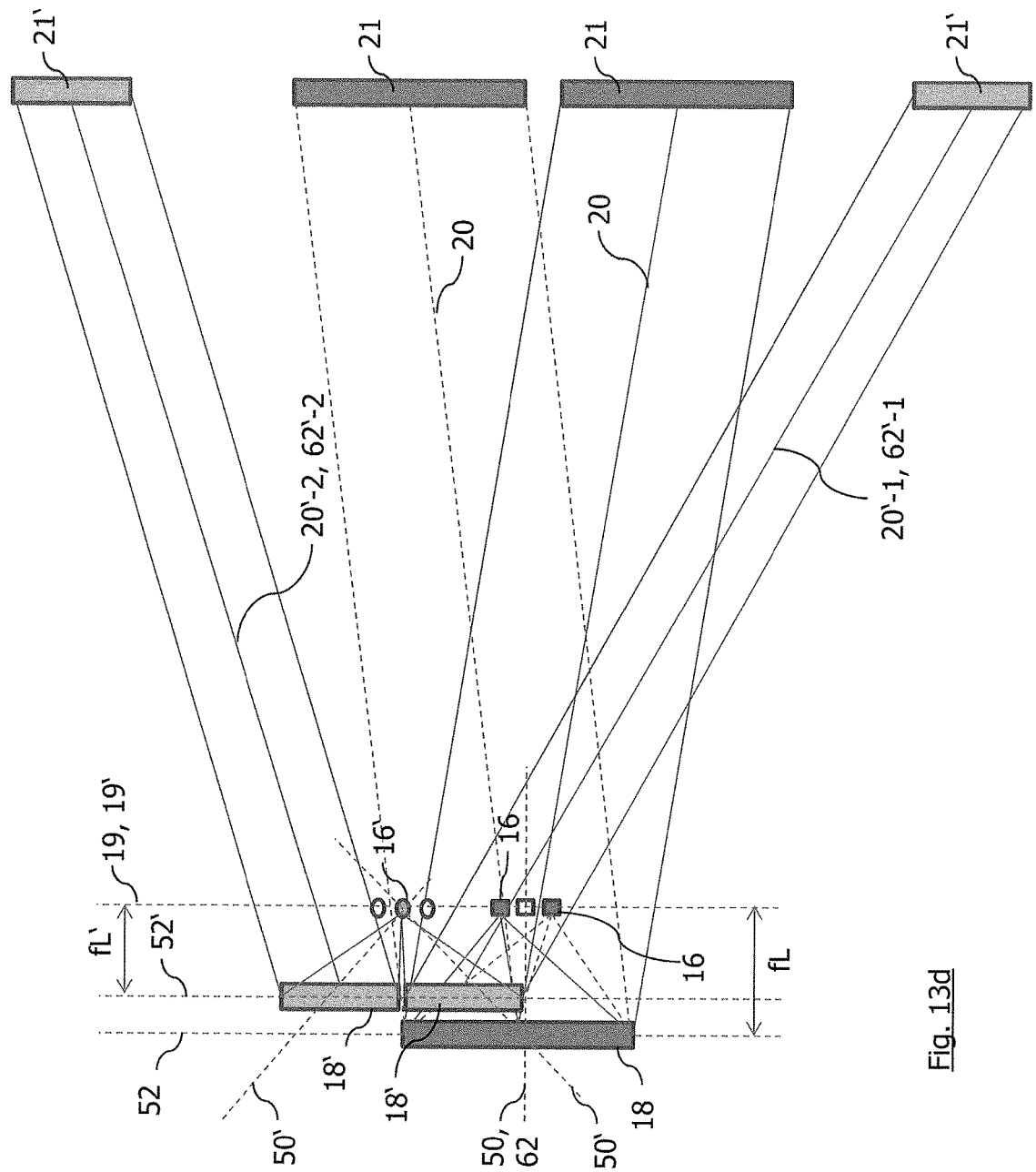
Figure 13E:
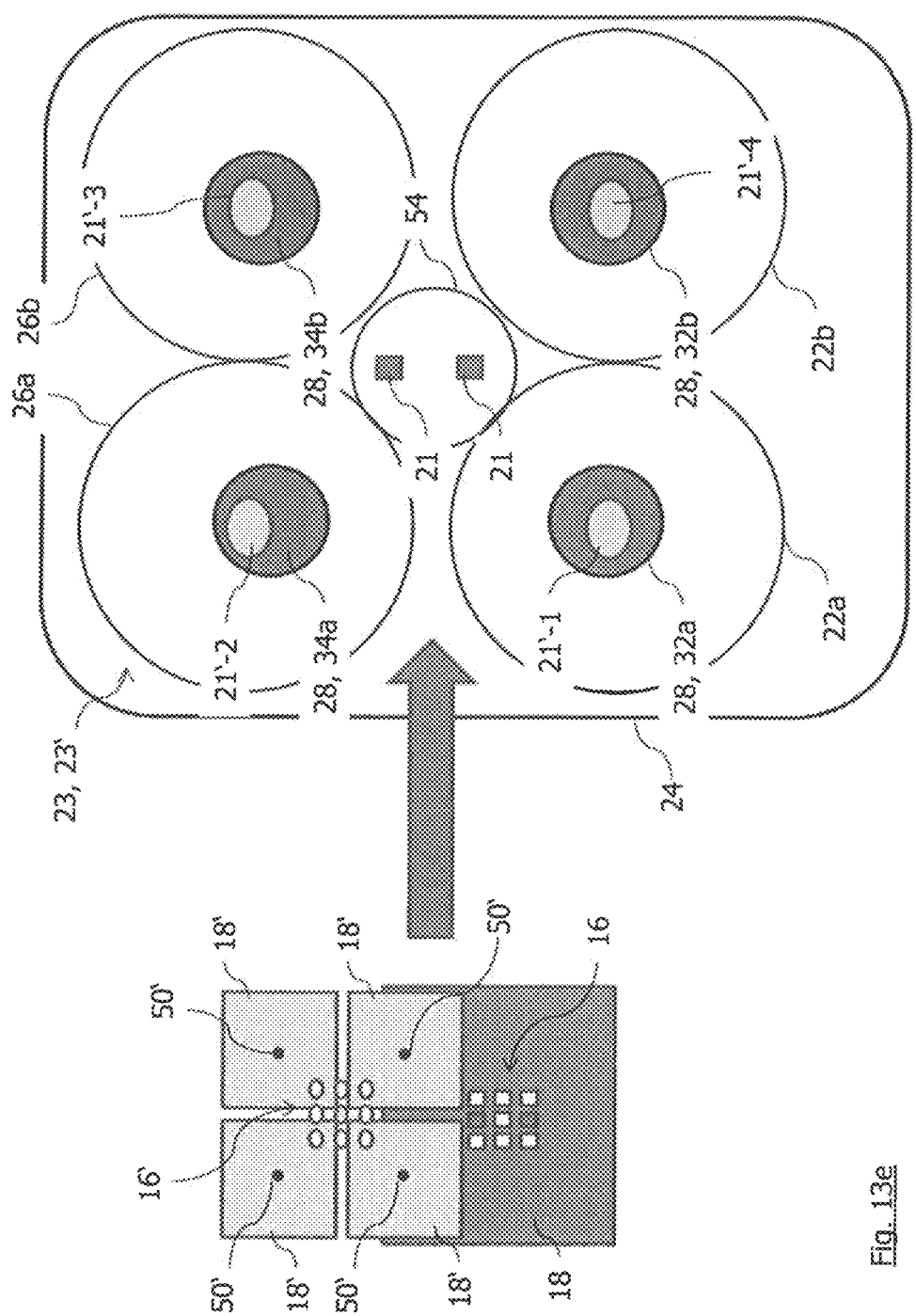
Figure 13F:
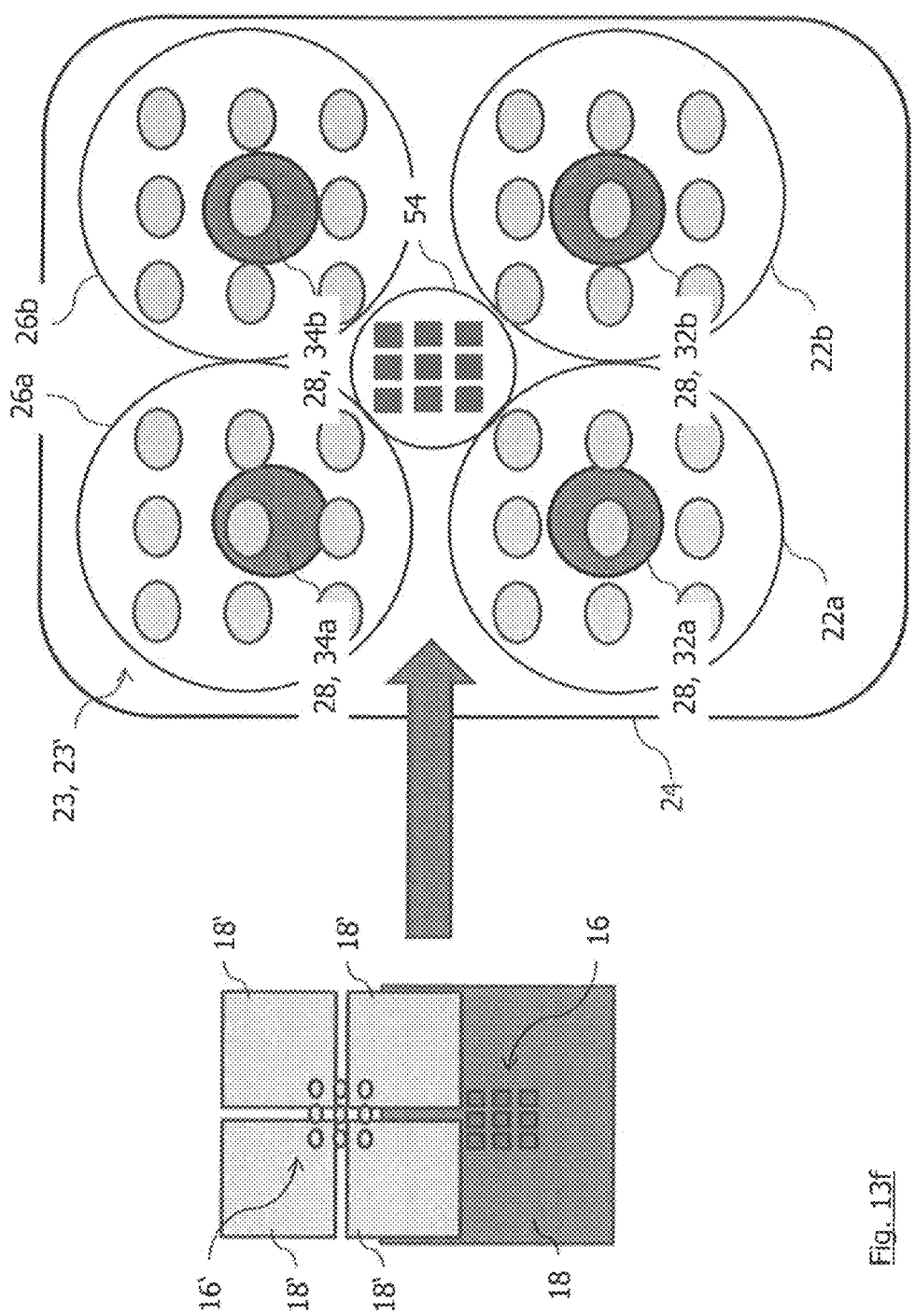
Figure 13G:
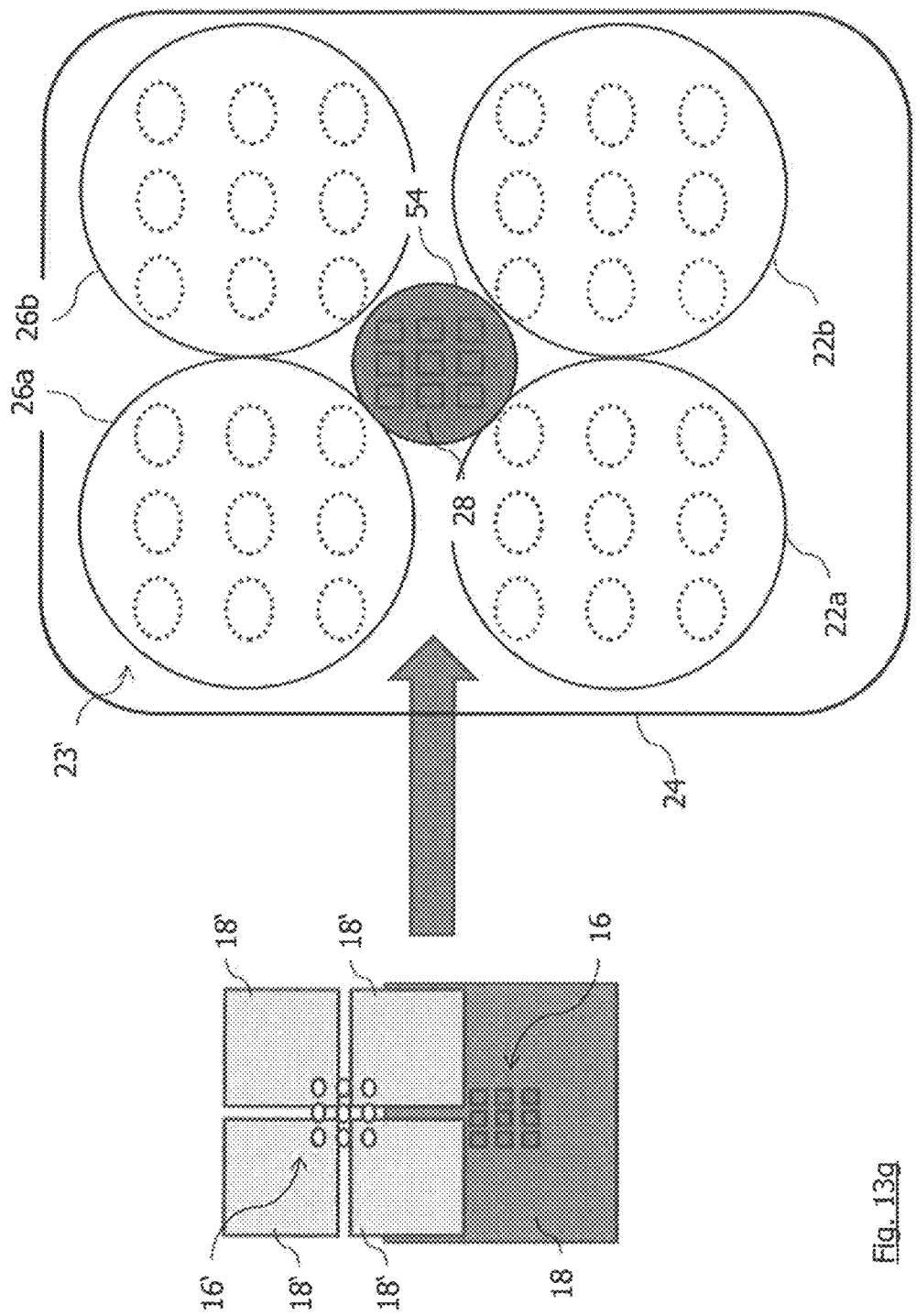
Figure 13H:
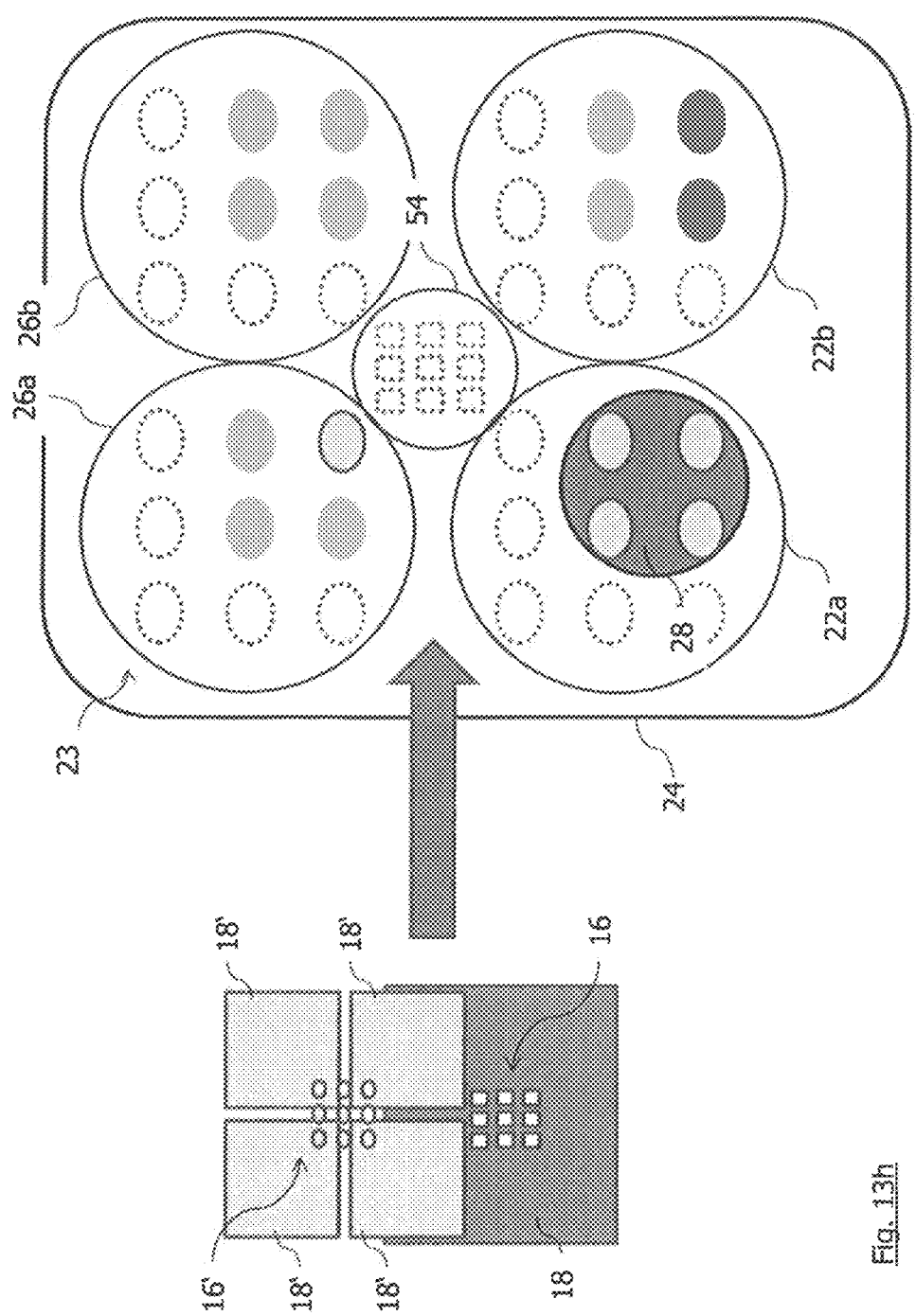
Figure 14A:
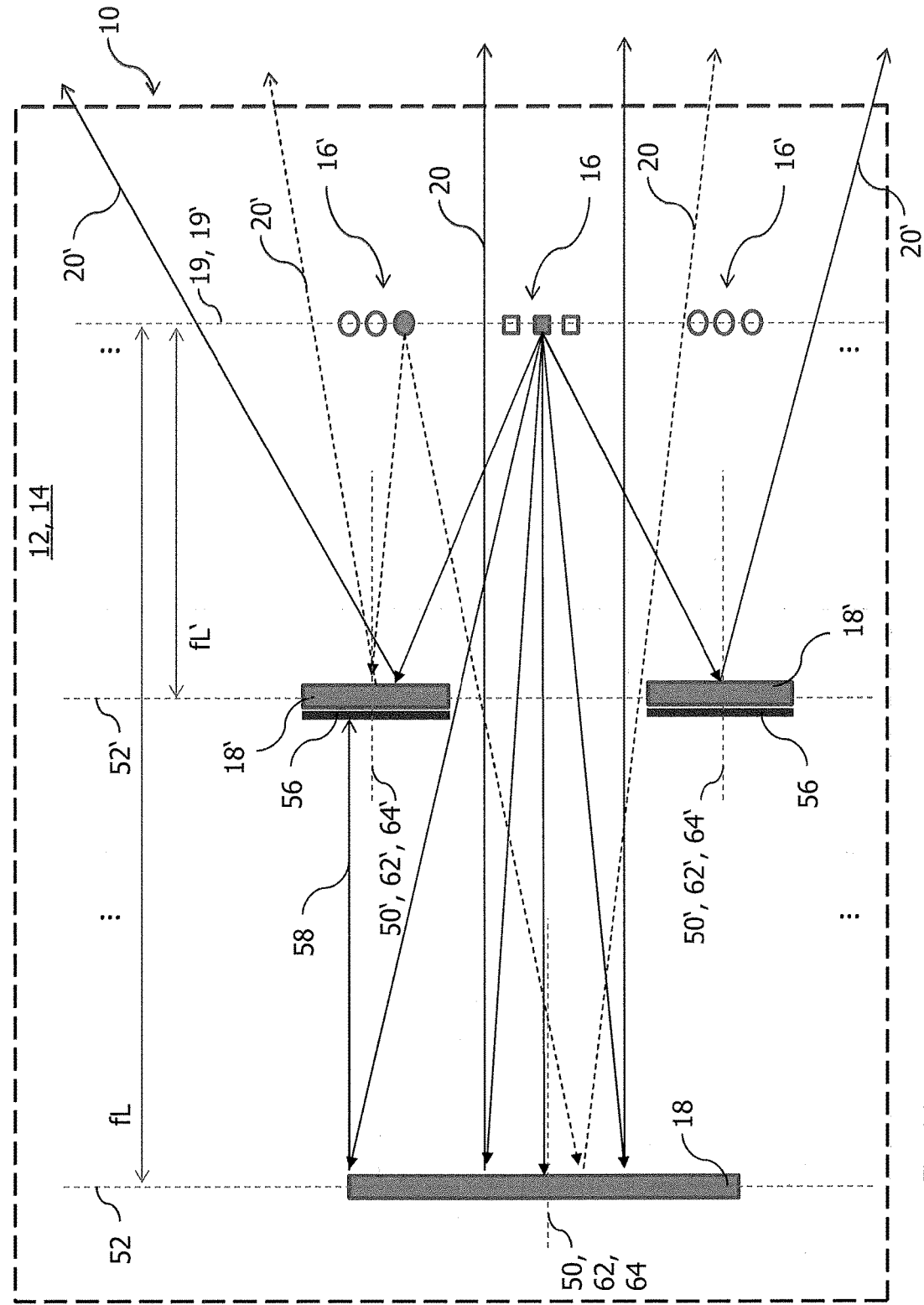
Figure 14B:
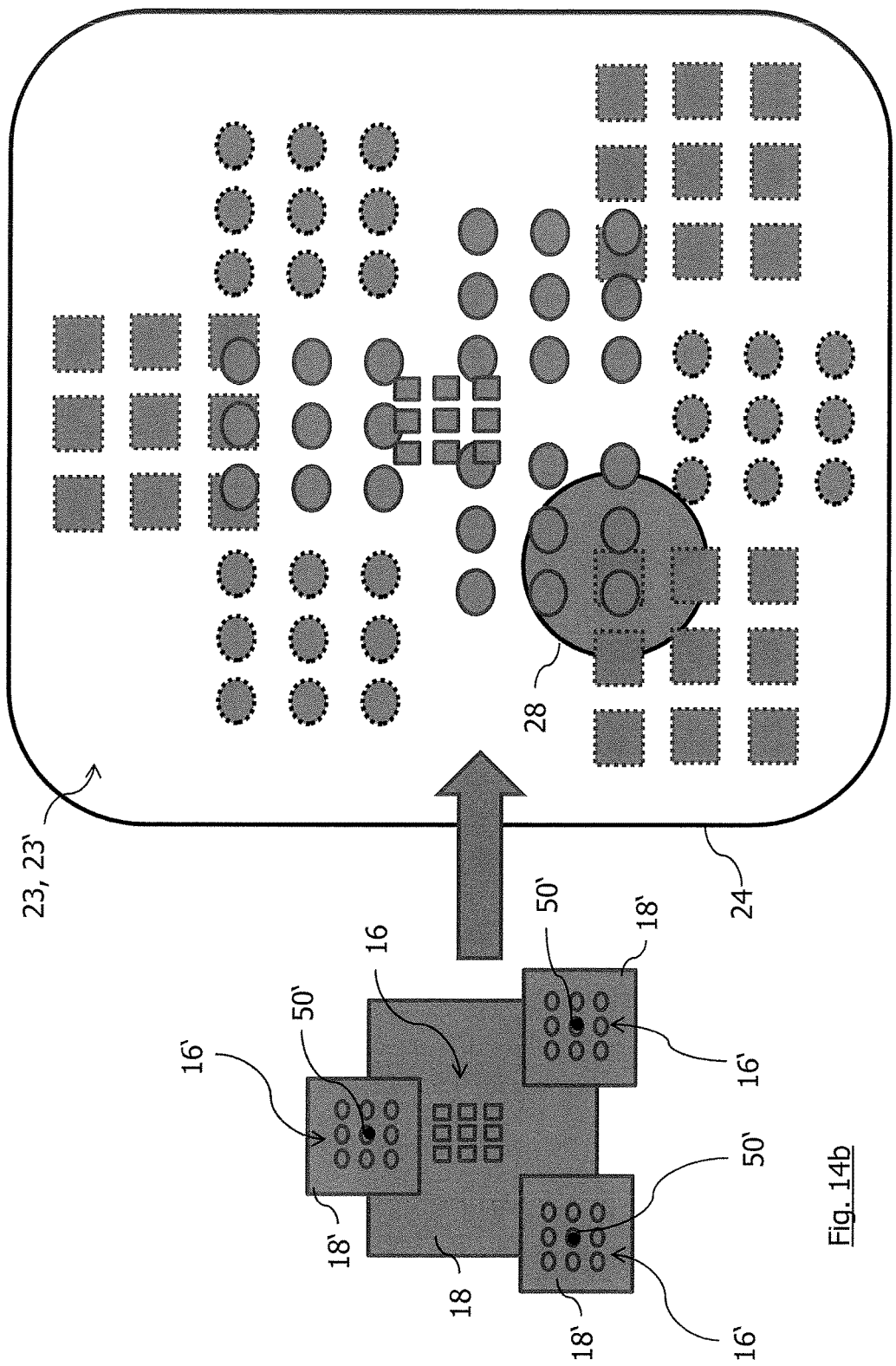

Further features, advantages and technical effects of the invention will become apparent from the following description of exemplary embodiments with reference to the accompanying drawings, in which:

FIG. 1 shows schematically in side view a first example of a display device,

FIG. 2a shows schematically in side view a first example of an optical element and an associated light emitting element, FIG. 2b shows schematically in front view the optical element and the associated light emitting element of FIG. 2a, FIG. 3a shows schematically in side view a second example of an optical element and associated light emitting elements, FIG. 3b shows schematically in front view the optical element and the associated light emitting element of FIG. 3a, FIG. 4 shows schematically in front view a third example of an optical element and associated light emitting elements, FIG. 5 shows schematically in side view a second example of a display device, FIG. 6 shows schematically in front view the display device of FIG. 5, FIG. 7 shows schematically in side view a third example of a display device, FIGS. 8a-8d show schematically in side view a fourth example of a display device, FIG. 9 shows schematically in side view a fifth example of a display device, FIG. 10 shows schematically in side view a sixth example of the display device, FIG. 11 shows schematically in side view a seventh example of a display device, FIG. 12 shows schematically in side view an eighth example of a display device, FIG. 13a shows schematically in side view a ninth example of a display device, FIG. 13b shows schematically in side view a fourth example of optical elements and associated light emitting elements, FIG. 13c shows schematically in front view the optical elements and the associated light emitting elements of FIG. 13b, FIG. 13d shows schematically in side view a fifth example of optical elements and associated light emitting elements, FIG. 13e-13h shows schematically in front view the optical elements and the associated light emitting elements of FIG. 13d, FIG. 14a shows schematically in side view a sixth example of optical elements and associated light emitting elements, FIG. 14b shows schematically in front view the optical elements and the associated light emitting elements of FIG. 14b, and FIG. 15a-c show schematically in side view a seventh example of an optical element and an associated light emitting element.

In FIGS. 1, 5, 7 to 13a and 14a a display device 10 is shown. The display device 10 comprises a see-through member 12 having a see-through area 14. The see-through member 12 represents, for example, a viewing port, a wind shield or a window of a vehicle, a visor of a helmet, a glass, an eyepiece of glasses, a corrective lens, a spectacle lens or the like.

The see-through member 12 includes an array of light emitting elements 16. Exemplarily, only some of the light emitting elements 16 are shown and are schematically indicated as small rectangles and/or small circles/ellipses. Further light emitting elements 16 are indicated by dots (see FIGS. 1, 5, 7 to 13a and 14a). The array of light emitting elements 16 may be provided within the see-through area 14 in a mutually spaced and non-overlapping manner such that the see-through area 14 includes a visible light transparent see-through zone 15 between (some or all) pairs of adjacent light emitting elements 16 (see, as an example, FIG. 1). Each light emitting element 16 emits visible light 17.

The display device 10 also comprises a plurality of optical elements 18, which are schematically shown as elongated rectangles (e.g., see FIG. 1) or curved lines (see FIG. 11). The optical elements 18 receive light 17 from the array of light emitting elements 16. In particular, each optical element 18 is associated with at least one respective light emitting element 16 and forms from the light 17 emitted by the associated light emitting element 16 at least one collimated light beam 20 (see, in particular, FIG. 1). In the figures, a single collimated light beam 20 is schematically indicated by a single long arrow (see FIGS. 1, 5, 7 to 13a and 14a) and/or by two or more parallel long arrows 17', 17" (see FIGS. 2a, 3a and 12). Each light emitting element 16 is located in a focal plane 19 of the associated optical element 18 (compare, in particular, FIGS. 2a, 3a, 12, 13b, 13d, 14a and 15a to 15c). In this regard, the plurality of optical elements 18 represents a collimating optical system of the display device 10. Further optical elements 18 are also indicated by dots (see FIGS. 1, 5, 7 to 13a and 14a).

Due to the collimated light beams 20 leaving the display device 10, the display device 10 allows that a user can accommodate his/her vision to (almost) infinity. For example: The image of the display device 10 can be represented by the collimated light beams 20 leaving the display device 10 in the direction to the pupil 28 of the user's eye(s) 30 (see FIGS. 5, 7 to 11 and 13a), where it is focused by the human lens, which is accommodated to infinity, on the retina. In this sense, the collimated light beams 20 emitted by the display device 10 can create an image at (or, at least, almost at) infinite distance.

Furthermore, as a consequence of the see-through zones 15 between pairs of light emitting elements 16, light can pass between these pairs of adjacent light emitting elements 16 via the see-through zone 15. Hence, both light 17 emitted by the display device 10 itself and light 9 from the physical world (see, as an example, FIG. 11) can pass through the display device 10. Thus, the display or, more generally, the display device 10 is transparent or at least semi-transparent. Therefore, it is possible to provide the display device 10 directly in the line of sight or in the field of view of the user, who uses the display device 10, for augmented reality vision.

In general, the optical element 18 reflects/deflects/refracts/diffracts visible light only within a deflection spectrum, which only covers a spectral section of the visible light spectrum, and is transparent for visible light within a transmission spectrum, which only covers a spectral section of the visible light spectrum, wherein the deflection spectrum and the transmission spectrum do not overlap (i.e. they are spectrally disjoint). Thus, visible light, such as light 9 coming from the physical world, within the transmission spectrum passes through the optical element 18 without being reflected, deflected, refracted and/or diffracted, whereas light 17 emitted by an associated light emitting element 16 is reflected, deflected, refracted and/or diffracted by the associated optical element 18 and formed to a collimated light beam 20 (as exemplarily shown in FIG. 11).

Furthermore, the deflection spectrum of an optical element 18 completely covers an emission spectrum of its at least one associated light emitting element 16. However, the deflection spectrum of the optical element 18 does not cover an emission spectrum of a light emitting element 16, which is not associated with the optical element 18. In other words: The optical element 18 is transparent for the light emitted by a non-associated light emitting element 16.

Thus, by configuring the deflection spectrum of an optical element 18 and the emission spectrum of a light emitting element 16, the optical element 18 and the light emitting element can be "associated" with each other.

As shown, for example, in FIG. 12, each optical element 18 may be a respective holographic optical element (HOE), which is recorded in an emergent holographic emulsion zone (also indicated by reference sign 18) of the display device 10. The emergent holographic emulsion zone 18 has a specific geometrical area 25. Each optical element 18 may represent a holographic concave mirror (i.e. a reflection hologram of a concave mirror). Alternatively, as shown in the example of FIG. 11, each optical element 18 may be a reflection coating (also indicated by reference sign 18) having a reflection area 25, which is dichroic and of spherical or parabolic shape. The reflection coating 18 is a covering applied (for example, by way of vaporing, sputtering, or the like) to the surface of a transparent or at least semi-transparent object 46 such as a glass substrate. Each optical element 18 may also be a diffracting grating, a transmission amplitude grating, a transmission phase grating, a reflection phase grating and/or a reflection amplitude grating, and/or a liquid crystal polarization grating and/or a liquid lens (not shown).

In either case of the above realizations of the optical element 18, the optical element 18 is characterized by a focal length fL, a focal plane 19, a geometrical or deflecting/reflecting/refracting area 25, a "minimal aberration position" 60, an optical axis 50, a reference axis 62 and an object axis 64. These terms are explained and defined in FIGS. 15a to 15c.

Figure 15A:
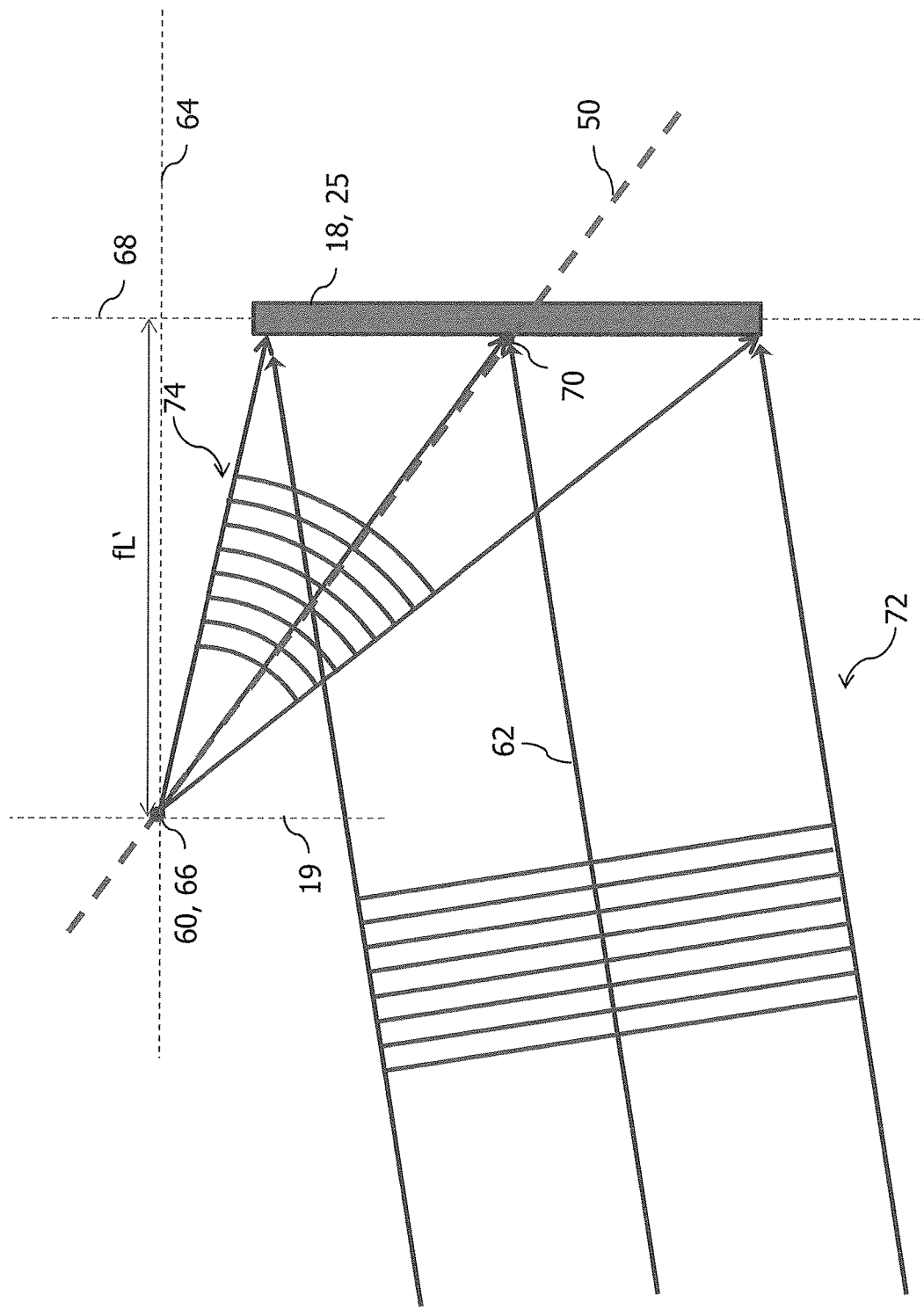

As shown, in particular, in FIG. 15b, the minimal aberration position 60 is the position, for which the optical aberrations are minimized, when a point-like light emitting element 16 is located at this minimal aberration position 60 and the optical element 18 receives light 17 from this point-like light emitting element 16 and forms from the received light 17 the collimated light beam 17', 17", 20. For example, as shown in FIG. 15a, the minimal aberration position 60 of the optical element 18 may be the position 60 of the center of the object 66, at which the recorded object 66 is located during the recording of the optical element 18 as a holographic optical element 18 relative to the position and/or the orientation of the intended optical element 18 (more specifically, relative to the position and/or the orientation of the emulsion zone 18, in which the optical element 18 is formed). In this regard, the minimal aberration position may be defined or understood as the center of the focal plane 19 of the optical element 18.

The focal length fL of the optical element 18 may be defined or understood as the shortest distance between the minimal aberration position 60 of the optical element 18 and the plane 68, in which the geometrical area 25 and/or the reflecting area 25 of the optical element 18 is arranged (see FIGS. 15a to 15c).

The reference axis 62 of the optical element 18 may be defined or understood as a straight line passing through the center 70 of the geometrical area 25 and/or the reflecting area 25 of the optical element 18 and as being parallel to the collimated light beam 20, which is formed by the optical element 18 from the light 17 received from a point-like light emitting element 16 that is located at the minimal aberration position 60 of the optical element 18 (see FIG. 15b). The orientation of the reference axis 62 can be adjusted and fixed, for example, during the recording of the optical element 18 as a holographic optical element, by arranging and/or tilting the reference beam 72 relative to the emulsion zone 18, in which the holographic optical element 18 is recorded (see FIG. 15a). The reference beam 72 may be represented by the central light ray (also indicated by reference sign 62) of the bundle of light rays in the light reference wave (shown as eight straight parallel lines in FIG. 15a), which together with the wave 74 scattered from the recorded object 66 (the so-called object beam 74) form the hologram interference pattern in the emulsion zone 18 during the hologram recording process (see again FIG. 15a).

The object axis 64 of the optical element 18 may be defined or understood as a straight line passing through the minimal aberration position 60 and being perpendicular to the plane 68, in which the geometrical area 25 and/or the reflecting area 25 of the optical element 18 is arranged (see FIGS. 15a to 15c).

The optical axis 50 of the optical element 18 may be defined or understood as a straight line passing through the center 70 of the geometrical area 25 and/or the reflecting area 25 of the optical element 18 and passing through the minimal aberration position 60 of the optical element 18 (see FIGS. 15a to 15c). In this regard, the optical axis 50 of the optical element 18 can be adjusted and fixed by positioning said center 70 and by positioning said minimal aberration position 60. The orientation of the optical axis 50 can be adjusted and fixed, for example, during the recording of the optical element 18 as a holographic optical element 18, by arranging the object 66 (i.e. the lens or the mirror or the like) being imaged as hologram relative to the emulsion zone 18, in which the holographic optical element 18 is recorded (see FIG. 15a). In particular, the optical axis 50 may be parallel to or may even coincide with the object axis 64 (see, for example, FIG. 2a). In general, however, the optical axis 50 not necessarily has to coincide and/or not necessarily has to be parallel to the object axis 64, but can be tilted with respect to the object axis 64 (see, for example, FIGS. 15a to 15c). The same applies to the reference axis 62: The optical axis 50 may be parallel to or even coincide with the reference axis 62 (see, for example, FIG. 2a). In general, however, the optical axis 50 not necessarily has to coincide and/or not necessarily has to be parallel to the reference axis 62, but can be tilted with respect to the reference axis 62 (see, for example, FIGS. 15a to 15c). If a light emitting element 16 is located in the focal plane 19 and on the optical axis 50 of the associated optical element 18, then the optical element 18 forms from the light 17 emitted by the associated light emitting element 16 a collimated light beam 17', 17", 20 and this collimated light beam 17', 17", 20 leaves the optical element 18 parallel to and along the reference axis 62 (see, for example, FIG. 15b). However, if the light emitting element 16 is located in the focal plane 19, but offside the optical axis 50 of the associated optical element 18, then the optical element 18 still forms from the light 17 emitted by the associated light emitting element 16 a collimated light beam 17', 17", 20, but this collimated light beam 17', 17", 20 leaves the optical element 18 in a deflected (i.e. tilted, angled) manner with respect to the reference axis 62 (see, for example, FIG. 15c).

In light of the above, it is possible to realize an optical element 18 having a reference axis 62, an object axis 64 and/or an optical axis 50, each of which having a desired orientation. It is also possible to realize that an optical element 18 and the associated light emitting element 16 are configured and arranged (with respect to each other) such that the collimated light beam 20 formed by the optical element 18 from the light 17 received from the associated light emitting element 16 passes through a desired portion 22, 26, 54 of an exit pupil 24 of the display device 10 (as explained in further detail below). In other words: By arranging the associated light emitting element 16 relative to the optical element 18, in particular, relative to the optical axis 50 within the focal plane 19 of the optical element 18, an arbitrary direction of the collimated light beam 20 can be set. These possibilities are used in the following to obtain specific functional features arising from specific configurations and arrangements of the optical elements 18 and the light emitting elements 16. In detail:

FIG. 2a shows how three exemplary light rays 17 are emitted by one light emitting element 16 and received by one optical element 18 associated with the one light emitting element 16. It is shown in detail how the optical element 18 forms from the light rays 17 emitted by the associated light emitting element 16 one collimated light beam 20, because the light rays 17 after having been deflected/reflected/diffracted by the optical element 18 leave the optical element 18 as (substantially) parallel light rays 17', 17". For collimating the light 17 received from the associated light emitting element 16, the optical element has a focal plane 19 and a predetermined focal length fL, wherein the associated light emitting element 16 is arranged within the focal plane 19 of the associated optical element 18. More specifically, the light emitting element 16 is located on the optical axis 50 and within the focal plane 19 (and, thus, at the minimal aberration position 60). Hence, the collimated light beam 20 leaves the optical element 18 along the reference axis 62.

Since the collimated light beam 20 as formed by the optical element 18 from the light 17 received from the associated light emitting element 16 comprises, inter alia, the parallel light rays 17', 17", it is sufficient that only the central light ray 17" of the bundle of all parallel light rays 17', 17" is used for representing the collimated light beam 20 (see FIG. 2a). Therefore, it can be said that the optical element 18 has magnifying optical properties such that a (virtual) image of the associated light emitting element 16 is provided in infinity (i.e. at infinite distance).

FIG. 2a also shows a light spot 21, which is generated by the collimated light beam 20 when the latter impinges, for example, on a screen or on a surface of a user's eye such as the cornea. It, thus, can be said that the light 17 emitted by the associated light emitting elements 16 is "projected" to a light spot pattern 23 comprising light spots 21 generated by an optical element 18 and its associated light emitting elements 16.

FIG. 2b shows the optical element 18 and the associated light emitting element 16 in a more abstract sketch, the so-called "projection picture". In particular, FIG. 2b also shows the geometrical and deflecting/reflecting/refracting area 25 of the optical element 18 together with the associated light emitting element 16 in front view. The area 25 is of rectangular and almost square shape in this example. As a consequence, the light spot 21 may also be of a rectangular and almost square shape, for example, if the light emitting element 16 is considered point-like. The big arrow in FIG. 2b (and also in FIGS. 3b, 4, 6, 13c, 13e to 13h and 14b) indicates that the light 17 emitted by the associated light emitting element 16 is projected to the corresponding light spot pattern 23.

In the example of FIG. 3a, one optical element 18 is associated with three light emitting elements 16a, 16b, 16c, wherefore the optical element 18 provides three collimated light beams 20a, 20c (only two of the three collimated light beams 20a, 20c are shown for clarity in FIG. 3a). Also for clarity, it is only shown the light rays 17a', 17a" (solid lines), which originally come from light emitting element 16a and, after having been deflected/reflected/diffracted by the optical element 18, leave the optical element 18 in a parallel manner, as well as the light rays 17c', 17c" (dashed lines), which originally come from light emitting element 16c and, after having been deflected/reflected/diffracted by the optical element 18, leave the optical element 18 in also a parallel manner. Similar to FIG. 2a, the central light ray 17a" represents the collimated light beam 20a and the central light ray 17c" represents the collimated light beam 20c. As can be seen in FIG. 3a, the light emitted by the associated light emitting elements 16 is projected to a light spot pattern 23 comprising, at a sufficiently far distance, three non-overlapping light spots 21a, 21b, 21c. Each light spot 21a-c is generated by one of the three collimated light beams 20a, 20c.

FIG. 3b shows the optical element 18 and the three associated light emitting elements 16a, 16b, 16c of FIG. 3a in a more abstract sketch. In particular, FIG. 3b shows the geometrical and deflecting/reflecting/refracting area 25 of the optical element 18 together with the three associated light emitting elements 16a-c in front view. The area 25 is of rectangular and almost square shape in this example. As a consequence, each light spot 21a-c may also be of a rectangular and almost square shape, for example, if each of the light emitting elements 16 is considered point-like. The big arrow in FIG. 4 indicates that each collimated light beam being formed by the optical element 18 from the light 17 emitted by one respective associated light emitting element 16a-c is projected to a corresponding light spot 21a-c. The plurality of light spots 21a-c form the light spot pattern 23.

FIG. 4 shows one optical element 18 associated with nine light emitting elements 16a-i. In particular, FIG. 4 also shows the geometrical and deflecting/reflecting/refracting area 25 of the optical element 18 together with the nine associated light emitting elements 16a-i in front view. The area 25 is of rectangular and almost square shape in this example. As a consequence, each light spot 21a-i may also be of a rectangular and almost square shape, for example, if the each of the light emitting elements 16 is considered point-like. The big arrow in FIG. 4 indicates that each collimated light beam being formed by the optical element 18 from the light emitted by one respective associated light emitting element 16a-i is projected to a corresponding light spot 21a-i, the latter forming the light spot pattern 23.

Each of the light emitting elements 16 is switchable between an on-state (as indicated as a grey tone in the FIGS.), in which the light emitting element 16 emits visible light 17, and an off-state (as indicated as white in the FIGS.), in which the light emitting element 16 emits no light.

Each light emitting element 16 may be a single OLED and forms one pixel of a display of the display device 10 or one (in particular, monochrome) pixel of a display segment 27 (representing, in particular, a polychrome pixel 27) of the display device 10. That means: A plurality of light emitting elements 16 (i.e. pixels) may be combined to a single display segment 27 (compare, inter alia, FIGS. 3a to 7). This allows displaying information (such as an "X" in FIG. 4) on a single display segment 27 by switching some of the light emitting elements off and some of the light emitting elements on.

The above mentioned properties of the light emitting elements 16 and the optical elements 18 are used to, inter alia, enlarge the field of view of the display device 10. In detail:

FIG. 5 shows in side view a display device 10 having (at least) six optical elements 18-1 to 18-6. Each optical element 18-1 to 18-6 is associated with one respective display segment 27 (see FIG. 4) comprising nine light emitting elements 16a to 16i (see also FIG. 4), of which only the center light emitting element 16e of each display segment 27 has been provided with a reference sign 16-1 to 16-6 for clarity.

As shown exemplarily in FIG. 5, the plurality of optical elements 18-1 to 18-6 and the array of light emitting elements 16-1 to 16-6 are configured and arranged such that at least one first partial number 20-3 to 20-5 of the collimated light beams 20-1 to 20-6 passes through at least one first portion 22 of an exit pupil 24 of the display device 10, and at least one second partial number 20-1 of the collimated light beams 20-1 to 20-6, which is different from the first partial number 20-3 to 20-5 of the collimated light beams 20-1 to 20-6, passes through at least a second portion 26 of the exit pupil 24 of the display device 10, wherein the second portion 26 is different from (and, in this example, even spatially disjoint with) the first portion 22.

In the corresponding "projection picture", see FIG. 6, this means that the plurality of optical elements 18-1 to 18-6 and the array of light emitting elements 16-1 to 16-6 are configured and arranged such that the collimated light beams 20-1 to 20-6 are projected to light spots 21-1 to 21-6. Each of the light spots 21-1 to 21-6 is represented by one respective collimated light beam 20-1 to 20-6. The light spots 21-1 to 21-6 belong to light spot patterns 23-1 to 23-6, wherein each light spot pattern 23-1 to 23-6 is generated by one optical element 18-1 to 18-6 and its associated light emitting elements 16-1 to 16-6. For example, the light spot 21-1 belongs to the light spot pattern 23-1, wherein the light spot pattern 23-1 is generated by the optical element 18-1 and its associated light emitting elements 16-1. In other words: The light spot pattern 23-1 is generated by the optical element 18-1 and its associated display segment 27.

As further shown exemplarily in FIGS. 5 and 6, the first portion 22 of the exit pupil 24 represents a first spatial area (also indicated by reference sign 22), in which a pupil 28 of a user's eye 30 is positioned during a proper use of the display device 10, when the eye 30 is looking along at least one first observation direction 32 to the center of the display device 10, wherein the second portion 26 of the exit pupil 24 represents a second spatial area (also indicated by reference sign 26), which is spatially different from the first spatial area 22 and in which the pupil 28 of the user's eye 30 is positioned during the proper use of the display device 10, when the eye 30 is looking along at least one second observation direction 34 to the periphery of the display device 10, which is differently oriented with respect to the first observation direction 32 (compare, as an example, the dashed-dotted lines 32, 34 in FIG. 5).

As shown in FIG. 6, the light spots 21-1 to 21-6, inside the exit pupil 24 of the display device 10, are spatially separated with respect to each other in a non-overlapping manner. Therefore, inside the exit pupil 24 of the display device 10, the light spots 21-1 to 21-6 can cover different positions of the pupil 28 of a user's eye 30 corresponding to different observation directions 32, 34 of the user's eye 30 (two exemplary positions of the pupil 28 of the user's eye 30 are shown in FIG. 6). Thus, for different observation directions 32, 34 of the users' eye 30, the user is able to see an image created by the display device 10. This also allows realizing a display device 10 having a large field of view.

In the example as shown in FIG. 7, the optical elements 18-1 to 18-6 and the light emitting elements 16-1 to 16-6 are configured and arranged such that the collimated light beams 20-1 to 20-6 leaving the display device 10 converge in such a manner that the collimated light beams 20-1 to 20-6 are directed to an intersection region 36, which is located at a rotation point 38, about which the user's eye 30 rotates during the proper use of the display device 10 when changing from the first observation direction 32 to the second observation direction 34. In more general words: At least a part of the plurality of optical elements 18-1 to 18-6 as well as at least a part of the associated light emitting elements 16-1 to 16-6 are configured and arranged such that, at least in one operating state of the display device 10, collimated light beams 20-1 to 20-6 converge with respect to each other in such a manner that the collimated light beams 20-1 to 20-6 are directed to the intersection region 36.

Thus, one or more (20-3 to 20-5) of collimated light beams 20-1 to 20-6 can pass through the pupil 28 of the users' eye 30 in the first observation direction 32 and one or more (20-1) of collimated light beams 20-1 to 20-6 can pass through the pupil 28 of the users' eye 30 in the second observation direction 34 (see FIG. 7). Therefore, for different observation directions 32, 34 of the users' eye 30, or more specifically, for different rotation states of the user's eye 30, the user is able to see the image created by the display device 10.

For ensuring the proper use of the display device 10, the display device 10 may comprise a positioning device (not shown), such as a glasses frame or spectacle frame, which arranges and/or firmly holds the display device 10 relative the user's eye(s) 30. More specifically, by use of the positioning device the position and the orientation of a user's face or head is positioned relative to the position and the orientation of the display device 10 in a predetermined manner. The positioning device may be configured to arranged the pupil 28 of the user's eye 30 within (a spatial area 24 representing) the exit pupil 24 of the display device 10.

As shown in the example of FIGS. 8a to 8d, the display device 10 comprises a switchable deflecting device 40. When switched, the deflecting device 40 can change a propagation direction of each collimated light beam 20 between at least one first direction and at least one second direction. In particular, the deflecting device 40 is able to change the propagation direction independently (i.e. individually) for each of a plurality of distinct groups of collimated light beams 20, wherein a group of collimated light beams 20 may comprise one collimated light beam 20 or two or more collimated light beams 20.

More specifically, the deflecting device 40 comprises a plurality of switchable deflecting elements 42, which are shown as grey and/or black elongated rectangles in FIGS. 8a to 8d. Each deflecting element 42 is associated with one collimated light beam 20 (see, for example, 20a and 42a) and is switchable between an on-state (as indicated as a grey elongated rectangle in FIGS. 8a to 8d), in which the deflecting element 42 leaves a propagation direction of the collimated light beam 20, which enters the deflecting element 42, unchanged such that this collimated light beam 20, which then leaves the deflecting element 42, passes through one portion of the exit pupil 24 (such as, for example, the first portion 22 in FIG. 8b), and an off-state (as indicated as a black elongated rectangle in FIGS. 8b to 8d), in which the deflecting element 42 changes the propagation direction of the collimated light beam 20, which enters the deflecting element 42, such that this collimated light beam 20, which leaves the deflecting element 42, passes through another portion of the exit pupil 24 (such as, for example, the second portion 26 in FIG. 8c).

Furthermore, the display device 10 comprises an image capturing device (or an eye tracker) 44 for capturing an image of the pupil 28 of the user's eye 30 and for generating a position signal representing a position of the pupil 28 of the user's eye 30, which allows a tracking of the position of the pupil 28 of the user's eye 30 (see, inter alia, FIGS. 8a to 8d).

Figure 8A:
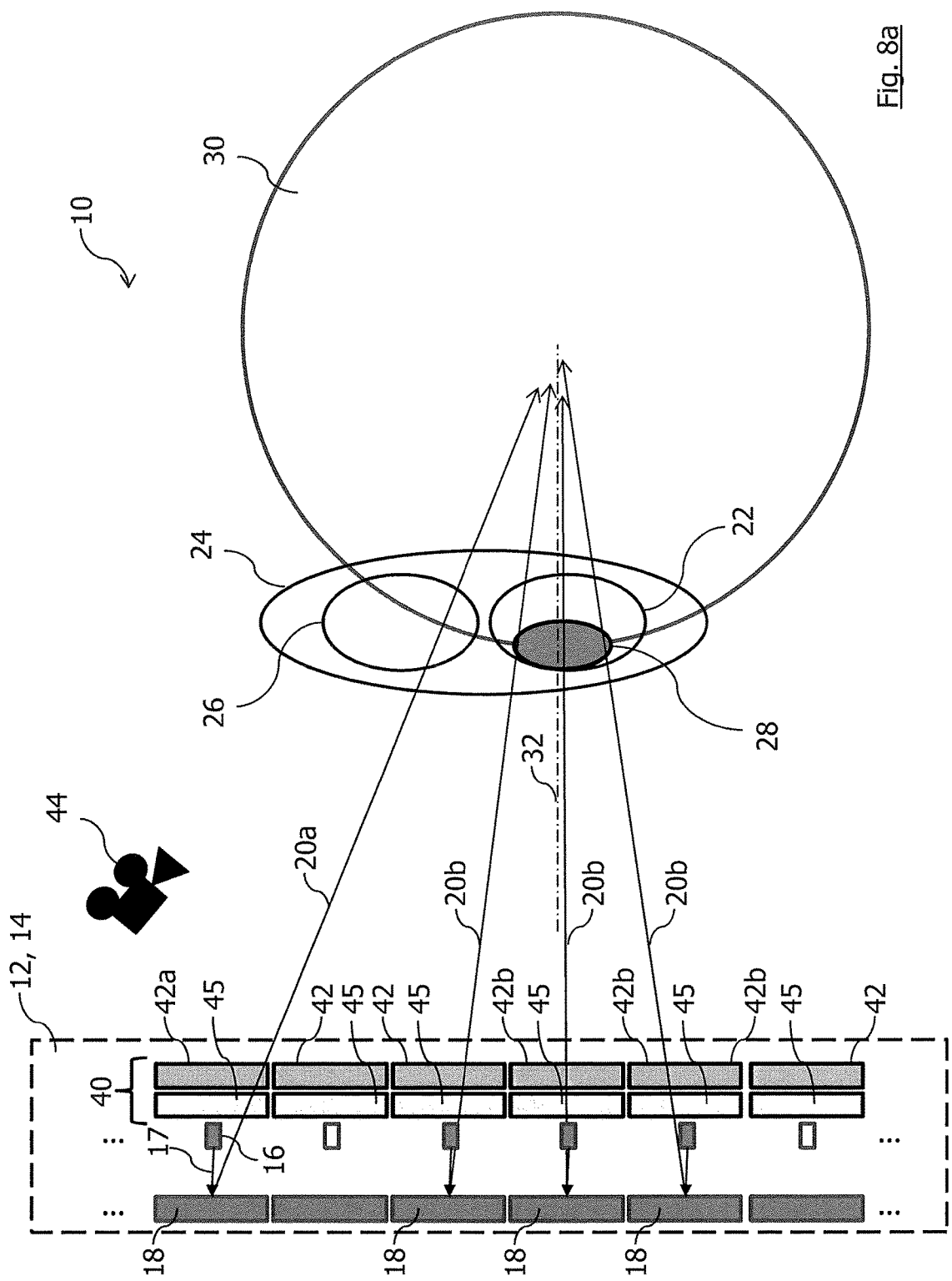
Figure 8B:
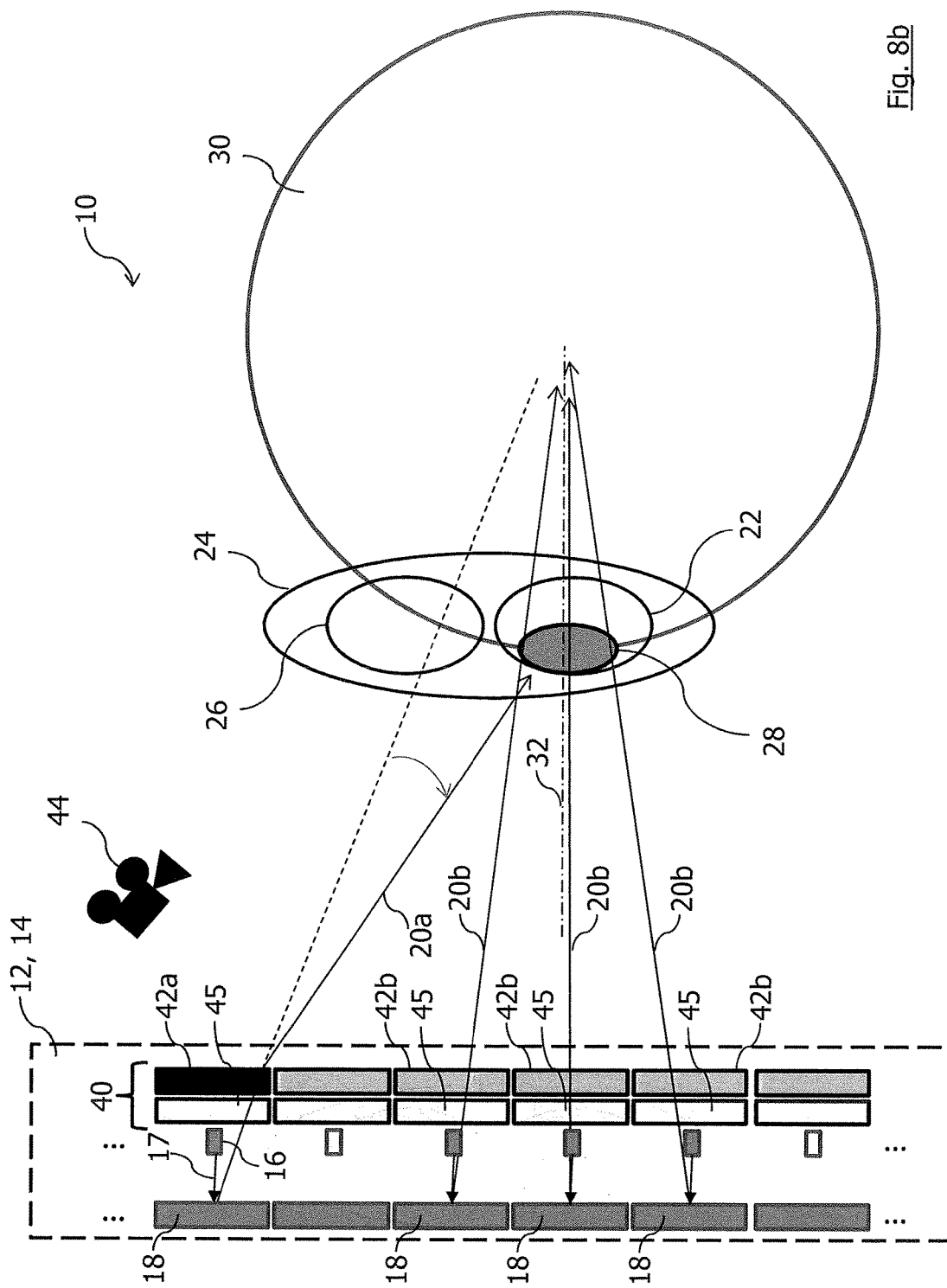

The display device 10 also comprises a control unit (not shown) for switching the deflecting device 40 and the deflecting elements 42 based on the position signal. To this end, the control unit controls the deflecting device 40 based on the position signal generated by the image capturing device 44 such that the propagation directions of the collimated light beams 20 are changed by the deflecting device 40 in such a manner that all the collimated light beams 20, which leave the display device 10, pass through the portion 22 or 26 of the exit pupil 24, in which the pupil 28 of the user's eye 30 is presently positioned (see FIGS. 8b and 8c). More specifically, the control unit sets, when the pupil 28 of the user's eye 30 is positioned in the first portion 22 of the exit pupil 24 (as shown in FIGS. 8a and 8b), only these deflecting elements 42a, by which in their ("grey") on-state the collimated light beams 20a pass through the second portion 26 of the exit pupil 24 (see FIG. 8a), in the ("black") off-state such that the collimated light beams 20a, which leave these deflecting elements 42a, pass through the first portion 22 of the exit pupil 24 (see FIG. 8b). Similarly, the control unit sets, when the pupil 28 of the user's eye 30 is positioned in the second portion 26 of the exit pupil 24 (as shown in FIG. 8c), only those deflecting elements 42b, by which in their ("grey") on-state the collimated light beams 20b pass through the first portion 22 of the exit pupil 24 (see FIG. 8b), in the ("black") off-state such that the collimated light beams 20b, which leave those deflecting elements 42b, pass through the second portion 26 of the exit pupil 24 (see FIG. 8c).

Figure 8C:
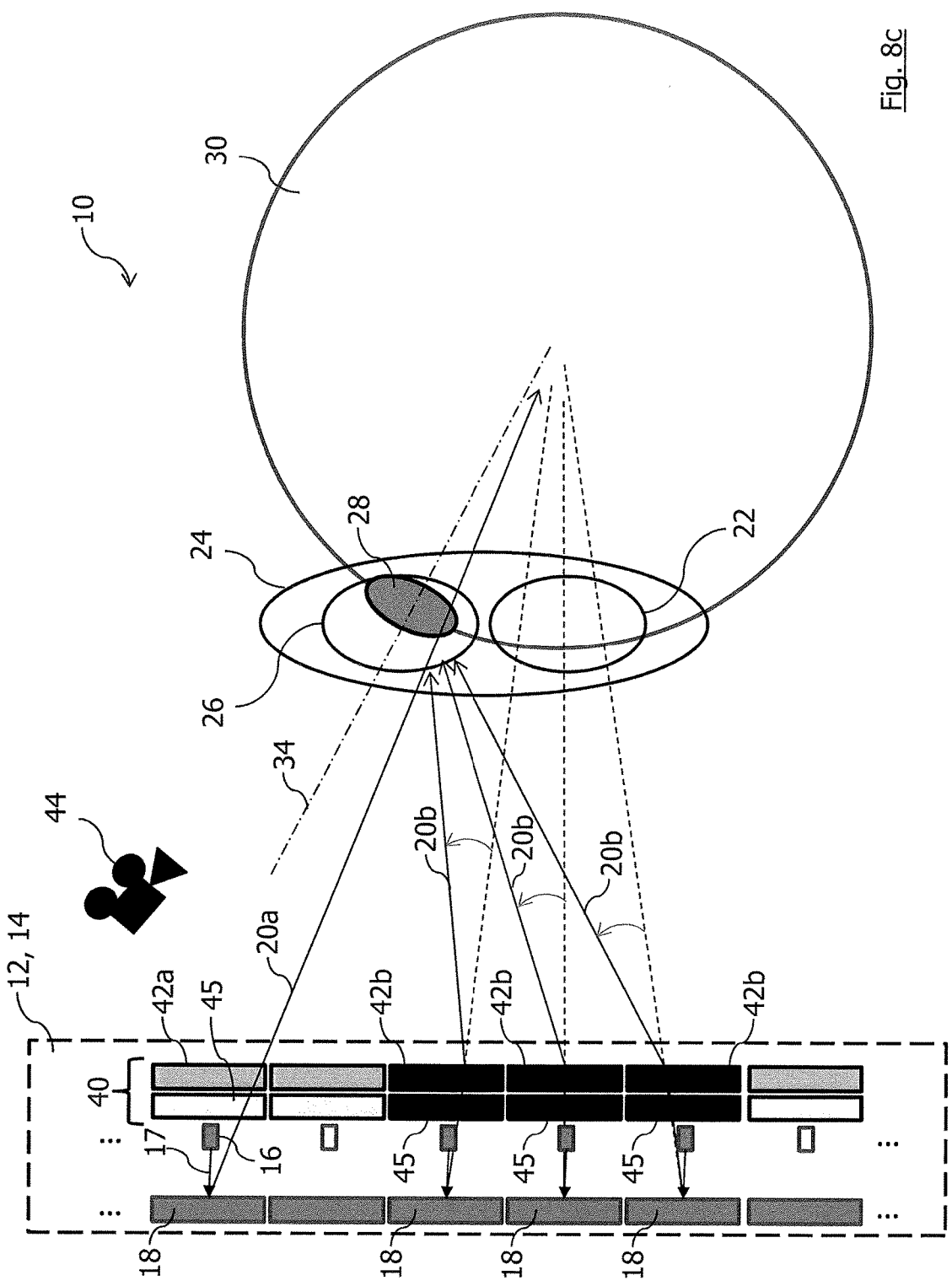
Figure 8D:
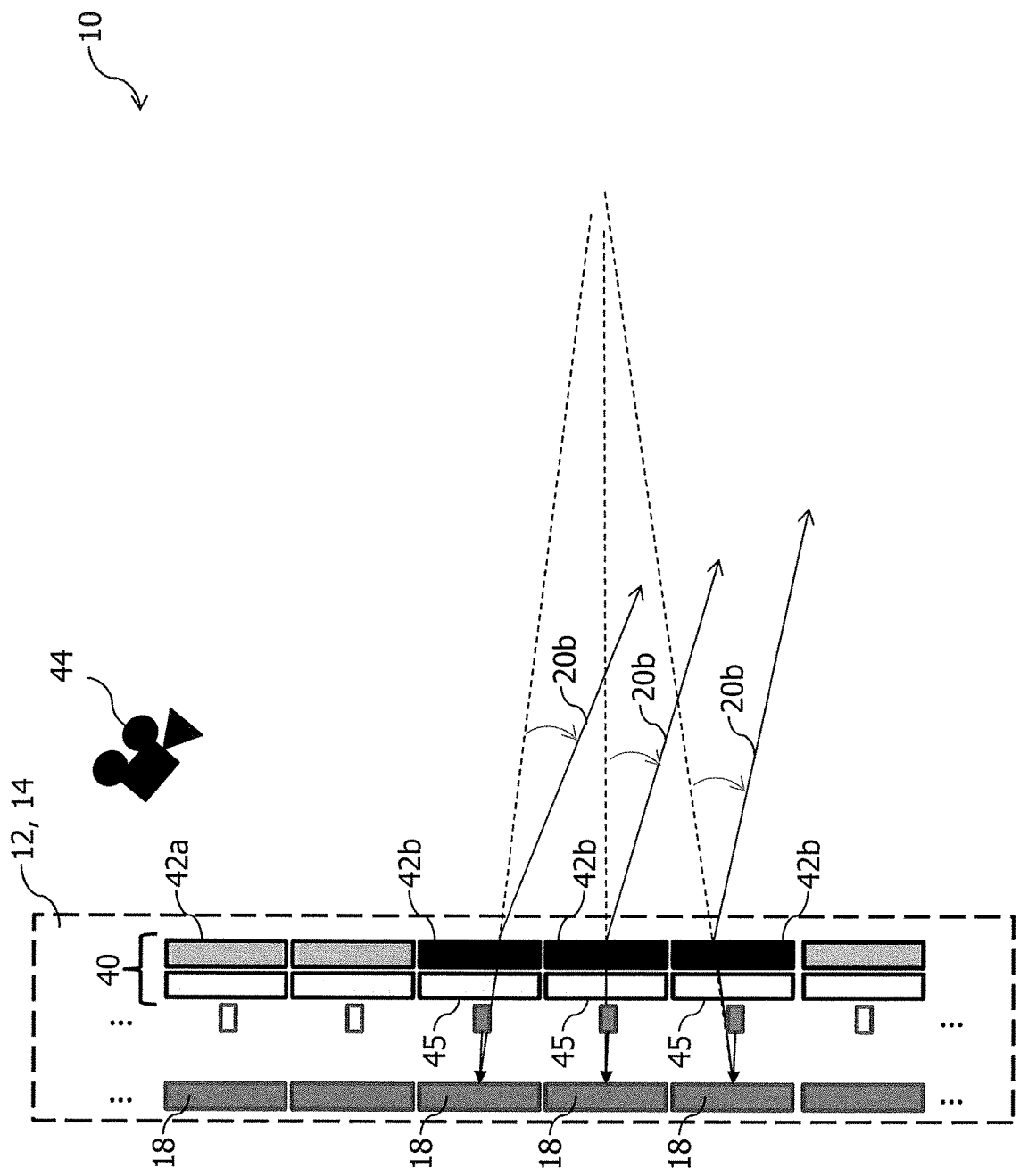

Thus, when the user's eye 30 changes from the first observation direction 32, in which the pupil 28 of the user's eye 30 is positioned in the first portion 22 of the exit pupil 24 (see FIGS. 8a and 8b), to the second observation direction 34, in which the pupil 28 of the user's eye 30 is positioned in the second portion 26 of the exit pupil 24 (see FIG. 8c), the collimated light beams 20, 20a, 20b can pass, due to a corresponding switching of the deflecting device 40 and the deflecting elements 42, through the pupil 28 of the user's eye 30 even for a changing observation direction 32, 34 of the user's eye 30 (see FIGS. 8b and 8c). Hence, all the light power of the display device 10 can be collimated into the user's eye 30.

In particular, the deflecting device 40 or each deflecting element 42 may change the propagation direction of the collimated light beam 20 also on basis of a polarization state of the light of the collimated light beam 20. To this end, the deflecting device 40 comprises a liquid crystal polarization grating (short: LCPG). More specifically, each deflecting element 42 comprises an active switchable polarization grating (short: APG) and a liquid crystal (LC) half-waveplate (not shown). In the off-state of the APG (i.e. in the off-state of the deflecting element 42), the APG deflects or diffracts the light (i.e. changes or deflects the propagation direction of the collimated light beam 20, which enters the APG). In the on-state of the APG (i.e. in the on-state of the deflecting element 42), the APG does not deflect or diffract the light (i.e. leaves the propagation direction of the collimated light beam 20, which enters the APG, unchanged). The deflecting device 40 may also comprise a polarization setting device 45 for setting the polarization of the light of the collimated light beam 20 to either purely left handed circular polarization or purely right handed circular polarization. More specifically, one polarization setting device 45 (as indicated as light-grey and/or black elongated rectangular in FIGS. 8a to 8d) is associated with one respective optical element 18 and one respective deflecting element 16, wherein the polarization setting device 45 is arranged, along the propagation direction of the collimated light beam 20, directly downstream of the associated optical element 18 and between the associated optical element 18 and the associated deflecting element 42.

The polarization setting device 45 is switchable by the control unit for switching the polarization of the light of the collimated light beam 20 between purely left handed circular polarization (as indicated as light-grey elongated rectangular in FIGS. 8a to 8d) and purely right handed circular polarization (as indicated as black elongated rectangular in FIG. 8c). To this end, the polarization setting device comprises a combination of one or more Pockels cell(s), half-waveplate(s) and/or a quarter-waveplate(s) (not shown).

Thus, depending on the circular polarization of the light of the collimated light beam 20, the deflection direction, i.e. the sign (either "+" or "−") of the deflection angle, of the collimated light beam 20 leaving the deflection device 40 can be set. For example, when the polarization setting device 45 is switched such that the collimated light beam 20 is set to purely left handed circular polarization (as indicated as light grey elongated rectangular in FIGS. 8a to 8d), the deflection direction of the collimated light beam 20 leaving the deflection device 40, in particular the deflecting element 42, is deflected, for example, downwards (see FIGS. 8b and 8d), whereas, when the polarization setting device 45 is switched such that the collimated light beam 20 is set to purely right handed circular polarization (as indicated as black elongated rectangular in FIG. 8c), the deflection direction of the collimated light beam 20 leaving the deflection device 40, in particular the deflecting element 42, is deflected upwards (see FIG. 8c). In other words: The light emitted by the light emitting element 42 can be polarized to be purely (left or right handed) circular polarized by the polarization setting device 45 before this light enters the deflecting element 42 and, in that case, only one direction, but not two directions of deflection emerges (see FIGS. 8a to 8d).

As shown in the example of FIG. 9, a first optical element 18a and a second optical element 18b are associated with at least one common light emitting element 16, wherein the first optical element 16a is configured and arranged with respect to the common light emitting element 16 to form, by first order deflection, diffraction and/or reflection, from the light 17 emitted by the common light emitting element 16 a first collimated light beam 20a that passes through the second portion 26 of the exit pupil 24, whereas the second optical element 18b, which is arranged directly neighboring (i.e. adjacent) to the first optical element 18a, is configured and arranged with respect to the common light emitting element 16 to form, by second order deflection, diffraction and/or reflection, from the light 17 emitted by the common light emitting element 16 a second collimated light beam 20b that passes through the first portion 22 of the exit pupil 24. That is: The first optical element 18a creates from the light 17 emitted by the light emitting element 16 an image in the user's eye 30, when the eye 30 is looking along the first observation direction 32, at which the pupil 28 of the user's eye 30 is positioned during the proper use of the display device 10 in the first portion 22 of the exit pupil 24 (see FIG. 9), whereas the second optical element 18b ("purposely") creates from the light 17 emitted by the light emitting element 16 a (so-called "ghost") image in the user's eye 30, when the eye 30 is looking along the second observation direction 34, at which the pupil 28 of the user's eye 30 is positioned during the proper use of the display device 10 in the second portion 26 of the exit pupil 24 (compare FIGS. 7 and 9). The first optical element 18a is arranged closer to the common associated light emitting element 16, whereas the second optical element 18b arranged farther from the common associated light emitting element 16. In particular, the common associated light emitting element 16 may be arranged on the optical axis 50a of the first optical element 18a, in particular, at the minimal aberration position 60a of the first optical element 18a, whereas, the common associated light emitting element 16 may be arranged offside the optical axis 50b of the second optical element 18b and, hence, offside the minimal aberration position 60b of the second optical element 18b and, thus, may create a second order deflection/diffraction/reflection with optical aberrations more severe in comparison to the optical aberrations caused by the first order deflection/diffraction/reflection. The optical axes 50a, 50b of the first and the second optical elements 18a, 18b are parallel and shifted with respect to each other (i.e. non-coincident).

Thus, the light 17 emitted by the common light emitting element 16 not only is directed into the pupil 28 of the user's eye 30, when the eye 30 is positioned in the first portion 22 of the exit pupil 24, but also is directed into the pupil 28 of the user's eye 30, when the eye 30 is positioned in the second portion 26 of the exit pupil 24. Therefore, the light 17 emitted by the common light emitting element 16 associated both with the first and the second optical elements 18a, 18b can reach the user's eye 30 at different observation directions 32, 34 of the user's eye 30.

As shown in the example of FIG. 10, an optical element 18 is associated with at least one first light emitting elements 16a (schematically shown as a small circle) and at least one second light emitting element 16b (schematically shown as a small rectangle), which are arranged spatially separated with respect to each other in a non-overlapping manner. In the example of FIG. 10, the optical element 18 is configured and arranged with respect to the light emitting elements 16a, 16b to form from the light 17a, 17b emitted by each of the light emitting elements 16a, 16b a respective collimated light beam 20a, 20b and to direct the collimated light beams 20a, 20b such that the collimated light beam 20a coming from a first light emitting element 16a of the two light emitting elements 16a, 16b passes through the first portion 22 of the exit pupil 24, and such that the collimated light beam 20b coming from a second light emitting element 16b of the two light emitting elements 16a, 16b passes through the second portion 26 of the exit pupil 24. In other words: The optical element 18 is configured to form from the light 17a emitted by the at least one first light emitting element 16a at least one first collimated light beam 20a and to form from the light 17b emitted by the at least one second light emitting element 16b at least one second collimated light beam 20b, wherein the optical element 18 as well as the first and the second light emitting elements 16a, 16b are configured and arranged such that the first collimated light beam 20a passes through the first portion 22 of the exit pupil 24 of the display device 10 and the second collimated light beam 20b passes through the second portion 26 of the exit pupil 24 of the display device 10.

Further, in the example of FIG. 10, the display device 10 comprises a control unit (not shown) for switching the light emitting elements 16a, 16b based on a position signal generated by the image capturing device 44. In the case of FIG. 10, the control unit sets the first light emitting element 16a in its ("grey") on-state and the second light emitting element 16b in its ("white") off-state (such that the collimated light beam 20b is actually not present and therefore indicated as a dashed line in FIG. 10), when the pupil 28 of the user's eye 30 is positioned in the first portion 22 of the exit pupil 24. However, in the case when the pupil 28 of the user's eye 30 is positioned in the second portion 26 of the exit pupil 24, the control unit sets the first light emitting element 16a in its off-state and the second light emitting element 16b in its on-state.

Thus, as shown in FIG. 10, only this light emitting element 16a is in its ("grey") on-state, for which the associated optical element 18 actually can direct the emitted light 17a into the pupil 28 of the user's eye 30 in the present observation direction 32, whereas that light emitting element 16b is in its ("white") off-state, for which the associated optical element 18 cannot direct the emitted light 17b into the pupil 28 of the user's eye 30 in the present observation direction 32. Thus, light 17b, which cannot reach the user's eye 30, is not generated at all in this case. This saves energy and allows the provision of an energy efficient display device 10.

As shown in the example of FIG. 12, a first optical element 18a is associated only with at least one first light emitting element 16a, a second optical element 18b1 is associated only with at least one second light emitting element 16b1 and a third optical element 18b2 is associated only with at least one third light emitting element 16b2. The first light emitting element 16a emits blue colored light 17a, the second light emitting element 16b1 emits red colored light and the third light emitting element 16b2 emits green colored light 17b2. The first, second and third light emitting elements 16a, 16b1, 16b2 are arranged spatially separated with respect to each other in a non-overlapping manner. The first optical element 18a is a first holographic optical element 18a, which is recorded in a first emulsion zone (also indicated by reference sign 18a) of the display device 10. The second optical element 18b1 is a holographic optical element 18b1 and the third optical element 18b2 is a holographic optical element 18b2. Both the second and third holographic optical element 18b1, 18b2 are recorded in one and the same second emulsion zone 18b of the display device 10. The first and the second emulsion zones 18a, 18b are different from each other.

As also shown in FIG. 12, the first holographic optical element 18a collimates the light 17a emitted by the first light emitting element 16a to form a blue colored collimated light beam 20a, the second holographic optical element 18b1 collimates the light 17b1 emitted by the second light emitting element 16b1 to form a red colored collimated light beam 20b1 and the third holographic optical element 18b2 collimates the light 17b2 emitted by the third light emitting element 16b2 to form a green colored collimated light beam 20b2.

The first emulsion zone 18a can be chosen such that the first holographic optical element 18a can be recorded for having the desired optical properties for collimating the blue colored light 17a, whereas the second emulsion zone 18b can be chosen such that the second and the third holographic optical elements 18b1, 18b2 can be recorded for having the desired optical properties for collimating the red and green colored light 17b1, 17b2. Simultaneously, because of recording both the second and third holographic optical elements 18b1, 18b2 in the single second emulsion zone 18b, space can be saved, thus making the display device 10 compact.

Further, as having two independent emulsion zones 18a, 18b, the first and second emulsion zones 18a, 18b can be arranged spatially separated from each other in an overlapping manner when viewed from a front side (compare, for example, FIGS. 12, 13a, 13d to 14d). More specifically, the first and second emulsion zone 18a, 18b can be arranged such that the first and second emulsion zone 18a, 18b are shifted with respect to each other along a direction parallel to and along a direction perpendicular to a propagation direction of the collimated light beams 20a, 20b1, 20b2 leaving the first and/or second optical elements 18a, 18b.

Thus, the first and second emulsion zones 18a, 18b can be arranged independently from each other and with respect to their corresponding associated light emitting elements 16a, 16b1, 16b2. For example, the first emulsion zone 18a is arranged with respect to the first light emitting element 16a such that the smallest distance from the first light emitting element 16a to the first optical element 18a is the distance from the center of the first light emitting element 16a to the center of the first optical element 18a and the second emulsion zone 18b is arranged with respect to the second and third light emitting elements 16b1, 16b2 such that the smallest distance from the third light emitting element 16b2 to the second optical element 18b is the distance from the center of the third light emitting element 16b2 to the center of the second optical element 18b, whereas the smallest distance from the second light emitting element 16b1 to the second optical element 18b1 not necessarily has to be the distance from the center of the second light emitting element 16b1 to the center of the second optical element 18b1 (compare FIG. 12).

Still with reference to FIG. 12, the first holographic optical element 18a comprises an optical axis 50a, a reference axis 62a and an object axis 64a, the second holographic optical element 18b1 comprises an optical axis 50b1, a reference axis 62b1 and an object axis 64b1 and the third holographic optical element 18b2 comprises an optical axis 50b2, a reference axis 62b2 and an object axis 64b2. The first light emitting element 16a is located at the minimal aberration position 60a of the first optical element 18a, the second light emitting element 16b1 is located at the minimal aberration position 60b1 of the second optical element 18b1 and the third light emitting element 16b2 is located at the minimal aberration position 60b2 of the third optical element 18b2. In particular, the optical elements 18a, 18b1, 18b2 and the light emitting elements 16a, 16b1, 16b2 are configured and arranged such that the collimated light beams 20a, 20b1, 20b2 leave the display device 10 substantially parallel in an at least partially overlapping manner (see FIG. 12, in particular, reference signs 17a', 17b1', 17b2'). This is realized, inter alia, by recording the second and the third optical element 18b1, 18b2 in the second emulsion zone 18b such that the minimal aberration positions 60b1, 60b2 are shifted with respect to each other in a direction perpendicular to reference axis 62b1, 62b2. Therefore, the optical axis 50b1 of the second optical element 18b1 is tilted with respect to the optical axis 50b2 of the third optical element 18b2.

Thus, one and same emulsion zone 18b forms two holographic optical elements 18b1, 18b2 and, due to the tilting of optical axis 50b1 relative to optical axis 50b2, the second and third light emitting elements 16b1, 16b2 can be easily arranged in a spatially separated manner. Hence, the second and third light emitting elements 16b1, 16b2 do not have to be stacked in a direction along the reference axes 62b1, 62b2. This allows a simple arrangement of the light emitting elements 16b1, 16b2.

Additionally all the collimated light beams 20a, 20b1, 20b2 leave the display device 10 substantially parallel in an at least partially overlapping manner and, thus, can reach the user's eye in a common light spot 21. Therefore, the user can perceive a high-resolution color image of the display device 10, although the light emitting elements 16a, 16b1, 16b2 are spatially separated with respect to each other. It is to be noted again that this can be obtained in two different ways, namely, on the one hand, by employing two different emulsion zones 18a, 18b, and/or, on the other hand, by orienting the optical axes 50b1, 50b2.

As can be seen, for example, in FIGS. 5 and 6, the light spot pattern 23-1 comprising nine light spots 21-1 is generated by the optical element 18-1 providing nine collimated light beams 20-1 formed of the light emitted by the nine associated light emitting elements 16-1. These collimated light beams 20-1 pass only through a second portion 26 of the exit pupil 24 of the display device 10, but do not pass through a first portion 22 of the exit pupil 24 of the display device 10. That is, the first portion 22 of the exit pupil 24 is not illuminated by the light spot pattern 23-1 (see FIG. 6). Therefore, if the eye 30 is looking along the first observation direction 32 to the center of the display device 10 (compare FIG. 5) such that the pupil 28 of the user's eye 30 is positioned in the first spatial area 22, which represents the first portion 22 of the exit pupil 24 (see FIGS. 5 and 6), the light emitted by said nine associated light emitting elements 16-1 cannot pass through the pupil 28 of the eye 30. In this regard, (inter alia) the first portion 22 of the exit pupil 24 (or the first spatial area 22), or more general, the complete exit pupil 24 of the display device 10 expect the second portion 26, represents a "peripheral zone" of the optical element 18-1, where no light emitted by the nine associated light emitting elements 16-1 can be directed to by the optical element 18-1.

To reach also this peripheral zone, the display device 10 may comprise at least one so-called "peripheral" optical element 18' as shown in the example of FIG. 13a (indicated as short rectangles). Different realizations of peripheral optical elements 18' are possible, wherein two of them are shown in FIGS. 13d and 14a. In this realizations, first optical elements 18 and second optical elements 18' and associated light emitting elements 16, 16' are configured and arranged such that, during the proper use of the display device 10, first collimated light beams 20 formed by the first optical elements 18 from light received from associated light emitting elements 16, 16' are imaged onto a "central" part of the eye's retina including the fovea and second collimated light beams 20' formed by the second optical elements 18' from the light received from the associated light emitting elements 16, 16' are imaged onto a "peripheral" part of the retina offside the fovea. In this regard, the first optical elements 18 may be called "central" optical elements, the second optical elements 18' may be called "peripheral" optical elements, the first collimated light beams 20 may be called "central" collimated light beams and the second collimated light beams 20' may be called "peripheral" collimated light beams (see FIGS. 13b to 14b).

Thus, the first (central) collimated light beams 20 may be considered as being projected to (central) light spots 21 (in particular, on an eye surface, such as the cornea of the eye 30), which, inside the exit pupil 24 of the display device 10, can be viewed by the central part of the retina including the fovea, which part has a relatively high resolution capacity, whereas the second (peripheral) collimated light beams 20' may be considered as being projected to (peripheral) light spots 21', which, inside the exit pupil 24 of the display device 10, can be viewed by the peripheral part of the retina offside the fovea, which part has a relatively low resolution capacity (see FIGS. 13b to 14b). This allows realizing a display device generating a light spot pattern 23, 23', which is adapted to the resolution capacity of the fovea. Further, the light spots 21, 21', inside the exit pupil 24 of the display device 10, can cover different positions of the pupil 28 of the user's eye 30 that correspond to different observation directions of the user's eye 30 (see, for example, FIG. 13a).

The peripheral optical elements 18' can be realized in various different ways:

For example, as shown in FIG. 13b, the optical axis 50' and the reference axis 62' of each peripheral optical element 18' may be tilted with respect to each other. The peripheral optical elements 18' are associated with at least one so-called "peripheral" light emitting element 16', which is located on the optical axis 50' and within the focal planes 19' of the optical elements 18'. Thus, the collimated light beams 20'-1, 20'-2 leave the optical elements 18' in a diverging manner with respect to each other without any intersection thereby (see FIG. 13b). This allows the realization of two collimated light beams 20'-1, 20'-2, which pass through different portions 22, 26 of the exit pupil 24 of the display device 10.

Alternatively, as shown in FIG. 14a, the optical axis 50' and the reference axis 62' of each peripheral optical element 18' may be parallel (or even coincident) with respect to each other. The peripheral optical elements 18' are associated with at least one common light emitting element 16, which is also associated with a central optical element 18 and which is located offside the optical axis 50' and within the focal planes 19' of the optical elements 18'. Thus, the collimated light beams 20' leave the optical elements 18' in a diverging manner with respect to each other without any intersection thereby (see FIG. 14a). This allows also the realization of two collimated light beams 20', which pass through different portions 22, 26 of the exit pupil 24 of the display device 10.

Also the arrangement of central and peripheral optical elements 18, 18' with respect to each other can be realized in various different ways:

For example, the focal length fL of a first optical element 18 may be larger than a focal length fL' of a second optical element 18' (see FIGS. 13d and 14a).

Thus, a three layer configuration can be realized, in which the first optical elements 18 are arranged in a first layer 52 of the display device 10, the second optical elements 18' are arranged in a second layer 52' of the display device 10 and the all the light emitting elements 16, 16' are arranged in a third layer 19, 19' of the display device 10, wherein the third layer 19, 19' coincides with the focal planes 19, 19' of the first and the second optical elements 18, 18' and wherein the second layer 52' is arranged between the first layer 52 and the third layer 19, 19', because, even though the first optical elements 18 are farther displaced from the light emitting elements 16, 16' than the second optical elements 18', the first optical elements 18 can still collimate the light from the light emitting elements 16, 16' due to their longer focal length fL (see, for example, FIGS. 13d and 14a). Further, in such a three layer configuration, the shorter focal length fL' of the second optical elements 18' allows, on the one hand, a larger transversal image magnification of the light emitting elements 16, 16' in the user's eye 30, and, on the other hand, a larger collecting angle (numerical aperture) for receiving the light from the light emitting elements 16, 16' (see, in particular, FIG. 14a), which results also in larger deflection angles of collimated light beams 20' and, thus, in a larger exit pupil and/or field of view.

Moreover, although the larger magnification of the second optical elements 18' may lead to a lower resolution of a light spot pattern 23' on an eye surface, such as the cornea of the eye, this lower resolution is not a problem but justifiable, because the second light spot 23' is viewed by the peripheral part of the retina offside the fovea, which part has a low resolution capacity anyways. This allows realizing a display device 10 generating a light spot pattern 23, 23', which is adapted to the resolution capacity of the fovea.

Furthermore, when the first optical elements are arranged in the first layer 52, the second optical elements are arranged in the second layer 52' and the associated light emitting elements 16, 16' are arranged in the third layer 19, 19', the first and the second optical elements 18, 18' must not be arranged in one and the same layer of the display device 10. This allows reducing the density of the optical elements 18, 18' in each layer 52, 52' and a high dense arrangement of the optical elements 18, 18' can be avoided. Moreover, this allows arranging the optical elements 18, 18' in a separated manner (see FIGS. 13a, 13d to 14b), wherefore the freedom of arranging the optical elements 18, 18' is increased. Hence, a simpler arrangement of the optical elements 18, 18' and, thus, an easier manufacturing of the display device 10 are possible.

When the focal plane 19 of the first optical elements 18 and a focal plane 19' of the second optical elements 18' are arranged in the common focal plane 19, 19' and the associated light emitting elements 16, 16' are arranged in the common focal plane 19, 19' (see FIGS. 13d and 14a), even if the first optical elements 18 are farther displaced from the light emitting elements 16, 16' than the second optical elements 18', both the first and the second optical elements 18, 18' can still collimate the light from the light emitting elements 16, 16' to collimated light beams 20, 20' (see FIGS. 13d and 14a).

The display device 10 may comprise a filter 56 for blocking light emitted by a light emitting element 16, 16', which is associated both with the first and the second optical elements 18, 18', wherein the filter 56 may be arranged between the first and the second optical element 18, 18' (see FIG. 14a). More specifically, the filter may be arranged in a layer (not shown), which is arranged between the first layer 52, in which the first optical element 18 is arranged, and the second layer 52', in which the second optical element 18' is arranged (see FIG. 14a).

Thus, a light ray 58 or a collimated light beam 20, which has already been formed by the first optical element 18 and which propagates towards the second optical element 18', is blocked by the filter 56 arranged between the first and the second optical elements 18, 18' such that this light ray 58 or collimated light beam 20 is prevented from reaching the second optical element 18' and, thus, from being perturbed (e.g. spread up or re-directed) by the second optical element 18'. Therefore, the blocked light is not scattered in an un-controlled way and/or in an un-desired direction. Hence, a well-defined light emission of the display device 10 is possible without any undesired stray light generated by perturbed collimated light beams 20.

There are two possible alternative to realize that the first and the second optical elements 18, 18' are associated with at least one light emitting element 16, 16', wherein the first optical element 18 is configured to receive light from the at least one associated light emitting element 16, 16' and to form from the received light at least one first collimated light beam 20 and the second optical element 18' is configured to receive light from the at least one associated light emitting element 16, 16' and to form from the received light at least one second collimated light beam 20':

As shown in FIGS. 12, 13a and 13c to 13h, the array of light emitting elements 16, 16', 16a, 16b1, 16b2 may include at least one first light emitting element 16, 16a for emitting light of at least one first color and at least one second light emitting element 16', 16b1, 16b2 for emitting light of at least one second color, which is/are different from the at least one first color, wherein the first optical element 18, 18a may be associated only with the at least one first light emitting element 16, 16a and the second optical element 18', 18b1, 18b2 may be associated only with the at least one second light emitting element 16', 16b1, 16b2 and wherein the first optical element 18, 18a may be configured to receive light from the first light emitting element 16, 16a and to form from the received light the first collimated light beam 20, 20a and the second optical element(s) 18', 18b1, 18b2 may be configured to receive light from the second light emitting element(s) 16', 16b1, 16b2 and to form from the received light the second collimated light beam(s) 20', 20b1, 20b2.

Thus, the first optical element 18, 18a is not associated with the at least one second light emitting element 16', 16b1, 16b2 at all, but is, for example, transparent for the light emitted by the second light emitting element 16', 16b1, 16b2 and, vice versa, the second optical element 18', 18b1, 18b2 is not associated with the at least one first light emitting element 16, 16a at all, but is, for example, transparent for the light emitted by the first light emitting element 16, 16a (see, for example, FIGS. 12 and 13d). In this case, the first optical element 18, 18a cannot perturb the second collimated light beam 20', 20b1, 20b2 formed by the second optical element 18', 18b1, 18b2 and, vice versa, the second optical element 18', 18b1, 18b2 cannot perturb the first collimated light beam 20, 20a formed by the first optical element 18, 18a anyways (see, again, FIGS. 12 and 13d). Therefore, a filter 56, as shown in FIG. 14a, is dispensable or not needed. This allows realizing a light-weight and compact design of the display device 10. Moreover, even when the optical axis 50, 50a of the first optical element 18, 18a and the optical axis 50', 50b1 of the second optical element 18', 18b1 are tilted with respect to each other (see FIGS. 12 and 13d) and/or the reference axis 62, 62a of the first optical element 18, 18a and the reference axis 62', 62b1, 62b2 of the second optical element 18', 18b1, 18b2 are parallel with respect to each other (see FIGS. 12 and 14a), which increases the freedom of constructing the display device 10, it still can be achieved that the first and the second collimated light beams 20, 20', 20a, 20b1, 20b2 pass through different first and second (not necessarily non-overlapping) portions 22, 26 of the exit pupil 24. Alternatively, as shown in FIGS. 14a and 14b, the first and the second optical elements 18, 18' may be associated with at least one common light emitting element 16, 16', wherein the first optical element 18 may be configured to receive light from the common light emitting element 16, 16' and to form from the received light the first collimated light beam 20 and the second optical element 18' may be configured to receive light from the common light emitting element 16, 16' and to form from the received light the second collimated light beam 20'.

Thus, both the first and the second optical elements 18, 18' can form a respective collimated light beam 20, 20' from one and the same common light emitting element 16, 16'. Thus, the first and the second optical elements 18, 18' share one and the same common light emitting element 16, 16'. This allows reducing the number of light emitting elements 16, 16'. Hence, a light-weight, compact and energy-efficient design of the display device 10 is possible.

At least one 18', 18b1 of the first and the second optical elements 18, 18', 18a, 18b1, 18b2 may be configured such that the optical axis 50', 50b1 of the optical element 18', 18b1 and the reference axis 62', 62b1 of the optical element 18', 18b1 are tilted with respect to each other (see FIGS. 12 and 13b).

Thus, if the associated light emitting element 16' is arranged on the optical axis 50' (see FIGS. 13b, 13d), the optical element 18' can be configured such that the optical axis 50' is tilted with respect to the reference axis 62' in such a manner that the collimated light beam 20' leaves the optical element 18' along the reference axis 62' without passing the associated light emitting element 16'. Thus, the collimated light beam 20' can leave the display device 10 without being at least partially re-absorbed and/or without being scattered in an un-controlled way and/or in an un-desired direction by the light emitting element 16'. Hence, an energy-efficient and a well-defined light emission characteristics of the display device 10 are possible without any undesired stray light generated by perturbing collimated light beams 20'.

The first and the second optical elements 18, 18' may be configured such that the reference axis 62 of the first optical element 18 and the reference axis 62' of the second optical element 18' are tilted with respect to each other (see FIG. 13d).

Thus, it can be achieved easily that the first collimated light beam 20 passes through a first portion 54 of the exit pupil 24 of the display device 10 and the second collimated light beam 20' passes through a second portion 22, 26 of the exit pupil 24 of the display device 10, which is different from the first portion 54 and, in particular, spatially disjoint with the first portion (see FIGS. 13e to 13h), and/or that the first collimated light beam 20 is imaged onto a central part of the eye's retina including the fovea and the second collimated light beam 20' is imaged onto a peripheral part of the retina offside the fovea (see also FIGS. 13e to 13h and 14). More general, by setting the angle between the reference axis 62 of the first optical element 18 and the reference axis 62' of the second optical element 18', the first and the second optical elements 18, 18' can be configured such that the first and the second collimated light beams 20, 20' diverge with respect to each other, in particular, even without any intersection of the collimated light beams 20, 20' (i.e. the collimated light beams 20, 20' start diverging directly after leaving the first and the second optical elements (see FIG. 13d), which is different from first converging, then intersecting and finally diverging). This allows realizing a display device 10 having a large field of view. Moreover, even when the first optical element 18 is a first holographic optical element being recorded in a first emulsion zone of the display device 10 and the second optical element 18' is a second holographic optical element being recorded also in the first emulsion zone, which is weight- and space-saving (not shown), by tilting the reference axes 62, 62' with respect to each other it still can be achieved that the first and the second collimated light beams 20, 20' pass through different first and second portions 22, 26, 54 of the exit pupil 24. This allows realizing a light-weight and compact design of the display device having a large field of view.

Alternatively, the first and the second optical elements 18, 18', 18a, 18b1, 18b2 may be configured such that the reference axis 62, 62a of the first optical element 18, 18a and the reference axis 62', 62b1, 62b2 of the second optical element 18', 18b1, 18b2 are parallel or even coincident with respect to each other (see FIGS. 12 and 14a).

The at least one second optical element 18' may comprise at least two second optical elements 18' (see FIGS. 13b, 13d to 14b). The second optical elements 18' may be arranged offside the optical axis 50 of the first optical element 18, in particular, with equal distances between the optical axis 50 of the first optical element 18 and the optical axis 50' of each of the second optical elements 18', wherein the centers of the second optical elements 18' may thereby form, for example, an equilateral triangle (see FIGS. 14a and 14b).

The at least one second optical element 18' may comprise at least two second optical elements 18' (see FIGS. 13b, 13d to 14b). The second optical elements 18' may be arranged offside the optical axis 50 of the first optical element 18, in particular, with equal distances between the optical axis 50 of the first optical element 18 and the optical axis 50' of each of the second optical elements 18' (see FIGS. 14a and 14b) or with equal distances between the center (in particular, of the geometrical area 25 and/or the reflection area 25) of the first optical element 18 and the center (in particular, of the geometrical area 25' and/or the reflection area 25') of each of the second optical elements 18' (see FIG. 13a). The (in particular, geometrical area 25' of and/or the reflection area 25' of) the second optical elements 18' may be arranged within one and the same plane 52' (see FIGS. 13d and 14a), wherein the centers (in particular, of the geometrical area 25' and/or the reflection area 25') of the second optical elements 18' may thereby form, for example, an equilateral triangle (see FIGS. 14a and 14b) or a square (see FIG. 13a) or the like.

Thus, the second optical elements 18' can be arranged around (and even rotationally symmetrically with respect to) the first optical element 18 (see, for example, FIG. 14b). Thus, inside the exit pupil 24 of the display device 10, the at least two second light spots (as indicated in FIG. 14b as ellipses with solid frames and/or large rectangles with dashed frames) representing the at least two second collimated light beams 20' formed by the at least two second optical elements 18' form a light spot pattern 23', which is arranged around the light spot pattern 23 formed by the first light spots (as indicated in FIG. 14b as small rectangles with solid frames) representing the first collimated light beams 20 formed by the first optical element 18. In particular, the second light spots (as indicated in FIG. 14b as ellipses with solid frames and/or large rectangles with dashed frames) are arranged around the centered first light spots (as indicated in FIG. 14b as small rectangles with solid frames) such that the second light spots thereby form, for example, an equilateral triangle, too. Therefore, inside the exit pupil 24 of the display device 10, the at least two second light spots can cover at least two different positions of the pupil 28 of a user's eye, which are arranged around a center position, at which the first light spot is arranged, wherein the at least two different positions correspond to at least two different observation directions of the user's eye. This allows the realization of a plurality of similar sections of the light spot pattern 23, 23' for a number of different observation directions of the user's eye, which number corresponds to the number of second optical elements 18'. Hence, for different observation directions of the users' eye, the user is able to see the image created by the display device 10. This allows realizing a display device having a large field of view.

In the following, some of the Figures are described in further detail:

As can be seen in FIGS. 13b and 13d in side view and in FIGS. 13c, 13e to 13h in front view, exemplarily four second, i.e. "peripheral" optical elements 18' are associated with nine peripheral light emitting elements 16'. As can be seen in the example of FIG. 13b, in which presently only one of the nine peripheral light emitting elements 16' emits light, the peripheral optical elements 18' receive light from the associated peripheral light emitting element 16' and form from the received light four collimated light beams 20' simultaneously (of which only two collimated light beams 20'-1, 20'-2 can be seen in the side view of FIGS. 13a, 13b and 13d) that leave the four peripheral optical elements 18' in a diverging manner, i.e. the four collimated light beams 20' move out in different directions from the four peripheral optical elements 18' in such a manner that the four collimated light beams 20', after having left the four peripheral optical elements 18', diverge with respect to each other without intersecting (see, in particular, FIGS. 13b and 13c). This means that the four collimated light beams 20' do not overlap at all and that the four collimated light beams 20', directly after having left the four peripheral optical elements 18', start to separate more and more with respect to each other during their propagation. Such a propagation behavior is different from a propagation behavior as exemplarily shown in FIG. 3a, in which two collimated light beams 20a, 20c, directly after having left the optical elements 18, intersect with each other.

In particular, the four peripheral optical elements 18' and the associated peripheral light emitting elements 16' are configured and arranged such that at least one first collimated light beam 20'-1 of the four collimated light beams 20'-1, 20'-2 passes through a first portion 22a of the exit pupil 24 of the display device 10, and at least one second collimated light beam 20'-2 of the four collimated light beams 20'-1, 20'-2, which is different from the first collimated light beam 20'-1, passes through at least one second portion 22b, 26a, 26b of the exit pupil 24 of the display device 10, which is different from the first portion 22a. In this regard, the four collimated light beams 20' can be considered as being projected to four light spots 21'-1 to 21'-4 (indicated as ellipses), wherein each of the light spots 21'-1 to 21'-4 is represented by one respective collimated light beam 20' and wherein the four light spots 21'-1 to 21'-4, inside the exit pupil 24 of the display device 10, are spatially separated with respect to each other, in particular, in a non-overlapping manner (see FIG. 13c).

Therefore, inside the exit pupil 24 of the display device 10, the four light spots 21'-1 to 21'-4 can cover four different positions of the pupil 28 of a user's eye 30 corresponding to four different observation directions 32a, 32b, 34a, 34b of the user's eye 30 (compare FIGS. 13a and 13c). Thus, for different observation directions 32a, 32b, 34a, 34b of the users' eye 30, the user is able to see an image created by the display device 10. This also allows realizing a display device having a large field of view.

Of course, if more than one peripheral light emitting element 16' of the nine peripheral light emitting elements 16' associated with the four peripheral optical elements 18' emits light, more than four light spots 21' emerge. This can be seen in FIGS. 13f and 13h: Each of the four peripheral optical elements 18' generates four collimated light beams 20' and correspondingly four light spots 21' for each associated peripheral light emitting element 16' presently emitting light. Therefore, if all the nine associated light emitting elements 16' presently emit light, a total of four times nine, i.e. thirty-six collimated light beams 20' and correspondingly thirty-six light spots 21' (again indicated as ellipses) are generated by the four peripheral optical elements 18' (see FIG. 13f). In turn, if only four of the nine associated light emitting elements 16' presently emit light, a total of four times four, i.e. sixteen collimated light beams 20' and correspondingly sixteen light spots 21' (indicated as filled ellipses) are generated by the four peripheral optical elements 18' (see FIG. 13h).

In the example of FIGS. 13a to 13h, the peripheral optical elements 18' are realized as follows: Each peripheral optical element 18' is a reflection holographic optical element 18' representing a holographic concave mirrors (i.e. a reflection hologram of a concave mirror). The holographic optical elements 18' may be recorded in one, i.e. the same (in particular, emergent holographic) emulsion zone 18' of the display device 10 by employing two differently oriented light beams for recording the holographic optical elements 18'. In this case, the two short rectangles as shown in FIG. 13b could be illustrated as one long rectangle instead, if one considers the rectangles as the emulsion zone, which is then shared by four holographic optical elements 18'. Alternatively, as shown in FIGS. 13a to 13h explicitly, each of holographic optical elements 18' may be recorded in one respective (in particular, emergent holographic) emulsion zone 18' of the display device 10.

As can be seen in FIG. 13d in side view and in FIGS. 13e to 13h in front view, one central optical element 18 is associated with nine central light emitting elements 16.

As can be seen in the example of FIG. 13d, in which presently only two of the nine central light emitting elements 16 emit light, the central optical element 18 receives light from these two associated central light emitting elements 16 and forms from the received light two collimated light beams 20 simultaneously that leave the central optical element 18.

In particular, the central optical element 18 and the associated central light emitting elements 16 as well as the peripheral optical elements 18' and the associated peripheral light emitting elements 16' are configured and arranged such that the collimated light beams 20 pass through a central portion 54 of the exit pupil 24 of the display device 10, which is different from first and second portions 22a, 22b, 26a, 26b of the exit pupil 24 of the display device 10 and which is spatially arranged between the first and second portions 22a, 22b, 26a, 26b (see FIG. 13e). In this regard, the two collimated light beams 20 can be considered as being projected to two light spots 21 (indicated as squares), wherein each of the light spots 21 is represented by one respective collimated light beam 20 and wherein the two spots 21, inside the exit pupil 24 of the display device 10, are spatially arranged between the light spots 21'-1 to 21'-4 (indicated as ellipses) of the peripheral optical elements 18' (see FIG. 13e).

Thus, the central optical element 18 and its associated central light emitting elements 16 can be employed for a central view of the user's eye 30 (therefore the name "central" optical element 18 and "central" light emitting elements 16), whereas the peripheral optical elements 18' and their associated peripheral light emitting elements 16' can be employed for a "peripheral" view of the user's eye 30 (therefore the name "peripheral" optical elements 18' and "peripheral" light emitting elements 16').

If all the central and the peripheral light emitting elements 16, 16' emit light, the central and the peripheral optical elements 18, 18' generate the light spot pattern 23, 23' as shown in FIG. 13f.

Further, in the example of FIGS. 13a, 13g and 13h, the display device 10 comprises a control unit (not shown) for switching the central and the peripheral light emitting elements 16, 16' based on a position signal generated by the image capturing device 44. In the case of FIG. 13g, the control unit sets only the central light emitting elements 16 associated with the central optical element 18 in their ("dark") on-state and the peripheral light emitting elements 16' associated with the peripheral optical elements 18' in their ("white") off-state (wherefore the light spots 21' are not at present and therefore are only indicated as white ellipses having a dashed frame in FIG. 13g), when the pupil 28 of the user's eye 30 is positioned in the central portion 54 of the exit pupil 24 of the display device 10. However, in the case of FIG. 13h, when the pupil 28 of the user's eye 30 is positioned in the first and/or second portion 22a, 22b, 26a, 26b of the exit pupil 24 of the display device 10, the control unit sets the central light emitting elements 16 associated with the central optical element 18 in their ("white") off-state (wherefore the light spots 21 are not at present and therefore are only indicated as white squares having a dashed frame in FIG. 13h) and peripheral light emitting elements 16' associated with the peripheral optical elements 18' in their ("dark") on-state. More particular, the control unit sets only these central and the peripheral light emitting elements 16, 16' associated with the optical elements 18, 18' in their ("dark") on-state, which generate a light spot pattern 23, 23' that covers the present position of the pupil 28 of a user's eye 30 (see FIG. 13h). The setting is based on the example of the display device 10 as shown in FIG. 10.

In the example of FIGS. 14a and 14b, the central optical element 18 is not only associated with central light emitting elements 16, but is also associated with peripheral light emitting elements 16'. Also, in the example of FIGS. 14a and 14b, the peripheral optical elements 18' are not only associated with peripheral light emitting elements 16', but are also associated with central light emitting elements 16. In other words: In the example of FIGS. 14a and 14b, the central light emitting elements 16 are associated both with the central optical element 18 and the peripheral optical elements 18' and the peripheral light emitting elements 16' are also associated both with the central optical element 18 and the peripheral optical elements 18'. For this reason, the central optical element 18, the central light emitting elements 16 (in their on-state), the peripheral optical elements 18' and the peripheral light emitting elements 16' (in their on-state) are all indicated in the same grey tone in FIGS. 14a and 14b.

As can be seen in FIG. 14a in side view and in FIG. 14b in front view, each of the three peripheral optical elements 18' is associated with nine central light emitting elements 16 and with nine peripheral light emitting elements 16'. As can be seen in the example of FIG. 14a, only one of light emitting elements 16 (solid lines) and only one of the light emitting elements 16' (dashed lines) emits light for clarity. A peripheral optical element 18' receives light from the associated peripheral light emitting element 16' and forms from the received light a (dashed lined) collimated light beam 20' (for clarity, only the light deflection from one of the two indicated peripheral optical elements 18' is shown). Further, the same peripheral optical element 18' receives light from the associated central light emitting element 16 and forms from the received light another (solid lined) collimated light beam 20'. Additionally, the central optical element 18 receives light from the associated peripheral light emitting element 16' and forms from the received light a (dashed lined) collimated light beam 20. Moreover, the same central optical element 18 receives light from the associated central light emitting element 16 and forms from the received light another (solid lined) collimated light beam 20.

The peripheral optical elements 18' are arranged orthogonally with respect to each other and offside with respect to the optical axis 50 of the central optical element 18 with equal distances between the optical axis 50 of central optical element 18 and the optical axis 50' of each of the peripheral optical elements 18', thereby forming a triangle (see FIGS. 14a and 14b).

As a consequence of the setup shown in FIGS. 14a and 14b, the central optical element 18 can generate nine collimated light beams 20 from the light emitted by the nine associated central light emitting elements 16, wherein each of these nine collimated light beams 20 represents one respective light spot (as indicated in FIG. 14b as small rectangles with solid frames) in the light spot pattern 23 inside the exit pupil 24 of the display device 10. Further, the central optical element 18 can generate nine collimated light beams 20 from the light emitted by the three times nine, i.e. twenty-seven, associated peripheral light emitting elements 16', wherein each of these twenty-seven collimated light beams 20 represents one respective light spot (as indicated in FIG. 14b as ellipses with dashed frames) in the light spot pattern 23 inside the exit pupil 24 of the display device 10. Each of the three peripheral optical elements 18 can generate nine collimated light beams 20' from the light emitted by the nine associated central light emitting elements 16 and, thus, in total the three peripheral optical elements 18 can generate three times nine, i.e. twenty-seven collimated light beams 20' from the light emitted by the nine associated central light emitting elements 16, wherein each of these twenty-seven collimated light beams 20' represents one respective light spot (as indicated in FIG. 14b as large rectangles with dashed frames) in the light spot pattern 23' inside the exit pupil 24 of the display device 10. Moreover, each of the three peripheral optical elements 18 can generate nine collimated light beams 20' from the light emitted by the nearest nine associated peripheral light emitting elements 16' and, thus, in total the three peripheral optical elements 18 can generate three times nine, i.e. twenty-seven collimated light beams 20' from the light emitted by their nearest nine associated peripheral light emitting elements 16', wherein each of these twenty-seven collimated light beams 20' represents one respective light spot (as indicated in FIG. 14b as ellipses with solid frames) in the light spot pattern 23' inside the exit pupil 24 of the display device 10.

Thus, both the central and the peripheral optical elements 18, 18' can be employed to form collimated light beams 20, 20' from the central light emitting elements 18 and both the central and the peripheral optical elements 18, 18' can be employed to form collimated light beams 20, 20' from the peripheral light emitting elements 18'. This allows the generation of a more sophisticated light spot pattern 23, 23' (see FIG. 14b), which covers even more different positions of the pupil 28 of the user's eye pupil 30.

Unless expressly stated otherwise, identical reference signs in the Figures stand for identical or identically-acting elements. Also, an arbitrary combination of the features and/or modifications elucidated in the Figures in connection with individual embodiments is conceivable.

The invention claimed is:

1. A display device, comprising:
an array of light emitting elements for emitting light;
a plurality of optical elements disposed to receive light from the array of light emitting elements, wherein the plurality of optical elements comprises a first optical element and a second optical element, the first optical element being configured to receive light from at least one light emitting element of the array of light emitting elements and to form from the received light a first collimated light beam passing through a first portion of an exit pupil of the display device, the second optical element being configured to receive light from at least one light emitting element of the array of light emitting elements and to form from the received light a second collimated light beam passing through a second portion of the exit pupil of the display device, wherein the second portion of the exit pupil is different from the first portion of the exit pupil; and
a positioning device for arranging the display device relative a user's eye such that the user's eye is positioned for a proper use of the display device,
wherein during such proper use of the display device the first collimated light beam is imaged onto a central part of a retina of the user's eye including the fovea and the second collimated light beam is imaged onto a peripheral part of the retina outside the fovea.

2. The display device according to claim 1,
wherein the plurality of the optical elements comprises an optical element configured as one of a holographic optical element, a diffracting grating and a reflection coating.

3. The display device of claim 1, wherein the first and second portions of the exit pupil of the display device are spatially disjoint.

4. A display device, comprising:
an array of light emitting elements for emitting light;
a plurality of optical elements designed to receive light from the array of light emitting elements, wherein the plurality of optical elements comprises a first optical element and a second optical element, the first optical element being configured to receive light from at least one light emitting element of the array of light emitting elements and to form from the received light a first collimated light beam passing through a first portion of an exit pupil of the display device, the second optical element being configured to receive light from at least one light emitting element of the array of light emitting elements and to form from the received light a second collimated light beam passing through a second portion of the exit pupil of the display device, wherein the second portion of the exit pupil is different from the first portion of the exit pupil;
wherein the array of light emitting elements includes a first light emitting element for emitting light of a first color and a second light emitting element for emitting light of a second color, which is different from the first color, the first optical element being associated only with the at least one first light emitting element, and the second optical element being associated only with the at least one second light emitting element, wherein the first optical element is configured to receive light from the first light emitting element and to form from the received light the first collimated light beam and the second optical element being configured to receive light from the second light emitting element and to form from the received light the second collimated light beam.

5. A display device, comprising:
an array of light emitting elements for emitting light;
a plurality of optical elements disposed to receive light from the array of light emitting elements, wherein the plurality of optical elements comprises a first optical element and a second optical element, the first optical element being configured to receive light from at least one light emitting element of the array of light emitting elements and to form from the received light a first collimated light beam passing through a first portion of an exit pupil of the display device, the second optical element being configured to receive light from at least one light emitting element of the array of light emitting elements and to form from the received light a second collimated light beam passing through a second portion of the exit pupil of the display device, wherein the second portion of the exit pupil is different from the first portion of the exit pupil;
wherein the first optical element is a first holographic optical element recorded in a first emulsion zone of the display device, and wherein the second optical element is a second holographic optical element recorded in one of the first emulsion zone and a second emulsion zone of the display device, wherein the second emulsion zone is different from the first emulsion zone.

6. A display device, comprising:
an array of light emitting elements for emitting light;
a plurality of optical elements disposed to receive light from the array of light emitting elements, each of the plurality of optical elements being associated with at least one of the array of light emitting elements and configured to form from received light a collimated light beam; and
a switchable deflecting device configured to change a propagation direction of each collimated beam between at least one first direction and at least one second direction, wherein the deflecting device is configured to change the propagation direction independently for each of a plurality of distinct groups of collimated light beams.

7. The display device according to claim 6, wherein the deflecting device comprises a plurality of switchable deflecting elements, each of the plurality of switchable deflecting elements being associated with at least one collimated light beam, wherein each of the plurality of switchable deflecting elements is switchable between an on-state, in which each of the plurality of switchable deflecting elements leaves a propagation direction of the collimated light beam unchanged such that the collimated light beam passes through a first portion of an exit pupil of the display device, and an off-state, in which each of the plurality of switchable deflecting elements changes the propagation direction of the collimated light beam such that the collimated light beam passes through a second portion of the exit pupil of the display device, wherein the second portion of the exit pupil is different from the first portion of the exit pupil.

* * * * *